United States Patent [19]
Stern et al.

[11] Patent Number: 5,084,768
[45] Date of Patent: Jan. 28, 1992

[54] METHOD AND APPARATUS FOR PREVIEWING RECORDED INFORMATION

[76] Inventors: Michael R. Stern, 75 Marguerite Ave., Mill Valley, Calif. 94941; Stanley M. Stern, 27 Wordsworth Ct., Mill Valley, Calif. 94941

[21] Appl. No.: 415,015

[22] Filed: Sep. 29, 1989

[51] Int. Cl.$^5$ .............................................. H04N 5/76
[52] U.S. Cl. ............................................ 358/342
[58] Field of Search .............. 358/335, 342; 360/33.1, 360/35.1, 14.1, 15; 364/521, 410; 434/307, 323

[56] References Cited

U.S. PATENT DOCUMENTS

| | | | |
|---|---|---|---|
| 3,947,882 | 3/1976 | Lightner . | |
| 4,247,759 | 1/1981 | Yurls et al. . | |
| 4,300,040 | 11/1981 | Gould et al. . | |
| 4,305,131 | 12/1981 | Best | 434/323 |
| 4,405,984 | 9/1983 | Siegel et al. . | |
| 4,414,467 | 11/1983 | Gould et al. . | |
| 4,490,810 | 12/1984 | Hon | 364/410 |
| 4,593,376 | 6/1986 | Volk . | |
| 4,598,810 | 7/1986 | Shore et al. . | |
| 4,616,263 | 10/1986 | Eichelberger | 358/342 |
| 4,647,989 | 3/1987 | Geddes . | |
| 4,654,799 | 3/1987 | Ogaki et al. | 364/410 |
| 4,660,101 | 4/1987 | Martin | 358/335 |
| 4,667,802 | 5/1987 | Verduin et al. | 364/410 |
| 4,672,554 | 6/1987 | Ogaki . | |
| 4,674,055 | 6/1987 | Ogaki et al. . | |
| 4,685,001 | 8/1987 | Martin | 358/342 |
| 4,685,003 | 8/1987 | Westland | 358/335 |
| 4,688,105 | 8/1987 | Bloch et al. | 358/342 |
| 4,703,465 | 10/1987 | Parker . | |
| 4,717,971 | 1/1988 | Sawyer | 358/342 |
| 4,766,581 | 8/1988 | Korn et al. . | |
| 4,827,347 | 5/1990 | Bell | 358/906 |
| 4,860,123 | 8/1989 | McCalley et al. | 358/342 |
| 4,896,791 | 1/1990 | Smith . | |
| 4,905,077 | 2/1990 | Ishii | 358/335 |
| 4,905,094 | 2/1990 | Pocock et al. | 358/335 |
| 4,964,004 | 10/1990 | Barker | 358/335 |

OTHER PUBLICATIONS

Interac Corporation, "The Music Sampler" (1988) Sales Brochure.

*Primary Examiner*—Donald McElheny, Jr.
*Attorney, Agent, or Firm*—Townsend and Townsend

[57] ABSTRACT

A method and apparatus for previewing recorded information. The apparatus includes a selection of back-lit switches, each of which displays audio or video selection information. A user indicates a desired selection for preview by pressing one of the back-lit switches. An audio and video preview of the desired selection is presented to the user by playback of a optical disc or portion thereof.

12 Claims, 7 Drawing Sheets

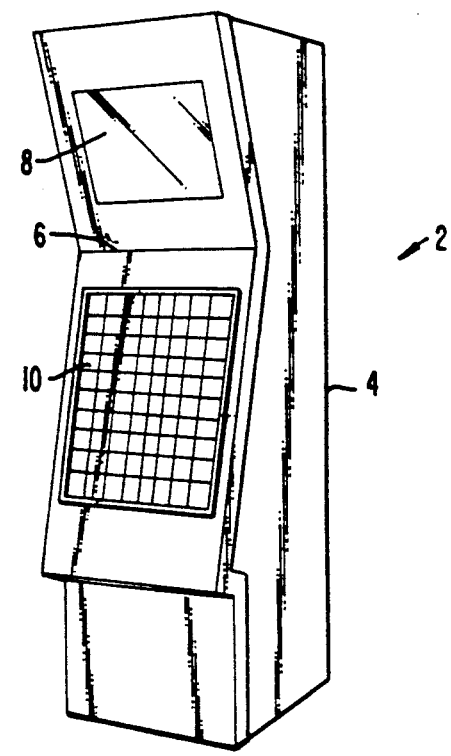
FIG._1.
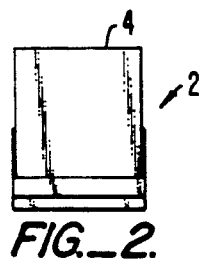
FIG._2.
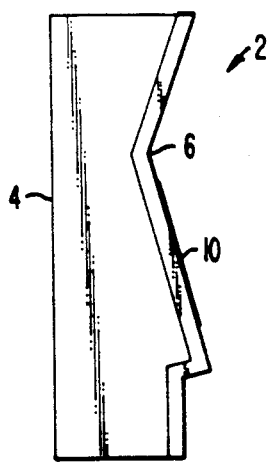
FIG._5.
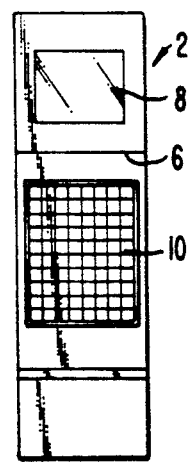
FIG._3.
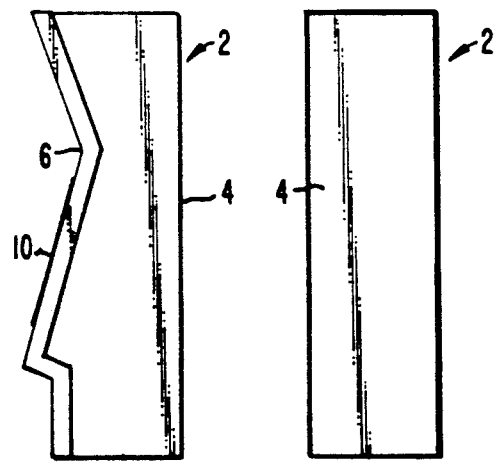
FIG._4.
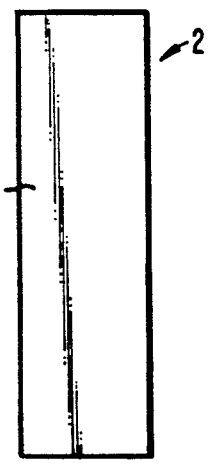
FIG._6.
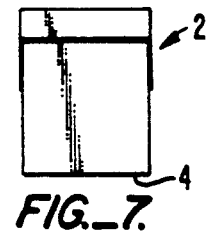
FIG._7.

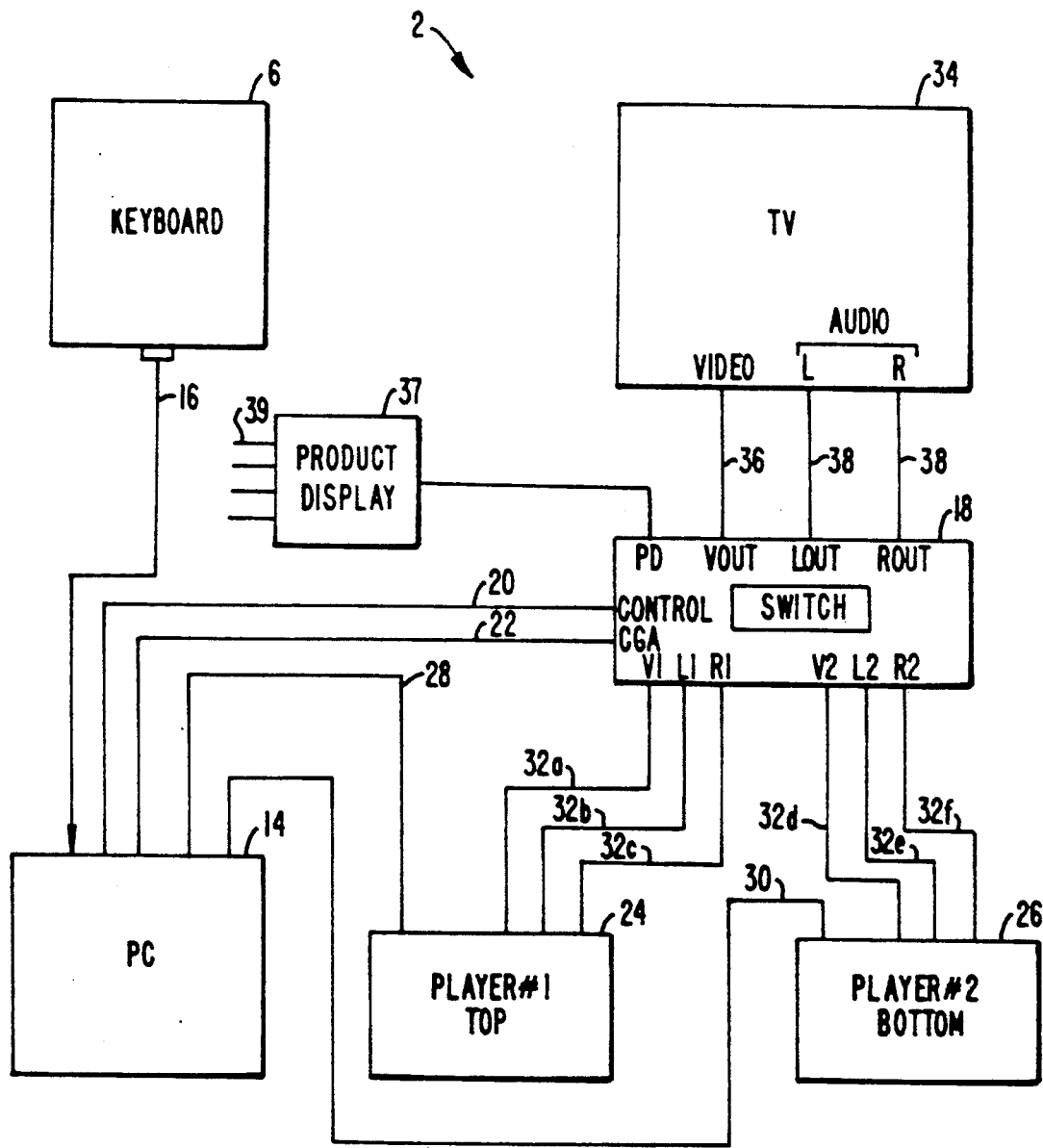
FIG._8.

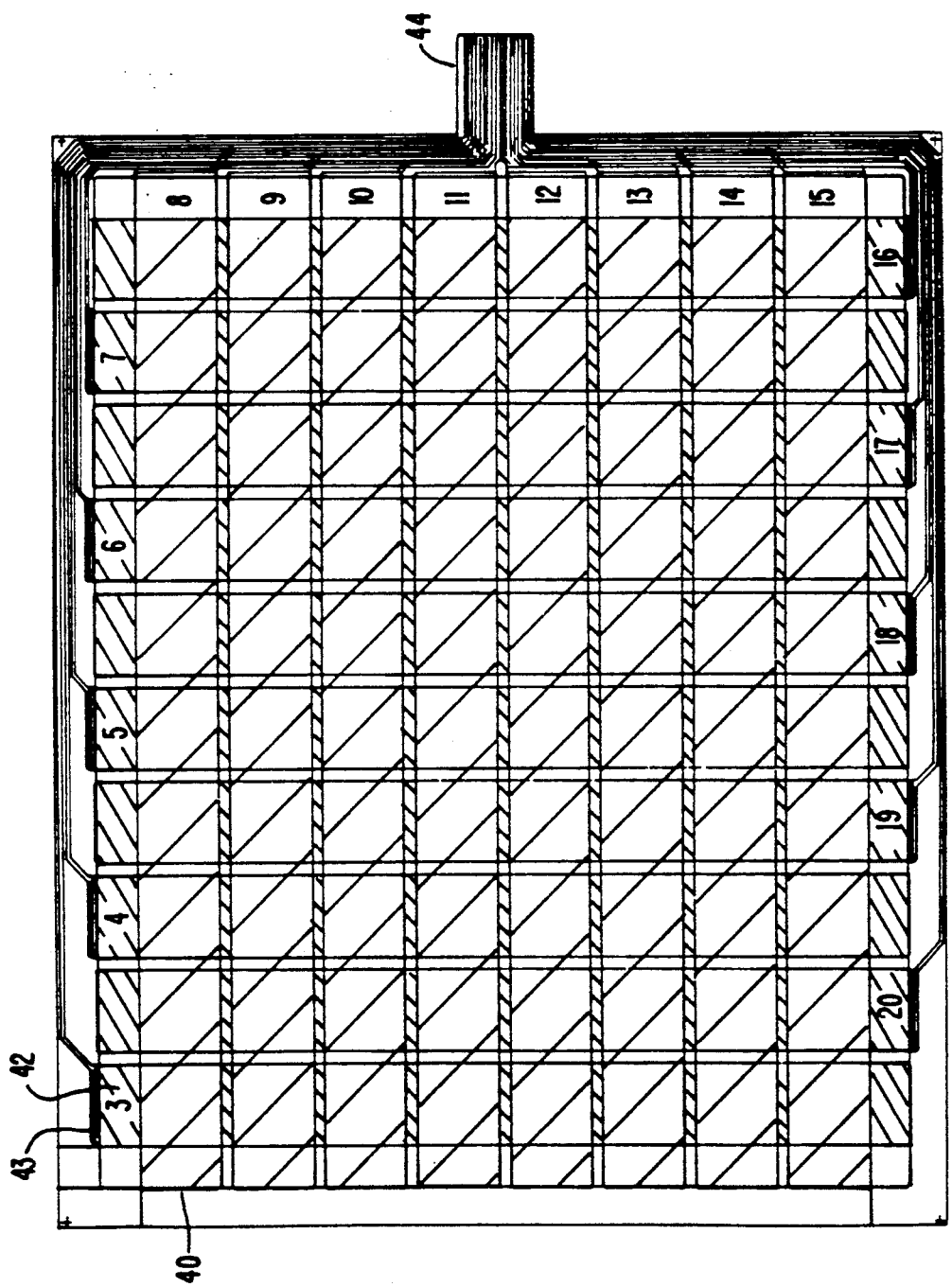
FIG._9.

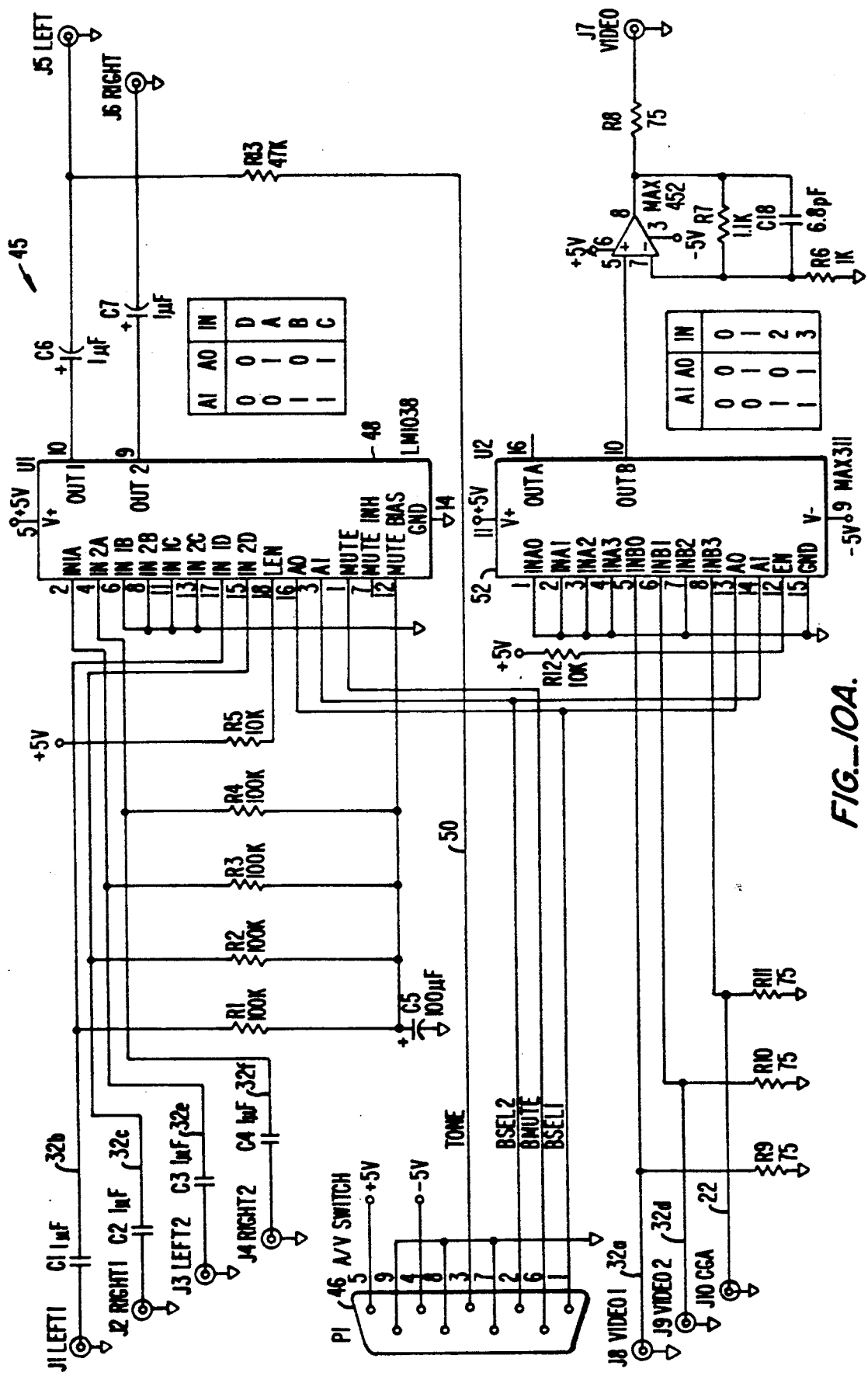
FIG.—10A.

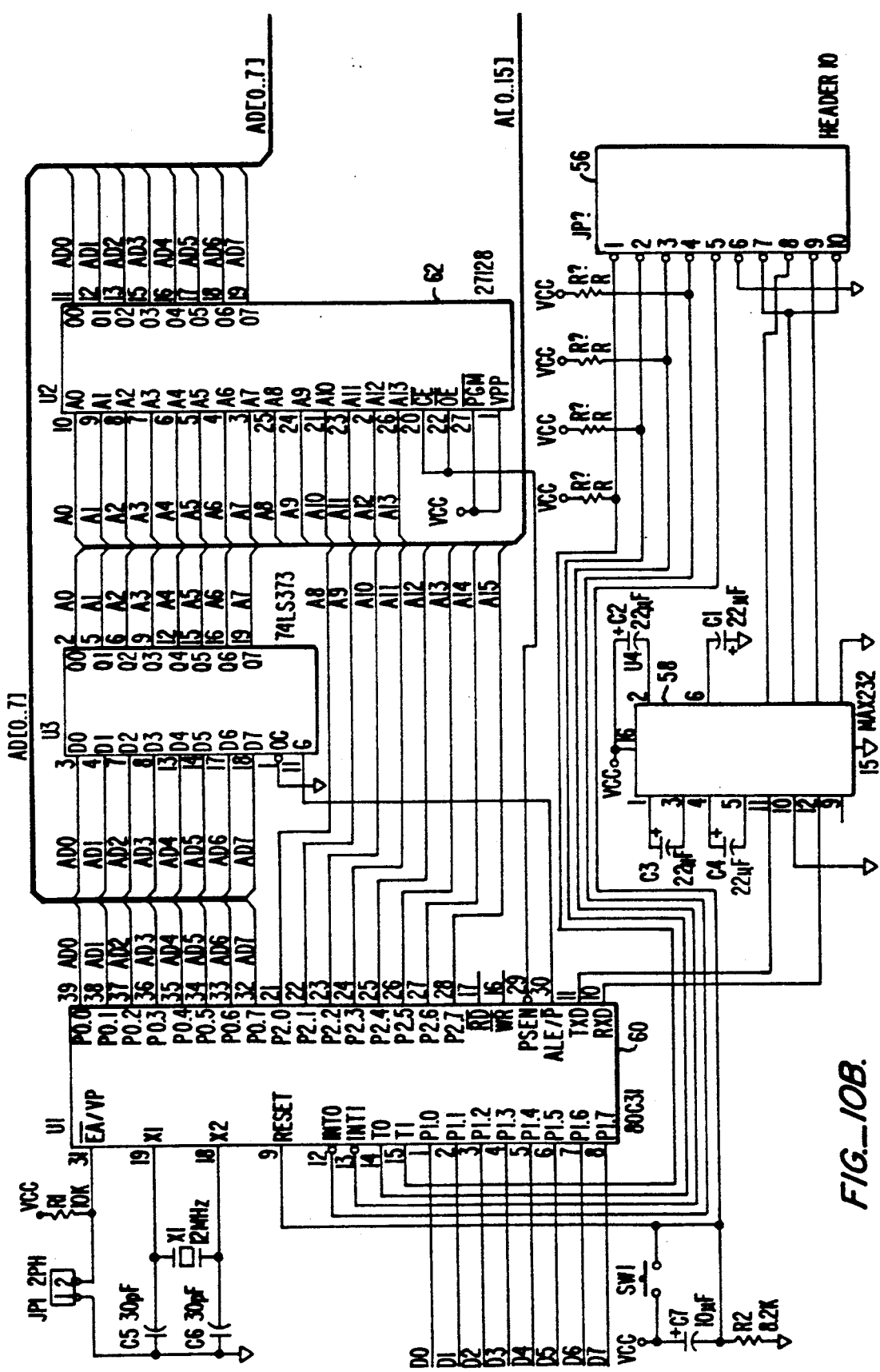
FIG._10B.

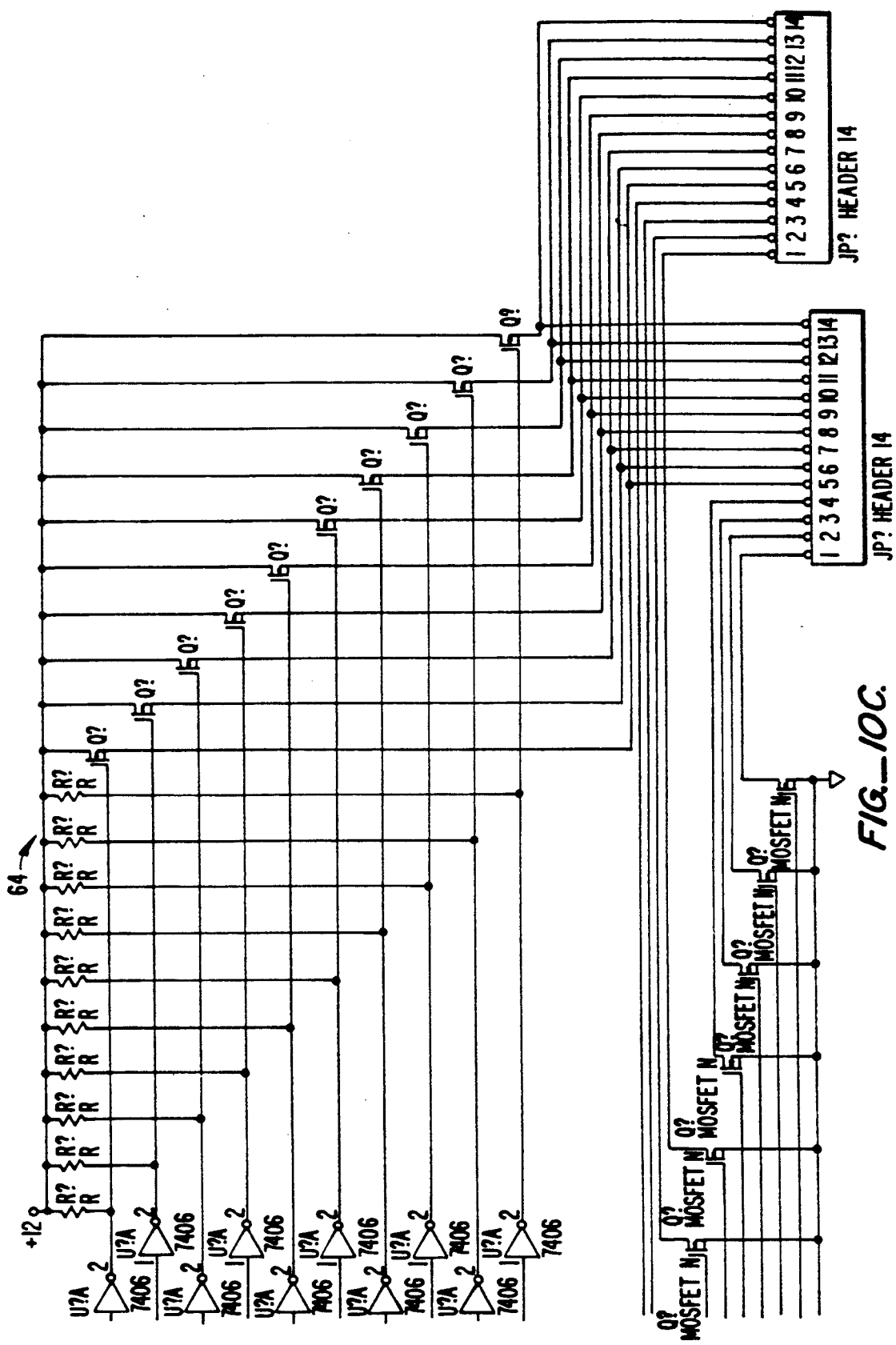
FIG._10C.

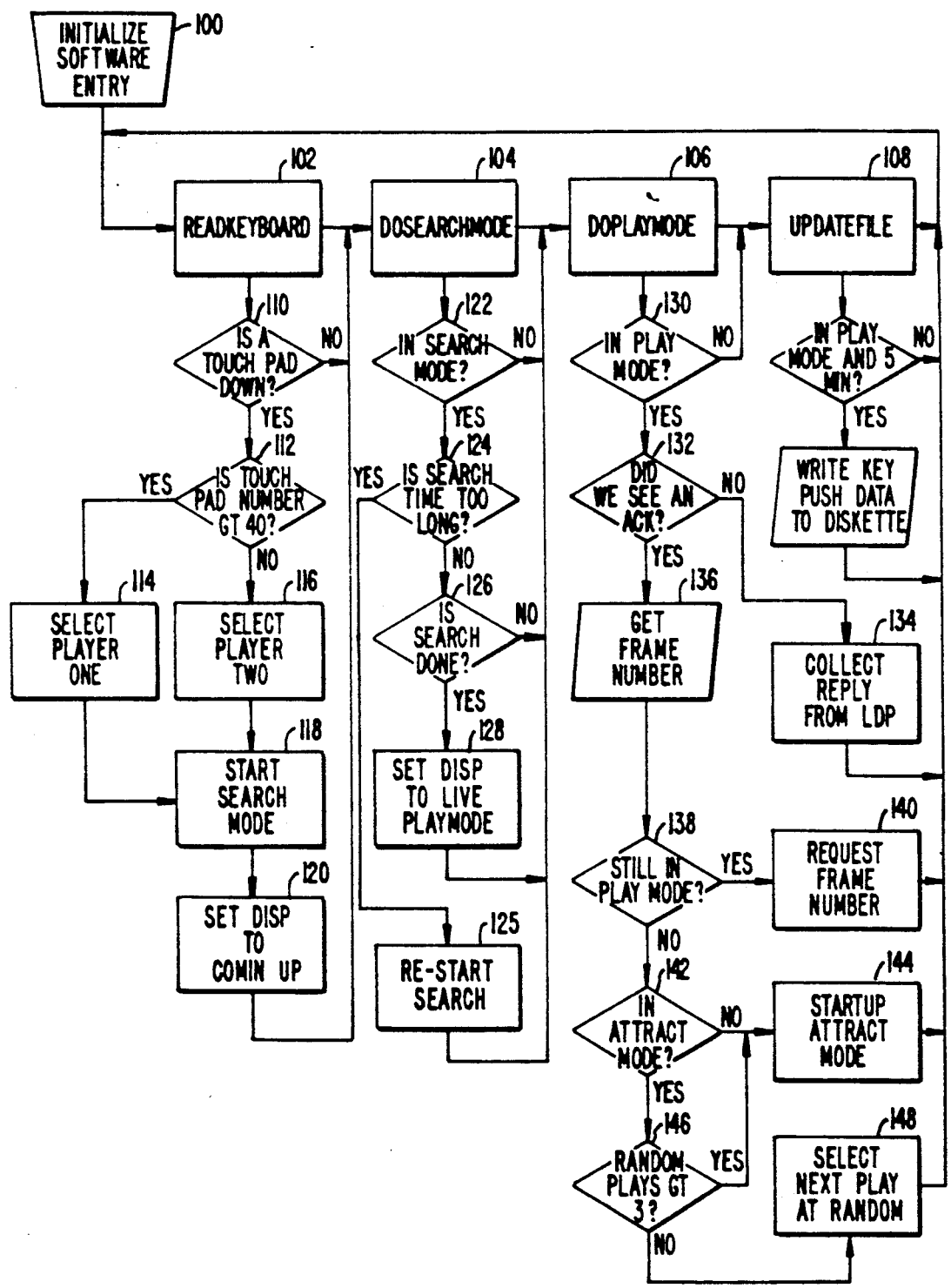
FIG._11.

METHOD AND APPARATUS FOR PREVIEWING RECORDED INFORMATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of audio and video display. More specifically, in one embodiment the invention provides a method and apparatus for presenting a variety of audio and video selections from which a consumer may select and preview one or more of the selections.

Upon entry to a retail store such as a music or video store, a typical consumer is frequently unable to recognize even a small portion of the music or video selections available for purchase or lease. Further, the consumer is often unable to associate particular music or video selections with a particular tape, album, or disc and, consequently, will often purchase a selection which is not the desired selection. In other cases, the consumer will avoid purchasing anything because of the confusion arising from the vast array of available materials.

Various solutions have been proposed to overcome the above problems. For example, a system called the "music sampler" has been used in various music stores. The music sampler provides a computer touch screen which presents one or more menus from which the user selects, for example, the type of music desired. After selection of the desired type of music the user is presented serially with a variety of album selections. For each selection, the user is presented with the choice of continuing to browse or listening to a portion of the album. Presentation of an associated full motion video is not provided.

A variety of problems arise with systems such as the music sampler and other related systems. For example, the systems do not provide simultaneous display of both music and associated "MTV" or other full motion video type presentations. Further, the systems are sometimes slow in presenting a preview to the user. Other systems, particularly those which provide selections serially to the user, require the user to browse through many unwanted selections before reaching a desired selection and, therefore, require the user to invest a great deal of time before previewing a selection in which the user has an interest.

Accordingly, it is seen that an improved method and apparatus for previewing audio and video selections is desired.

SUMMARY OF THE INVENTION

A method and apparatus for previewing music and video selections is provided. The apparatus provides for the simultaneous presentation of an audio selection and an associated full motion video selection. "Full motion video" is intended to mean herein a moving video presentation of actual events, characters, or locations as opposed to still photo presentations or computer generated displays.

A user chooses from a variety of selections by pressing a back-lit switch. The back-lit switches are provided with illustrations of, for example, album covers, which are preferably arranged according to music type. Upon selection by a user, a laser video disc or portion thereof is selected and played back for the user via a video monitor and stereo speakers.

Accordingly, in one embodiment the invention comprises means for storing and playing selected portions of a plurality of audio selections and associated full motion video presentations; display means for indicating to a user the plurality of audio selections; means, connected to the means for indicating, for inputing a first selection from the user and; means connected to the means for inputing for displaying at least a portion of the first selection in audio form while concurrently displaying an associated full motion video presentation from the means for storing and playing. The display means preferably presents a wide variety (e.g. 50 or more) of selections to the user simultaneously.

In another embodiment the invention comprises a backlit translucent keypad array, the keypad array comprising an array of images relating to musical presentations; means for scanning the keypad array to determine when a key is pressed; first and second optical disc players with first and second optical discs, the first optical disc including a first portion of audio selections and video presentations, the second optical disc including a second portion of the audio selections and video presentations; display means for presenting the audio selections and video presentations and; logic means for selecting between the optical disc players and connecting the display means to a selected optical disc player.

A further understanding of the nature and advantages of the inventions herein may be realized by reference to the remaining portions of the specification and the attached drawings.

BRIEF DESCRIPTION OF THE DRAWINGS

FIGS. 1 to 7 illustrate the preview system in isometric, top, front, right side, left side, back, and bottom views respectively;

FIG. 8 is ,an overall electrical block diagram of the preview system;

FIG. 9 is a top view of a keyboard used according to one embodiment of the invention;

FIGS. 10a to 10c illustrate in greater detail an electronic control system according to one embodiment of the invention; and FIG. 11 is a flow chart of the computer software used in a personal computer according to one embodiment of the invention.

DESCRIPTION OF THE PREFERRED EMBODIMENTS

Contents

I. Overall Description
II. Description of Electronics
III. Description of Software
IV. Conclusion I. Overall Description FIG. 1 illustrates a music/video preview display system 2 in an isometric view. The invention herein is illustrated primarily with regard to the presentation of previews of music albums and associated "MTV" type video displays, but it will be understood that the invention is not so limited. For example, the invention herein could be used to present video previews of movies available in home video stores or other retail sales locations. Further, instead of presenting only a preview of the selection, it may be desired in some embodiments to present the entire selection. Still further, the device may be used in, for example, a travel agency to preview various travel destinations. Other variations in operation will be apparent to those in the art.

The preview system is mounted in a cabinet 4. The cabinet may be conveniently constructed of a wide variety of materials including, for example, plastic, wood, metal, fiberboard or the like. The cabinet is provided with a keyboard area 6 and a video display area 8. Recessed into the cabinet or provided in a separate unit and not shown in FIG. 1 will also be speaker grills for presentation of the audio portion of a selected preview.

The keyboard 6 is preferably a partially transparent or translucent sheet or sheets of back-lit plastic. The keyboard is divided into an array of selection illustration regions 10 which may contain, for example, photographic reproductions of album covers or the like. In FIG. 1, the device is illustrated with reference to an array of 80 selections, but it will be apparent that the invention is not so limited as any desired number of selections may be presented to the user, although it will generally be desirable to provide about 50 or more selections. The illustration region may also be backed by a light or lights which are preferably consistently illuminated but which may be flashed when a selection is in play.

The various selections are preferably divided according to music type. Separation of music types may be provided with, for example, different background colors, division lines, or the like. The selections may be provided into, for example, country, rock, classical, video, and other categories.

In operation, a user previews a selection by choosing the selection from the keypad array and pressing the keypad at the location of the selection. Within a few seconds, the preview system plays a portion of the selection in audio form while simultaneously presenting a full motion video segment on the video display 8 via a laser disc player(s).

Variations in the selections presented to the user may be easily provided on, for example, a monthly basis. Music video selections from a wide variety of music labels are collected periodically and segments of such music videos are recorded serially on magnetic tape. Such segments may, for example, be 30 seconds to one minute in length. Identifying text containing, for example, the artist's name, the title of the selection, the recording company, and the like may be imposed on the video image. In addition, a miniature color representation of the product being previewed (e.g., an album cover) may also be imposed on the video image. The tape is then transferred to one or preferably two optical discs for playback. Since this process is relatively straightforward and inexpensive, updated preview discs may be provided at frequent intervals.

II. Description of Electronics

FIG. 8 provides an overall block diagram of the electronic components of the preview system 2. The system is managed and controlled by a digital computer 14 which may be, for example, and IBM PC, PC-XT, PC-AT or compatible computer, preferably equipped with a CGA card of the type known to those of skill in the art. While the invention is illustrated herein by way of reference to the use of a personal computer for management of the system it will be apparent that a wide variety of digital processing devices could be used without departing from the scope of the invention herein. For example, a microprocessor or discrete logic could perform many or all of the functions disclosed herein.

PC 14 is connected to and polls the keypad 6 for input from a user via, for example, a 25 pin M/F connection 16. The system may alternatively scan the keyboard using a separate scanned keyboard controller of the type well known to those of skill in the art (such as those found in conventional personal computers) Such scanned keyboard controllers would provide information to the PC indicating which, if any, of the keypads is depressed at a given time.

The PC is connected to a PC interface 18 via a 9 pin M/M connector 20 and RCA connection 22. The connector 20 is used to transmit control information to and receive control information from the PC while the connection 22 is used as a CGA connection from the PC. The CGA connection from the PC is used to display graphics on a monitor to attract users, and the like.

The PC is also connected to a first video disc player 24 and a second video disc player 26 via 25 pin M/F connectors 28 and 30, respectively. The connections 28 and 30 transmit control information to and from the players 24 and 26 to the PC. Players 24 and 26 provide audio and video output to the interface 18 via RCA's 32a to 32f. Players 24 and 26 may be, for example, a laser disc player such as those manufactured by Sony Corporation and having model no. LDP-1200. Through the use of two players, half of the selections may be place on a first optical disc, while the remaining half may be placed on a second optical disc. This greatly enhances the retrieval time of selections. In some embodiments (in which, for example, 80 selections are provided), the use of two video disc players reduces the time for retrieval of a selection from about 3 to 5 seconds to less than one second.

Video and audio outputs are provided to a monitor 34 via RCA connections 36 and 38, respectively. Monitor 34 may be selected from a wide variety of monitors available in the marketplace including, for example, a 25 inch monitor from Wells Gardner Inc.

Optionally, a product display 37 is provided. The product display includes a plurality of product slots 39. Preferably, one slot is provided for each selection displayed on the keypad. When the user presses the keypad, the corresponding slot in the product display is illuminated while the preview is played via logic in the PC 14 and the electronics shown in FIGS. 10b and 10c.

FIG. 9 illustrates in top view a keypad according to one embodiment of the invention. Although not shown, the keypad is overlain by a removable sheet of plastic, Mylar or the like containing illustrations of record albums or video tapes available for selection. Row's 40 and columns 42 of translucent materials are laid in a checkerboard pattern on the keypad. Each row and column is connected via a wire or metallic trace 43 to a central connection 44 which may be, for example, a 20 pin berg connector. When a pad is depressed, a voltage increase is provided on the wires of the metallic trace of both the row and the column associated with the pad. By sequentially polling each row and column of the keypad for a voltage increase, it is possible to determine which of the pads has been depressed.

FIGS. 10a to 10c illustrate the components of the interface 18 in greater detail. In particular, in FIG. 10a an audio/video switch 45 is illustrated for regulating output from each of the video disc players and the PC CGA card to the video display. The audio/video switch regulates output of the various video inputs based on inputs 46 from the PC. The switch regulates video line 32a from the first video disc player, video line 32d from the second video disc player, and CGA input line 22 from the PC. The switch additionally regulates audio input lines 32b, 32c, 32e, and 32f from the laser disc players. Additionally, a tone may be provided by the PC to, for example, the left speaker at the direction of the PC software via line 50.

The audio lines are regulated by way of an audio multiplexer 48. Based on the input signals BSEL1, BMUTE, and BSEL 2, the multiplexer chooses the left, right, or no inputs for output to the speaker. Similarly, the video inputs are regulated with video multiplexer 52 by way of the BSEL1 and BSEL2 signals from the PC so as to choose the first or second video disc player or the CGA card of the PC.

FIGS. 10b and 10c illustrate a light controller 54 according to one embodiment of the invention. The light controller lights selected lights on an optional product display. The product display includes an array of slots into which the previewable products are placed. Each slot is separately illuminated based on input from header 56 and communication link 58. Lights are selectively illuminated by control of microcontroller 60 with data provided from EPROM 62 based on the specific button which is pressed on the keypad and via the transistor array 64 as shown in FIG. 10c. As will be apparent to those of skill in the art, scanning of the keyboard as well as many other functions could be handled by the microcontroller 60.

III. Description of Software

Appendix 1 (©, 1989, Tallon Foods Corporation d/b/a PICS Previews) is a source code listing in "C" of a program used in the PC 2 according to one embodiment of the invention. While a "C" program is used for the purposes of illustration herein it will be apparent to those of skill in the art that a variety of programming languages could be used without departing from the scope of the invention. Appendix 2 (©, copyright 1989, Tallon Foods Corporation d/b/a PICS Previews is an assembly language program for the 8051 (80C31) microcontroller illustrated in FIG. 10b.

Specifically, Appendix 1 includes the main PC program, a display which is displayed while the system is booting up, the PC light drivers for the 8051 chip, and the definition file for the PC program. Appendix 2 contains 8051 code for driving the lights in the product display and the like.

FIG. 11 is an overall flow chart of the program provided in Appendix 1.

After an initialization step 100, the program circulates through four major functions including a keypad reading function 102, a searching function 104, a play function 106, and a file update function 108.

In the keypad reading function 102 the program first tests to determine if a keypad is depressed at step 110 and, if so the number of the depressed key is read from the scanned keypad controller. The number of a depressed keypad is tested to determine if it is greater than, for example, 40 at step 112 (in the case of a 10x8 keypad) and, if so, player number 1 is selected at step 114. If, however, the number of the keypad is less than 40, the second player is selected at step 116. Regardless of which player is selected, at step 118 the PC begins a search mode in the selected player and, in the meantime, the video display is provided with an appropriate indication that the selection will be played momentarily at step 120.

The program then enters search mode 104 during which time the appropriate selection is located on the optical disc using means well know to those of skill in the art. A test is conducted at step 122 to determine if the device is in the search mode. If not, the program proceeds on to the play mode. If the program is in the search mode, a test 124 is conducted to determine if the device has been in the search mode for a selected period of time and, if so, the search mode is restarted at step 125 (by re-circulating through the relay, file update and read keyboard steps, each of which will be by passed). If the search mode has not been conducted for a significant period of time the player is tested at step 126 to determine if the search is done. If not, the program goes to the play function. If the search is done, the display is set to an active mode at step 128 and the program goes on to the play mode 106.

In the play function 106, a test 130 is first conducted to determine if the program is in the play mode. If not, the program proceeds to the file update function 108. If the device is in the play mode a test is performed at step 132 to determine if an acknowledge has been received from the LDP (Laser Disc Player). If not, at step 134 a reply from the laser disc player is collected. If so, at step 136 the frame number is obtained from the optical disc and a test is conducted at step 138 to determine if the program is still in the play mode. If so, the frame number is requested from LDP at step 140 and the program recycles to the beginning of the program.

If the program is no longer in the play mode a test is made at step 142 to determine if the program is in the attract mode, i.e. in a mode to display an appropriate video and/or audio selection to attract potential users. If not, the attract mode is initiated at step 144 and the program returns to the beginning. If the program was previously in the attract mode, the program initiates one of the players to display selections at random at step 146 and tests to determine if the number of random plays has been greater than 3. If the number of random plays has been less than 3, another random play is made at step 148. When 3 random plays have been made, the program returns to the attract mode.

IV. Conclusion

The present invention provides a greatly improved method and apparatus for displaying audio and associated video previews. It is to be understood that the above description is intended to be illustrative and not restrictive. Many variations of the invention will become apparent to those of skill in the art upon review of this disclosure. Merely by way of example, the invention has been illustrated primarily with regard to the presentation of record albums and associated video, but the invention is not so limited. For example, the invention could readily find application in the presentation of movie previews at video stores and the like. By way of further example, the invention could be used as a "travel locator" in which a user is presented with a variety of travel destinations and wherein the audio and video presentations depict audio and video highlights of the travel destination. The scope of the invention should, therefore, be determined not with reference to the above description, but instead should be determined with reference to the appended claims along with their full scope of equivalents.

APPENDIX 1

Preview System PC Source Code © Copyright, 1989, Tallon Foods Corporation d/b/a PICS Previews. All Rights Reserved.

```
Mon 09-18-89 12:27:45      i        CONTENTS
                                    Page   Line 09-18-89 12:13:00
PICS.C                               1      1
PICS.C          comment              1     30
PICS.C          delay                3    104
PICS.C          WaitForReply         3    120
PICS.C          InitSony             3    136
PICS.C          Num_2_LDP            4    199
PICS.C          Minute               5    210
PICS.C          Second               5    219
PICS.C          Date                 5    228
PICS.C          InitScreen           5    238
PICS.C          InitCom              5    252
PICS.C          WriteFile            6    275
PICS.C          InitCount            6    292
PICS.C          Play                 7    316
PICS.C          Search               7    331
PICS.C          RepeatSearch         7    345
PICS.C          CheckSearchTime      8    368
PICS.C          ReadKeyboard         8    380
PICS.C          DoSearchMode         9    412
PICS.C          DoPlayMode          10    451
PICS.C          UpdateFile          11    541
PICS.C          main                12    565
PICS.C          proc                13    626
PICS.C                              13    636

09-18-89 12:13:00    PICS.C                                     Pg   1
Mon 09-18-89 12:27:45                comment                        of  13
                                                                    1-51

/**********************************************************************
***

=====       ===    =====   =====               =====
         =     =     =      =       =      =            =
         =     =     =      =       =                   =
         ======      =      =       =====               =
         =           =      =       =           ===     =
         =           =      =   =   =      =    ===     =        =
         =           ===    =====   =====       ===     =====

Version / Revision History:

7/28/89, v1.6, Marc Yaxley, mod'd for light drivers.
         8/13/89, v2.0, Marc Yaxley, convert to 'C language'.

**********************************************************************
**/ define VERSION        "2.0"
         #define RELEASE        "MV"         /* M=music */ /* V=video */

/*                              11111111112222222222    */
         /*      Allowed 30 char: 012345678901234567890123456789 */
         #define M_MESSAGE      "TOUCH ANY ALBUM--SEEITS VIDEO "
         #define V_MESSAGE      "TOUCH ANY VIDEO--SEEA PREVIEW "
```

```c
#pragma comment( lib,"comm_s.lib" )

#include <stdio.h>
#include <ctype.h>
#include <graph.h>
#include <dos.h>
#include <bios.h>
#include "comm.h"
#include "sony.h"

#define FALSE    0
define TRUE     -FALSE define UPDATE_INTERVAL 5       /* waw 5 in PAS version    */
define WAIT_TIME       10      /* was 1500 in PAS version */
#define MAXRAND         64      /* maximum selection number played at
 random */

/* ****************************************************************
 *** */

INT     Version       = 'M';            /* NOTE the default is music */
```

```
            INT       KeyOffset     = 0;               /* NOTE the default is top row
            */
            CHAR      Mus_Message[32] = { M_MESSAGE };
            CHAR      Vid_Message[32] = { V_MESSAGE };

CHAR      CurDate[10];
            CHAR      FileName[14];
            CHAR      LastFrame[10];
            CHAR      date_out[10];
            INT       Attract, Timeout, NewCount, ACKFlag, SearchMode;
            INT       Counts[ 99 ];
            INT       CurMinute, CurSecond;
            INT       ETime, Last1Search, Last2Search, SearchTime;
            INT       CurPlayer, AltPlayer, ErrCode;
            INT       RStart, RAttract, KeyNumb;
            INT       DoomsDay = 6;        /* reset for 1 min. cycling */

INT       BUG_COUNT = 0;       /***** Count things during buggin'
            *****/

1   +--CHAR    *StartFrame[91] = {
1   |                   /*
1   |                   *   bogus entry, real ones start at 1
1   |                   */
1   |         "00000",
1   |                   /*
1   |                   *   selections, all 80 of 'em
1   |                   */
1   |         "00001", "01051", "02101", "03151", "04201", "05251",
1   |         "06301", "07351", "08401", "09451", "10501", "11551",
1   |         "12601", "13651", "14701", "15751", "16801", "17851",
1   |         "18901", "19951", "27001", "28051", "29101", "30151",
1   |         "31201", "32251", "33301", "34351", "35401", "36451",
1   |         "37501", "38551", "39601", "40651", "41701", "42751",
1   |         "43801", "44851", "45901", "46951", "00001", "01051",
1   |         "02101", "03151", "04201", "05251", "06301", "07351",
1   |         "08401", "09451", "10501", "11551", "12601", "13651",
1   |         "14701", "15751", "16801", "17851", "18901", "19951",
1   |         "27001", "28051", "29101", "30151", "31201", "32251",
1   |         "33301", "34351", "35401", "36451", "37501", "38551",
1   |         "39601", "40651", "41701", "42751", "43801", "44851",
1   |         "45901", "46951",
1   |                   /*
```

```
1 |        *       attract screen(s)
1 |        */
1 |   "21001", "22501", "24001", "25501", "25501",
1 |   "25501", "25501", "25501", "25501", "25501"
  +--};

/* *****************************************************************
        *** */

/*
      *             Timed clock delay, each 'x' uses 18 mSec.
      */
     09-18-89 12:13:00  PICS.C                                          Pg   3
 Mon 09-18-89 12:27:45         delay                                    of  13
                                                                        104-155 delay( INT x )
1 +--{
.1 |  LONG    final;
1 |  LONG    current;
1 |  _bios_timeofday( _TIME_GETCLOCK,&final );
1 |  final += (LONG)x;                /* calc. ending time */
2 |+--DO{ _bios_timeofday( _TIME_GETCLOCK,&current );
1 |+--} WHILE( current < final );
  +--}

/* *****************************************************************
        *** */
     #include "comin.h"      /***** comin up screen graphics  ********/
     #include "scan.h"       /***** keyboard scanning modules ********/
     #include "lights.h"     /***** lights driver modules     ********/
     /* *****************************************************************
        *** */

CHAR     WaitForReply( INT Port, INT Time )
1 +--{
2 |+--FOR( Timeout = FALSE; Time > 0; --Time ){
2 ||   IF( async_rxcnt( Port ) > 0 ) RETURN( async_rx( Port ) & 255 );
2 ||   delay( 1 );           /* delay ~50 ms */
1 |+--}
1 |  Timeout = TRUE;
1 |  Video_Switch( SEL_CGA );
1 |  printf("\n  Timeout occured on Player %d\n",Port+1 );
1 |  printf("\n CHECK CONNECTIONS & RESET COMPUTER.\n");
1 |  exit(0);
  +--}

/* *****************************************************************
        *** */

VOID     InitSony()
1 +--{
1 |  INT  i;
1 |  INT  Port = COM1;
1 |  CHAR reply;
2 |+--DO (
2 ||   printf(" Initializing SONY DISC Player #%d...\n",Port+1 );
2 ||   async_rxflush( Port );
3 ||+--DO ( async_tx( Port, _CLEAR_ALL );
2 ||+--} WHILE( WaitForReply( Port, WAIT_TIME ) != _ACK );
3 ||+--DO{
3 |||   async_tx( Port, _STATUS_INQ );
3 |||   reply = WaitForReply( Port, WAIT_TIME );
4 |||+--IF( !Timeout ){
4 ||||   WaitForReply( Port,WAIT_TIME ); WaitForReply( Port,WAIT_TIME );
4 ||||   WaitForReply( Port,WAIT_TIME ); WaitForReply( Port,WAIT_TIME );
3 |||+--}
2 ||+--} WHILE( ( reply & 0xbc ) != 0x80 );
2 ||
2 ||   async_tx( Port, _INDEX_OFF );     WaitForReply( Port, WAIT_TIME );
```

```
  2 ||   async_tx( Port, _FRAME_MODE );          WaitForReply( Port, WAIT_TIME );
  2 ||
 .2 ||         /*   Store message in laser disc player to be turned
  2 ||              on during certain times in the attract mode     */
  2 ||
  2 ||
  2 ||   async_tx( Port, _USER_INDEX_CONTROL);WaitForReply( Port, WAIT_TIME );
  2 ||   async_tx( Port, _UIC_DISPLAY_MODE); WaitForReply( Port, WAIT_TIME );
  2 ||   async_tx( Port, 0x3E );             WaitForReply( Port, WAIT_TIME );
  2 ||   async_tx( Port, 0x2F );             WaitForReply( Port, WAIT_TIME );
  2 ||   async_tx( Port, 0x30 );             WaitForReply( Port, WAIT_TIME );
  2 ||   async_tx( Port, _USER_INDEX_CONTROL);WaitForReply( Port, WAIT_TIME );
  2 ||   async_tx( Port, _UIC_SET_WINDOW);   WaitForReply( Port, WAIT_TIME );
  2 ||   async_tx( Port, 0x00 );             WaitForReply( Port, WAIT_TIME );
  2 ||   async_tx( Port, _USER_INDEX_CONTROL);WaitForReply( Port, WAIT_TIME );
  2 ||   async_tx( Port, _UIC_STORE_CHAR);   WaitForReply( Port, WAIT_TIME );
  2 ||   async_tx( Port, 0x00 );             WaitForReply( Port, WAIT_TIME );
  2 ||
  2 ||         /*
  2 ||          *    send the message string here...
  2 ||          */
  2 ||
  3 ||+--IF( Version == 'V' ){
  4 ||||+--FOR( i=0; i < strlen( Vid_Message ); ++i ){
  4 ||||   async_tx( Port, Vid_Message[i] );
  4 ||||   WaitForReply( Port, WAIT_TIME );
  3 |||+--}
  2 ||+--}
  3 ||+--ELSE{
  4 |||+--FOR( i=0; i < strlen( Mus_Message ); ++i ){
  4 ||||   async_tx( Port, Mus_Message[i] );
  4 ||||   WaitForReply( Port, WAIT_TIME );
  3 |||+--}
  2 ||+--}
  2 ||   async_tx( Port, _UIC_END);          WaitForReply( Port, WAIT_TIME );
  2 ||
  2 ||   IF( Port == COM2 ) RETURN;          /* all done, get out of here */
  2 ||   IF( Port == COM1 ) Port = COM2;     /* do next port...   */
  1 |+--} WHILE( TRUE );
    +--}

/* *****************************************************************
    *** */

INT    Num_2_LDP(      INT Port,       CHAR *s            )
  1 +--{
  1 |  async_tx( Port, *s++ );
  1 |  async_tx( Port, *s++ );
  1 |  async_tx( Port, *s++ );
  1 |  async_tx( Port, *s++ );
  1 |  async_tx( Port, *s   );
    +--}

/* *****************************************************************
    *** */
```

```
        INT    Minute()
 .1 +--{
  1 |  STRUCT dostime_t      time_info;
  1 |  _dos_gettime( &time_info );
  1 |  RETURN( (INT)time_info.minute );
    +--}

/* *****************************************************************
    *** */
```

```
        INT     Second()
1  +--(
1  |  STRUCT  dostime_t        time_info;
1  |  _dos_gettime( &time_info );
1  |  RETURN( (INT)time_info.second );
   +--)

/* ***********************************************************
         *** */

CHAR    *Date()
1  +--(
1  |  STRUCT  dosdate_t        di;
1  |  _dos_getdate( &di );
1  |  sprintf( date_out,"%02u%02u%02u", di.month,di.day,di.year-1900 );
1  |  RETURN( &date_out[0] );
   +--)

/* ***********************************************************
         *** */

INT             InitScreen()
1  +--(
1  |  _setvideomode( _MRES4COLOR );
1  |  /*Palette(2);*/
1  |  printf("\n");
1  |  printf("    *****  The Retail Network   ***** \n");
1  |  printf("\n");
1  |  printf("          Version %s, Rel. %s\n",VERSION,RELEASE);
1  |  printf("\n");
1  |  printf(" Power on self test complete.\n");
   +--)

/* ***********************************************************
         *** */

INT             InitCom()
1  +--(
1  |  INT     ErrCode;
1  |  printf("\n Initializing COM port #1, " );
1  |  ErrCode = async_open( COM1,"1200N81", 128,896 );
1  |  IF( ErrCode == R_OK ) printf("OK" );
1  |  ELSE    GOTO Com_Fail_To_Open;
1  |

09-18-89 12:13:00  PICS.C                                          Pg   6
Mon 09-18-89 12:27:45           WriteFile                             of  13
                                                                     260-309

1  |  printf("\n Initializing COM port #2, " );
1  |  ErrCode = async_open( COM2,"1200N81", 128,896 );
.1 |  IF( ErrCode != R_OK ) GOTO Com_Fail_To_Open;
1  |  ELSE    printf("OK" );
1  |  RETURN;
1  |
1  |  Com_Fail_To_Open:
1  |  printf("FAIL!\n\n Error opening COM Port. ErrCode=%02x\n\n", ErrCode );
1  |  printf(" HARDWARE ERROR DETECTED ON PORT.\n" );
1  |  printf(" HIT RESET ON COMPUTER TO RETRY.\n");
1  |  exit(0);
   +--)

/* ***********************************************************
         *** */

INT     WriteFile( CHAR *Name )
1  +--(
1  |  INT     i;
1  |  FILE    *Fo;
1  |  Fo = fopen( Name,"w" );
2  |+--IF( Fo != NULL ){
2  ||   FOR( i = 1; i < 81; i++ ) fprintf( Fo," #%02u  %05d\n",i, Counts[i] );
```

```
2  ||  fclose( Fo );
1  |+--)
   +--)

/* *********************************************************************
         ** */
      /*           Init the count array
            */
      /* *********************************************************************
         ** */

INT        InitCount()
1  +--(
1  |  INT         i,j;
1  |  FileName[ 0 ] = 'S';
1  |  FileName[ 1 ] = '\0';
1  |  /*strcat( FileName, Date() );*/
1  |  strcat( FileName,CurDate );
1  |
2  |+--IF( access( FileName,6 ) != 0 ){  /*  create array if file does not
   ||     exist */
2  ||    FOR( i = 1; i < 81; i++ ) Counts[ i ] = 0;
2  ||    WriteFile( FileName );
1  |+--}
2  |+--ELSE {                            /*  read file if it does exist   */
2  ||    FILE   *Fi;
2  ||    Fi = fopen( FileName,"r" );
2  ||    FOR( i = 1; i < 81; i++ ) fscanf( Fi," #%d %d",&j,&Counts[i] );
2  ||    fclose( Fi );
1  |+--}
```

```
   +--)

/* *********************************************************************
         *** */
      /*  Procedure to begin to play in forward, normal speed
            */
      /* *********************************************************************
         *** */

INT        Play( INT Port )
1  +--(
1  |  Video_Switch( (Port==COM1)? SEL_1: SEL_2 );
1  |  IF( Attract && (RAttract != 1) )         async_tx( Port,_USER_INDEX_ON );
1  |  ELSE           async_tx( Port,_USER_INDEX_OFF );
1  |  WaitForReply( Port, WAIT_TIME );
1  |  async_tx( Port,_CLEAR_ALL );
1  |  async_rxflush( Port );
1  |  async_tx( Port,_FWD_PLAY );
   +--)

/* *********************************************************************
         *** */
      /*  Procedure to search to a specified selection
            */
      /* *********************************************************************
         *** */

INT        Search( INT Port,  INT Sel )
1  +--(
1  |  IF( Port == COM1 ) Last1Search = Sel; ELSE Last2Search = Sel;
1  |  async_tx(       Port,_CLEAR_ALL       );
1  |  async_rxflush(  Port                  );
1  |  async_tx(       Port,_SEARCH          );
1  |  Num_2_LDP(      Port, StartFrame[ Sel ] );
1  |  async_tx(       Port,_ENTER           );
   +--)
```

```
      /* ******************************************************************
      *** */
      /* Procedure to repeat last searches
         */
      /* ******************************************************************
      *** */
      INT          RepeatSearch()
1  +--(
2  |+--IF( --DoomsDay == 0 ){         /* count down to dooms day point */
2  ||   async_restart( COM1 );  /* re-init. both com ports  */
2  ||   async_restart( COM2 );
2  ||   Beep(); delay( 10 ); Beep(); delay( 10 ); Beep();
2  ||
2  ||   #if 0
2  ||   printf("\rRe-INIT & Repeat Search: %4u  ", BUG_COUNT++ );
2  ||   #endif
2  ||
2  ||   DoomsDay = 6;              /* reset for 1 min. cycling */
1  |+--}
.1 |   Search( COM1,Last1Search );
1  |   Search( COM2,Last2Search );
1  |   SearchTime   = 0;
1  |   ACKFlag      = FALSE;
   +--}
      /* ******************************************************************
      *** */
      /* Procedure to begin to play in forward, normal speed
         */
      /* ******************************************************************
      *** */
      INT          CheckSearchTime()
1  +--(
2  |+--IF( CurSecond != Second() ){
2  ||   CurSecond = Second();
2  ||   IF( ++SearchTime > 9 ) RepeatSearch();
1  |+--}
   +--}

/* ******************************************************************
      *** */
      /*                    READ KEYBOARD
         */
      /* ******************************************************************
      *** */
      INT          ReadKeyboard()
1  +--(
2  |+--IF( Key() ){
2  ||   Beep();
2  ||   Attract    = FALSE;
2  ||   SearchMode = TRUE;
2  ||   SearchTime = 0;
2  ||   ACKFlag    = FALSE;
2  ||   strcpy( LastFrame,"00000");
3  ||+--IF( KeyNumb < 41 ){
3  |||   CurPlayer    = COM1;
3  |||   AltPlayer    = COM2;
2  ||+--}
3  ||+--ELSE {
3  |||   CurPlayer    = COM2;
3  |||   AltPlayer    = COM1;
2  ||+--}
2  ||   Video_Switch( SEL_CGA );
2  ||   my_change_to_lamp( KeyNumb );
2  ||   Search( CurPlayer, KeyNumb );
2  ||   IF( ++RStart > 3 ) RStart = 0;
2  ||   Search( AltPlayer, 81+RStart );
1  |+--}
   +--}
```

```
/* ****************************************************************
 *** */
/*                     SEARCH MODE
    */
/* ****************************************************************
 *** */
/*  If in search mode, must receive at least 1 ACK before completion
    code */
/*  After completion code is received, start to play the selected
    video   */
/*  and turn off search mode.  Play mode will then wait for it to
    stop.   */

INT        DoSearchMode()
1  +--(
1  |  CHAR     reply;
2  |+--IF( SearchMode ){
2  ||   CheckSearchTime();
3  ||+--IF( ACKFlag ){
4  |||+--IF( async_rxcnt( CurPlayer ) > 0 ){
4  ||||   reply = async_rx( CurPlayer );
5  ||||+--IF( reply == _COMPLETION ){
5  |||||   SearchMode   = FALSE;
5  |||||   ACKFlag      = FALSE;
5  |||||   Play( CurPlayer );
6  |||||+--IF( KeyNumb < 81 ) {
6  ||||||   ++Counts[ KeyNumb ];    /* count all that are user selected */
6  ||||||   NewCount = TRUE;
5  |||||+-- )
5  |||||   WaitForReply( CurPlayer, WAIT_TIME );
5  |||||   async_tx( CurPlayer, _ADDR_INQ );
5  |||||   DoomsDay = 6;                    /* set for 1 min. cycle */
4  ||||+-- )
3  |||+-- )
2  ||+-- )
3  ||+--ELSE {
4  |||+--IF( async_rxcnt( CurPlayer ) > 0 ){
4  ||||   reply = async_rx( CurPlayer );
4  ||||   ACKFlag = ( reply == _ACK ) ? TRUE: FALSE;
3  |||+-- )
2  ||+-- )
1  |+-- )
   +-- )

/* ****************************************************************
 *** */
/*                     PLAY MODE
    */
/* ****************************************************************
 *** */
/*      If not in search mode, must be in play mode
    */
/*   Wait until player reaches the end of the current video
    */
/*   then go into Attract mode, if not already there.  Play 1 Attract
```

```
    */
/*   video followed by 3 selections at random (1 to 64 only)
    */

INT        DoPlayMode()
1  +--(
1  |  REGISTER       INT    i,j,k;
1  |  CHAR     reply;
```

```
1  |   CHAR     Frame[8];
2  |+--IF( !SearchMode ){       /*      are we in PLAY or SEARCH mode? */
2  ||  delay( 0 );
3  ||+--IF( ACKFlag ){
3  |||      /*
3  |||       * here we check for 5 char's waiting on input.
3  |||       * if there are 5 read 'em into Frame
3  |||       */
4  |||+--IF( async_rxcnt( CurPlayer ) >= 5 ){
4  ||||   Frame[0] = async_rx( CurPlayer );
4  ||||   Frame[1] = async_rx( CurPlayer );
4  ||||   Frame[2] = async_rx( CurPlayer );
4  ||||   Frame[3] = async_rx( CurPlayer );
4  ||||   Frame[4] = async_rx( CurPlayer );
4  ||||   Frame[5] = '\0';
4  ||||   j = atoi( &Frame[ 1 ] );
4  ||||   i = atoi( &LastFrame[ 1 ] );
4  ||||
5  ||||+--IF( Frame[0] != LastFrame[0] ){ /* not right frame, keep looking */
5  |||||   strcpy( LastFrame, Frame );
5  |||||   async_tx( CurPlayer,_ADDR_INQ ); /* keep asking for Frame # */
4  ||||+--}
5  ||||+--ELSE {                           /* 1st digit of frame compares... */
   |||||    */
6  |||||+--IF( j == i ){           /* now compare rest of number */
6  ||||||   Video_Switch( SEL_BLACK );
6  ||||||   SearchMode = TRUE;
6  ||||||   SearchTime = 0;
6  ||||||   ACKFlag    = FALSE;
6  ||||||   i          = CurPlayer;
6  ||||||   CurPlayer  = AltPlayer;
6  ||||||   AltPlayer  = i;
6  ||||||   KeyNumb    = 90;
7  ||||||+--IF( Attract ){
8  |||||||+--IF( ++RAttract > 4 ){
8  ||||||||   RAttract = 1;
8  ||||||||   my_change_to_lamp( 99 );         /* no lights on! */
8  ||||||||   Search( CurPlayer, 81+RStart );  /* go to ATTRACT screen */
8  ||||||||   IF( ++RStart > 3 ) RStart = 0;
7  |||||||+--}
8  |||||||+--ELSE {
8  ||||||||   k = ( rand()&63 ) + 1;   /* get a number from 1 to 64 */
9  ||||||||+--IF( k < 41 ) {
9  |||||||||   CurPlayer = COM1;
9  |||||||||   AltPlayer = COM2;
8  ||||||||+--}
9  ||||||||+--ELSE {
9  |||||||||   CurPlayer = COM2;
9  |||||||||   AltPlayer = COM1;
.8 ||||||||+--}
8  ||||||||   my_change_to_lamp( k );     /* show selection */
8  ||||||||   Search( CurPlayer,k );
7  |||||||+--}
6  ||||||+--}
7  ||||||+--ELSE {
7  |||||||   my_change_to_lamp( 99 );     /* no lights on! */
7  |||||||   Search( CurPlayer, 81+RStart );
7  |||||||   Attract  = TRUE;
7  |||||||   RAttract = 1;
6  ||||||+--}
6  ||||||   Search( AltPlayer,81 );        /* find ATTRACT screen.. */
5  |||||+--}
6  |||||+--ELSE {
6  ||||||   strcpy( LastFrame,Frame );     /* simply save frame # */
6  ||||||   async_tx( CurPlayer,_ADDR_INQ ); /* and ask for next one */
5  |||||+--}
4  ||||+--}
```

```
3   |||+--}
3   |||  DoomsDay = 6;                              /* set for 1 min. cycle */
2   ||+--}
3   ||+--ELSE {
4   |||+--IF( async_rxcnt( CurPlayer ) > 0 ){       /* reply char. availible?
    ||||     */
4   ||||  reply = async_rx( CurPlayer );            /* yep, get it    */
4   ||||  ACKFlag = ( reply == _ACK ) ? TRUE: FALSE;
3   |||+--}
2   ||+--}
1   |+--}
    +--}

/* ***********************************************************************
       *** */
    /*       Update file of counts if needed
       */
    /* ***********************************************************************
       *** */
    /*   Count file is updated only at certain time intervals because the
       */
    /*   disk drive is slow and we could miss key presses.  It is also
       only   */
    /*   updated in then Attract mode, so there is less chance of it
       */
    /*   happening when someone is trying to press a key
       */

INT        UpdateFile()
1   +--{
2   |+--IF( !SearchMode ){
3   ||+--IF( CurMinute != Minute() ) {
3   |||  CurMinute = Minute();
4   |||+--IF( ( ++ETime >= UPDATE_INTERVAL ) && Attract ) {
4   ||||  ETime = 0;
```

```
5   ||||+--IF( NewCount ){
5   |||||  WriteFile( FileName );
5   |||||  NewCount = FALSE;
4   ||||+--}
5   ||||+--IF( strcmp( CurDate,Date() ) != 0 ) {
5   |||||  strcpy( CurDate, Date() );
5   |||||  InitCount();
4   ||||+--}
3   |||+--}
2   ||+--}
1   |+--}
    +--}

/* ***********************************************************************
       *** */
    /*       Start of main program
       */
    /* ***********************************************************************
       *** */ main( INT argc, CHAR *argv[] )
1   +--{
2   |+--IF( argc > 1 ){
3   ||+--WHILE( argc ){
4   |||+--IF( *argv[argc] == '-' ){                 /* got cmd line option */
4   ||||  ++argv[argc];                             /* point to next char */
5   ||||+--IF( isdigit( *argv[argc] ) ){            /* got a digit?   */
5   |||||  KeyOffset = atoi( argv[argc] );          /* convert & save */
4   ||||+--}
4   ||||  ELSE IF( *argv[argc] == 'V' ||            /* got Video version? */
5   ||||+---*argv[argc] == 'v' ){                   /* got Video version? */
5   |||||  Version = 'V';                           /* setup for Video's */
```

```
4   ||||+--}
3   |||+--}
3   |||  --argc;
2   ||+--}
1   |+--}
1   |
1   |   InitBoard();
1   |   Video_Switch( SEL_CGA );
1   |   InitScreen();
1   |   my_initialize();
1   |   srand( Second() );                          /* randomize somewhat?
    |    */
1   |   my_set_all_lamps_on();
1   |   InitCom();
1   |   my_set_all_lamps_off();
1   |   InitSony();
1   |   NewCount       = FALSE;
1   |   ETime          = 0;
1   |   CurMinute      = Minute();
1   |   RStart         = 0;                         /* Init random attract
    |    variables */
1   |   RAttract       = 1;
1   |   Attract        = TRUE;
```

```
1   |   CurPlayer      = COM1;
1   |   AltPlayer      = COM2;
·1  |   Attract        = TRUE;
1   |   SearchMode     = TRUE;
1   |   SearchTime     = 0;
1   |   ACKFlag        = FALSE;
1   |   KeyNumb        = 90;
1   |   strcpy( LastFrame, "00000");
1   |   strcpy( CurDate, Date());
1   |   InitCount();
1   |   Search( CurPlayer,81 );
1   |   Search( AltPlayer,81 );
1   |   my_set_all_lamps_on();
1   |   DisplayComin(10, 100);
1   |   my_set_all_lamps_off();
1   |
1   |   /* *******************************************************************
    |    *** */
1   |
2   |+--FOR( ;; ){
2   ||  inp( 0x2e0 );/***** BUG, in from FreezFrame port, keep WDT happy *****/
2   ||  ReadKeyboard();
2   ||  DoSearchMode();
2   ||  DoPlayMode();
2   ||  UpdateFile();
1   |+--}
    +--} if 0
    proc( CHAR *p )
1   +--{
1   |   RETURN(0);
1   |   _settextposition( 1,1 );
1   |   _outtext( "                    " );
1   |   _settextposition( 1,1 );
1   |   _outtext( p );
    +--}
    #endif /* *******************************************************************
     *** */
```

Mon 09-18-89 12:27:45  INDEX (Cross Ref) Page.Line
all identifiers
 1 09-18-89 12:13:00  PICS.C

| Identifier | | | | | |
|---|---|---|---|---|---|
| _ACK | 3.145 | 9.437 | 11.527 | | |
| _ADDR_INQ | | 9.429 | 10.475 | 11.518 | |
| _bios_timeofday | | 3.108 | 3.110 | | |
| _CLEAR_ALL | | 3.144 | 7.322 | 7.334 | |
| _COMPLETION | | 9.420 | | | |
| _dos_getdate | | 5.231 | | | |
| _dos_gettime | | 5.213 | 5.222 | | |
| _ENTER | 7.338 | | | | |
| _FRAME_MODE | | 4.156 | | | |
| _FWD_PLAY | | 7.324 | | | |
| _INDEX_OFF | | 3.155 | | | |
| _MRES4COLOR | | 5.240 | | | |
| _outtext | 13.630 | 13.632 | | | |
| _SEARCH | 7.336 | | | | |
| _STATUS_INQ | | 3.147 | | | |
| _settextposition | | 13.629 | 13.631 | | |
| _setvideomode | | 5.240 | | | |
| _TIME_GETCLOCK | | 3.108 | 3.110 | | |
| _UIC_DISPLAY_MODE | | 4.162 | | | |
| _UIC_END | 4.189 | | | | |
| _UIC_SET_WINDOW | | 4.167 | | | |
| _UIC_STORE_CHAR | | 4.170 | | | |
| _USER_INDEX_CONTROL | | | 4.161 | 4.166 | 4.169 |
| _USER_INDEX_OFF | | 7.320 | | | |
| _USER_INDEX_ON | | 7.319 | | | |

Mon 09-18-89 12:27:45  INDEX (Cross Ref) Page.Line
all identifiers

| Identifier | | | | | | |
|---|---|---|---|---|---|---|
| ACKFlag | 2.60 | 8=361 | 8=387 | 9.417 | 9=422 | 9=437 |
| | 10.458 | 10=482 | 11=527 | 13=603 | | |
| AltPlayer | | 2.64 | 8=391 | 8=395 | 8.401 | 10.484 |
| | | 10=485 | 10=498 | 11=502 | 11.514 | 13=599 |
| | | 13.609 | | | | |
| Attract | 2.60 | 7.319 | 8=384 | 10.487 | 11=511 | 11.546 |
| | 12=597 | 13=600 | | | | |
| access | 6.300 | | | | | |

| | 31 | | | | 32 | |
|---|---|---|---|---|---|---|
| argc | 12.565 | 12.567 | 12.568 | 12.569 | 12.570 | 12.571 |
| | 12.572 | 12.574 | 12.575 | 12=579 | | |
| argv | 12.565 | 12.569 | 12=570 | 12.571 | 12.572 | 12.574 |
| | 12.575 | | | | | |
| async_open | | 5.256 | 6.261 | | | |
| async_restart | | 7.348 | 7.349 | | | |
| async_rx | 3.123 | 9.419 | 9.436 | 10.464 | 10.465 | 10.466 |
| | 10.467 | 10.468 | 11.526 | | | |
| async_rxcnt | | 3.123 | 9.418 | 9.435 | 10.463 | 11.525 |
| async_rxflush | | 3.143 | 7.323 | 7.335 | | |
| async_tx | 3.144 | 3.147 | 3.155 | 4.156 | 4.161 | 4.162 |
| | 4.163 | 4.164 | 4.165 | 4.166 | 4.167 | 4.168 |
| | 4.169 | 4.170 | 4.171 | 4.179 | 4.185 | 4.189 |
| | 4.201 | 4.202 | 4.203 | 4.204 | 4.205 | 7.319 |
| | 7.320 | 7.322 | 7.324 | 7.334 | 7.336 | 7.338 |
| | 9.429 | 10.475 | 11.518 | | | |
| atoi | 10.470 | 10.471 | 12.572 | | | |
| Beep | 7.350 | 8.383 | | | | |
| BUG_COUNT | | 2=68 | 7=353 | | | |
| bios.h | 1.36 | | | | | |
| CheckSearchTime | | <8.368 | 9.416 | | | |
| COM1 | 3.139 | 4.192 | 5.256 | 7.318 | 7.333 | 7.348 |
| | 8.358 | 8.390 | 8.395 | 10.497 | 11.502 | 13.598 |
| COM2 | 4.191 | 4.192 | 6.261 | 7.349 | 8.359 | 8.391 |
| | 8.394 | 10.498 | 11.501 | 13.599 | | |

Mon 09-18-89 12:27:45  INDEX (Cross Ref) Page.Line
all identifiers

| | | | | | |
|---|---|---|---|---|---|
| Com_Fail_To_Open | 5.258 | 6.262 | 6.266 | | |
| Counts | 2.61 | 6.281 | 6.301 | 6&307 | 9=425 |
| CurDate | 2.56 | 6.298 | 12.552 | 12.553 | 13.606 |
| CurMinute | 2.62 | 11.544 | 11=545 | 12=594 | |
| CurPlayer | | 2.64 | 8=390 | 8=394 | 8.399 | 9.418 |
| | 9.419 | 9.423 | 9.428 | 9.429 | 9.435 |
| | 9.436 | 10.463 | 10.464 | 10.465 | 10.466 |
| | 10.467 | 10.468 | 10.475 | 10.483 | 10=484 |
| | 10=491 | 10=497 | 11=501 | 11.505 | 11.510 |
| | 11.518 | 11.525 | 11.526 | 13=598 | 13.608 |
| CurSecond | | 2.62 | 8.370 | 8=371 | | |
| comment | <1.30 | | | | | |
| ctype.h | 1.33 | | | | | |
| current | 3.107 | 3&110 | 3.111 | | | |
| Date | <5.228 | 12.552 | 12.553 | 13.606 | | |
| DisplayComin | | 13.611 | | | | |

| | | | | | |
|---|---|---|---|---|---|
| DoomsDay | 2=66 | 7=347 | 8=356 | 9=430 | 11=522 |
| DoPlayMode | | <10.451 | 13.620 | | |
| DoSearchMode | | <9.412 | 13.619 | | |
| date_out | 2.59 | 5.232 | 5&233 | | |
| delay | <3.104 | 3.124 | 7.350 | 10.457 | |
| di | 5.230 | 5&231 | | | |
| di.day | 5.232 | | | | |
| di.month | 5.232 | | | | |
| di.year | 5.232 | | | | |
| dos.h | 1.35 | | | | |
| dosdate_t | | 5.230 | | | |
| dostime_t | | 5.212 | 5.221 | | |

Mon 09-18-89 12:27:45  INDEX (Cross Ref) Page.Line
all identifiers

| | | | | | |
|---|---|---|---|---|---|
| ErrCode | 2.64 | 5.254 | 5=256 | 5.257 | 6=261 | 6.262 |
| | 6.267 | | | | | |
| ETime | 2.63 | 11=546 | 11=547 | 12=593 | | |
| exit | 3.130 | 6.270 | | | | |
| FALSE | 1.40 | 1.41 | 3.122 | 8.361 | 8.384 | 8.387 |
| | 9.421 | 9.422 | 9.437 | 10.482 | 11.527 | 12.550 |
| | 12.592 | 13.603 | | | | |
| FILE | 6.278 | 6.305 | | | | |
| Fi | 6.305 | 6=306 | 6.307 | 6.308 | | |
| FileName | 2.57 | 6.295 | 6.296 | 6.298 | 6.300 | 6.302 |
| | 6.306 | 12.549 | | | | |
| Fo | 6.278 | 6=279 | 6.280 | 6.281 | 6.282 | |
| Frame | 10.455 | 10.464 | 10.465 | 10.466 | 10.467 | 10.468 |
| | 10.469 | 10&470 | 10.473 | 10.474 | 11.517 | |
| fclose | 6.282 | 6.308 | | | | |
| final | 3.106 | 3&108 | 3=109 | 3.111 | | |
| fopen | 6.279 | 6.306 | | | | |
| fprintf | 6.281 | | | | | |
| fscanf | 6.307 | | | | | |
| graph.h | 1.34 | | | | | |
| InitBoard | | 12.583 | | | | |
| InitCom | <5.252 | 12.589 | | | | |
| InitCount | | <6.292 | 12.554 | 13.607 | | |
| InitScreen | | <5.238 | 12.585 | | | |
| InitSony | <3.136 | 12.591 | | | | |

| | | | | | | |
|---|---|---|---|---|---|---|
| i | 3.138 | 4=178 | 4.179 | 4=184 | 4.185 | 6.277 |
| | 6=281 | 6.294 | 6=301 | 6=307 | 10.453 | 10=471 |
| | 10.478 | 10=483 | 10.485 | | | |
| inp | 13.617 | | | | | |

Mon 09-18-89 12:27:45   INDEX (Cross Ref) Page.Line
all identifiers

| | | | | | | |
|---|---|---|---|---|---|---|
| isdigit | 12.571 | | | | | |
| j | 6.294 | 6&307 | 10.453 | 10=470 | 10.478 | |
| Key | 8.382 | | | | | |
| KeyNumb | 2.65 | 8.389 | 8.398 | 8.399 | 9.424 | 9.425 |
| | 10=486 | 13=604 | | | | |
| KeyOffset | | 2=52 | 12=572 | | | |
| k | 10.453 | 10=495 | 10.496 | 11.504 | 11.505 | |
| LastFrame | | 2.58 | 8.388 | 10&471 | 10.473 | 10.474 |
| | | 11.517 | 13.605 | | | |
| Last1Search | | 2.63 | 7=333 | 8.358 | | |
| Last2Search | | 2.63 | 7=333 | 8.359 | | |
| lib | 1.30 | | | | | |
| M_MESSAGE | | 1.27 | 2.53 | | | |
| MAXRAND | 1.45 | | | | | |
| Minute | <5.210 | 11.544 | 11.545 | 12.594 | | |
| Mus_Message | | 2.53 | 4.184 | 4.185 | | |
| main | <12.565 | | | | | |
| my_change_to_lamp | | 8.398 | 10.490 | 11.504 | 11.509 | |
| my_initialize | 12.586 | | | | | |
| my_set_all_lamps_off | | 12.590 | 13.612 | | | |
| my_set_all_lamps_on | | 12.588 | 13.610 | | | |
| Name | 6.275 | 6.279 | | | | |
| NewCount | 2.60 | 9=426 | 12.548 | 12=550 | 12=592 | |
| NULL | 6.280 | | | | | |
| Num_2_LDP | | <4.199 | 7.337 | | | |
| Play | <7.316 | 9.423 | | | | |
| Port | 3.120 | 3.123 | 3.128 | 3=139 | 3.142 | 3.143 |
| | 3.144 | 3.145 | 3.147 | 3.148 | 3.150 | 3.151 |
| | 3.155 | 4.156 | 4.161 | 4.162 | 4.163 | 4.164 |
| | 4.165 | 4.166 | 4.167 | 4.168 | 4.169 | 4.170 |
| | 4.171 | 4.179 | 4.180 | 4.185 | 4.186 | 4.189 |
| | 4.191 | 4=192 | 4.199 | 4.201 | 4.202 | 4.203 |

Mon 09-18-89 12:27:45  INDEX (Cross Ref) Page.Line
all identifiers

|   | | | | | | |
|---|---|---|---|---|---|---|
|   | 4.204 | 4.205 | 7.316 | 7.318 | 7.319 | 7.320 |
|   | 7.321 | 7.322 | 7.323 | 7.324 | 7.331 | 7.333 |
|   | 7.334 | 7.335 | 7.336 | 7.337 | 7.338 |   |
| p | 13.626 | 13.632 | | | | |
| printf | 3.128 | 3.129 | 3.142 | 5.242 | 5.243 | 5.244 |
|   | 5.245 | 5.246 | 5.247 | 5.255 | 5.257 | 6.260 |
|   | 6.263 | 6.267 | 6.268 | 6.269 | 7.353 | |
| proc | <13.626 | | | | | |
| R_OK | 5.257 | 6.262 | | | | |
| RAttract | 2.65 | 7.319 | 10=488 | 10=489 | 11=512 | 12=596 |
| RELEASE | 1.23 | 5.245 | | | | |
| ReadKeyboard | | <8.380 | 13.618 | | | |
| RepeatSearch | | <7.345 | 8.372 | | | |
| RStart | 2.65 | 8=400 | 8.401 | 10.491 | 10=492 | 11.510 |
|   | 12=595 | | | | | |
| rand | 10.495 | | | | | |
| reply | 3.140 | 3=148 | 3.153 | 9.414 | 9=419 | 9.420 |
|   | 9=436 | 9.437 | 10.454 | 11=526 | 11.527 | |
| SEL_BLACK | | 10.479 | | | | |
| SEL_CGA | 3.127 | 8.397 | 12.584 | | | |
| SEL_1 | 7.318 | | | | | |
| SEL_2 | 7.318 | | | | | |
| Search | <7.331 | 8.358 | 8.359 | 8.399 | 8.401 | 10.491 |
|   | 11.505 | 11.510 | 11.514 | 13.608 | 13.609 | |
| SearchMode | | 2.60 | 8=385 | 9.415 | 9=421 | 10.456 |
|   | | 10=480 | 11.543 | 13=601 | | |
| SearchTime | | 2.63 | 8=360 | 8=372 | 8=386 | 10=481 |
|   | | 13=602 | | | | |
| Second | <5.219 | 8.370 | 8.371 | 12.587 | | |
| Sel | 7.331 | 7.333 | 7.337 | | | |

Mon 09-18-89 12:27:45  INDEX (Cross Ref) Page.Line
all identifiers

|   | | | | | | |
|---|---|---|---|---|---|---|
| StartFrame | | 2.70 | 7.337 | | | |
| s | 4.199 | 4=201 | 4=202 | 4=203 | 4=204 | 4.205 |
| sprintf | 5.232 | | | | | |
| srand | 12.587 | | | | | |
| stdio.h | 1.32 | | | | | |
| strcat | 6.298 | | | | | |
| strcmp | 12.552 | | | | | |

| | | | | | |
|---|---|---|---|---|---|
| strcpy | 8.388 | 10.474 | 11.517 | 12.553 | 13.605 | 13.606 |
| strlen | 4.178 | 4.184 | | | | |
| Time | 3.120 | 3=122 | | | | |
| Timeout | 2.60 | 3=122 | 3=126 | 3.149 | | |
| TRUE | 1.41 | 3.126 | 4.193 | 8.385 | 9.426 | 9.437 |
| | 10.480 | 11.511 | 11.527 | 12.597 | 13.600 | 13.601 |
| time_info | | 5.212 | 5&213 | 5.221 | 5&222 | |
| time_info.minute | | 5.214 | | | | |
| time_info.second | | 5.223 | | | | |
| UPDATE_INTERVAL | | 1.43 | 11.546 | | | |
| UpdateFile | | <11.541 | 13.621 | | | |
| V_MESSAGE | | 1.28 | 2.54 | | | |
| VERSION | 1.22 | 5.245 | | | | |
| Version | 1=51 | 4.177 | 12=576 | | | |
| Vid_Message | | 2.54 | 4.178 | 4.179 | | |
| Video_Switch | | 3.127 | 7.318 | 8.397 | 10.479 | 12.584 |
| WAIT_TIME | | 1.44 | 3.145 | 3.148 | 3.150 | 3.151 |
| | | 3.155 | 4.156 | 4.161 | 4.162 | 4.163 |
| | | 4.164 | 4.165 | 4.166 | 4.167 | 4.168 |
| | | 4.169 | 4.170 | 4.171 | 4,180 | 4.186 |
| | | 4.189 | 7.321 | 9.428 | | |

Mon 09-18-89 12:27:45   INDEX (Cross Ref) Page.Line
 all identifiers

| | | | | | |
|---|---|---|---|---|---|
| WaitForReply | <3.120 | 3.145 | 3.148 | 3.150 | 3.151 |
| | 3.155 | 4.156 | 4.161 | 4.162 | 4.163 |
| | 4.164 | 4.165 | 4.166 | 4.167 | 4.168 |
| | 4.169 | 4.170 | 4.171 | 4.180 | 4.186 |
| | 4.189 | 7.321 | 9.428 | | |
| WriteFile | <6.275 | 6.302 | 12.549 | | |
| x | 3.104 | 3.109 | | | |

Mon 09-18-89 12:36:34    i       CONTENTS
                              Page    Line

```
·08-13-89 23:16:52
 COMIN.H                                1       1
 COMIN.H          DisplayComin          6     312
 COMIN.H                                7     335
```

```
    08-13-89 23:16:52    COMIN.H
Mon 09-18-89 12:36:34

1  +--CHAR        *comin[ 310 ] = {
1  |
1  |   "0000000000000000000000000000000000000000000000",
1  |   "0000000000000000000011111110000000000000000000",
1  |   "0000000000000011111111111111111110000000000000",
1  |   "0000000000001111111111111111111111110000000000",
1  |   "0000000000111111111111111111111111111000000000",
1  |   "0000000011111111111111111111111111111100000000",
1  |   "0000000111111111111111111111111111111110000000",
1  |   "0000001111111111111111111111111111111111000000",
1  |   "0000011111111111111111111111111111111111100000",
1  |   "0000111111111111111111111111111111111111110000",
1  |   "0001111111111111111111111111111111111111111000",
1  |   "0001111111111111000000000001111111111111111000",
1  |   "0011111111111100000000000000111111111111111100",
1  |   "0011111111110000000000000000011111111111111100",
1  |   "0111111111100000000000000000001111111111111110",
1  |   "0111111111000000000000000000000111111111111110",
1  |   "0111111110000000000000000000000011111111111110",
1  |   "1111111110000000000000000000000001111111111110",
1  |   "1111111100000000000000000000000001111111111111",
1  |   "1111111100000000000000000000000000111111111111",
1  |   "1111111100000000000000000000000000111111111111",
1  |   "1111111100000000000000000000000000111111111111",
1  |   "1111111100000000000000000000000000111111111111",
1  |   "1111111100000000000000000000000000111111111111",
1  |   "1111111100000000000000000000000000111111111111",
1  |   "0111111110000000000000000000000000111111111111",
1  |   "0111111110000000000000000000000000111111111110",
1  |   "0111111111000000000000000000000001111111111110",
1  |   "0111111111100000000000000000000011111111111110",
1  |   "0011111111110000000000000000000111111111111110",
1  |   "0011111111111000000000000000000111111111111100",
1  |   "0001111111111110000000000000001111111111111100",
1  |   "0001111111111111000000000000011111111111111000",
1  |   "0000111111111111100000000000111111111111111000",
1  |   "0000111111111111100000000000111111111111110000",
1  |   "0000011111111111100000000000111111111111100000",
1  |   "0000011111111111000000000000111111111111000000",
1  |   "0000001111111110000000000000111111111000000000",
1  |   "0000000011111110000000000000111111100000000000",
1  |   "0000000000011111000000000000111110000000000000",
1  |   "0000000000000011000000000000010000000000000000",
1  |   "0000000000000000000000000000000000000000000000",
1  |   "0000000000000000000000000000000000000000000000",
1  |   "0000000000000000000000000000000000000000000000",
1  |   "0000000000001111111000000000000000000000000000",
1  |   "0000000000111111111111110000000000000000000000",
1  |   "0000000001111111111111111100000000000000000000",
1  |   "0000001111111111111111111110000000000000000000",
1  |   "0000111111111111111111111110000000000000000000",
1  |   "0000111111111111111111111111100000000000000000",
1  |   "0001111111111111111111111111110000000000000000",
1  |   "0011111111111111111111111111111000000000000000",
1  |   "0011111111111111111111111111111110000000000000",
```

```
08-13-89 23:16:52   COMIN.H
Mon 09-18-89 12:36:34

1  |  "0111111111111100000001111111111100000000000000",
1  |  "0111111111110000000000001111111111000000000000",
1  |  "1111111110000000000000001111111110000000000000",
1  |  "1111111110000000000000001111111110000000000000",
1  |  "1111111100000000000000001111111100000000000000",
1  |  "1111111100000000000000001111111100000000000000",
1  |  "1111111000000000000000001111111100000000000000",
1  |  "1111111000000000000000001111111100000000000000",
1  |  "1111111000000000000000001111111100000000000000",
1  |  "1111111000000000000000001111111100000000000000",
1  |  "1111111100000000000000001111111100000000000000",
1  |  "1111111100000000000000001111111100000000000000",
1  |  "1111111110000000000000011111111100000000000000",
1  |  "1111111111000000000000111111111100000000000000",
1  |  "0111111111110000000001111111111100000000000000",
1  |  "0111111111111111111111111111111000000000000000",
1  |  "0011111111111111111111111111111100000000000000",
1  |  "0001111111111111111111111111111100000000000000",
1  |  "0001111111111111111111111111111000000000000000",
1  |  "0000111111111111111111111111111000000000000000",
1  |  "0000011111111111111111111111111000000000000000",
1  |  "0000000111111111111111111111110000000000000000",
1  |  "0000000011111111111111111111100000000000000000",
1  |  "0000000000111111111111110000000000000000000000",
1  |  "0000000000000000000000000000000000000000000000",
1  |  "0000000000000000000000000000000000000000000000",
1  |  "0000000000000000000000000000000000000000000000",
1  |  "1111111111111111111111111111111000000000000000",
1  |  "1111111111111111111111111111111100000000000000",
1  |  "1111111111111111111111111111111100000000000000",
1  |  "1111111111111111111111111111111100000000000000",
1  |  "1111111111111111111111111111111100000000000000",
1  |  "1111111111111111111111111111111100000000000000",
1  |  "1111111111111111111111111111111100000000000000",
1  |  "1111111111111111111111111111111100000000000000",
1  |  "0000000000000000000000111111110000000000000000",
1  |  "0000000000000000000000011111110000000000000000",
1  |  "0000000000000000000000001111111000000000000000",
1  |  "0000000000000000000000001111111000000000000000",
1  |  "0000000000000000000000001111111000000000000000",
1  |  "0000000000000000000000001111111000000000000000",
1  |  "0000000000000000000000001111111100000000000000",
1  |  "0000000000000000000000001111111100000000000000",
1  |  "0000000000000000000000001111111100000000000000",
1  |  "0000000000000000000000001111111100000000000000",
1  |  "1111111111111111111111111111111100000000000000",
1  |  "1111111111111111111111111111111100000000000000",
1  |  "1111111111111111111111111111111100000000000000",
1  |  "1111111111111111111111111111110000000000000000",
1  |  "1111111111111111111111111111110000000000000000",
1  |  "1111111111111111111111111111100000000000000000",
1  |  "1111111111111111111111111111100000000000000000",
1  |  "1111111111111111111111111110000000000000000000",
1  |  "0000000000000000000000111111100000000000000000",
1  |  "0000000000000000000000111111100000000000000000",
```

```
08-13-89 23:16:52    COMIN.H
Mon 09-18-89 12:36:34

1  |  "000000000000000000000000111111100000000000000000",
1  |  "000000000000000000000000111111100000000000000000",
1  |  "000000000000000000000000111111100000000000000000",
1  |  "000000000000000000000000111111100000000000000000",
1  |  "000000000000000000000000111111100000000000000000",
1  |  "000000000000000000000000111111100000000000000000",
1  |  "000000000000000000000000111111110000000000000000",
1  |  "000000000000000000000000111111110000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "000000000000000000000000000000000000000000000000",
1  |  "000000000000000000000000000000000000000000000000",
1  |  "000000000000000000000000000000000000000000000000",
1  |  "000000000000000000000000000000000000000000000000",
1  |  "111111111111111111111111111111100000111111000000",
1  |  "111111111111111111111111111111100001111111000000",
1  |  "111111111111111111111111111111100001111111000000",
1  |  "111111111111111111111111111111100001111111000000",
1  |  "111111111111111111111111111111100001111111000000",
1  |  "111111111111111111111111111111100001111111000000",
1  |  "111111111111111111111111111111100001111111000000",
1  |  "111111111111111111111111111111100000111111000000",
1  |  "000000000000000000000000000000000000000000000000",
1  |  "000000000000000000000000000000000000000000000000",
1  |  "000000000000000000000000000000000000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "111111111111111111111111111111100000000000000000",
1  |  "000000000000000000000111111100000000000000000000",
1  |  "000000000000000000000011111000000000000000000000",
1  |  "000000000000000000000001111100000000000000000000",
1  |  "000000000000000000000000111110000000000000000000",
1  |  "000000000000000000000000111111000000000000000000",
1  |  "000000000000000000000000111111000000000000000000",
1  |  "000000000000000000000000111111100000000000000000",
1  |  "000000000000000000000000011111100000000000000000",
1  |  "000000000000000000000000011111111000000000000000",
1  |  "000000000000000000000000111111110000000000000000",
1  |  "111111111111111111111111111111100000000000000000",
1  |  "111111111111111111111111111111100000000000000000",
1  |  "111111111111111111111111111111100000000000000000",
```

```
08-13-89 23:16:52   COMIN.H
Mon 09-18-89 12:36:34
```

```
1  |  "111111111111111111111111111110000000000000000",
1  |  "111111111111111111111111111110000000000000000",
1  |  "111111111111111111111111111100000000000000000",
1  |  "111111111111111111111111111000000000000000000",
1  |  "111111111111111111111111110000000000000000000",
1  |  "000000000000000000000000000000000000000000000",
1  |  "000000000000000000000000000111000000111111000",
1  |  "000000000000000000000000000111000000111111100",
1  |  "000000000000000000000000000011100000111111100",
1  |  "000000000000000000000000000011110000111111100",
1  |  "000000000000000000000000000001111000111111100",
1  |  "000000000000000000000000000001111111111111100",
1  |  "000000000000000000000000000000111111111111100",
1  |  "000000000000000000000000000000011111111111100",
1  |  "000000000000000000000000000000001111111111000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000000000000000000000000000000000000",
1  |  "000000000000001111111111111111111111111111100",
1  |  "000000000111111111111111111111111111111111100",
1  |  "000000011111111111111111111111111111111111100",
1  |  "000000111111111111111111111111111111111111100",
1  |  "000001111111111111111111111111111111111111100",
1  |  "000011111111111111111111111111111111111111100",
1  |  "000111111111111111111111111111111111111111100",
1  |  "001111111111111111111111111111111111111111100",
1  |  "001111111111111111111111111111111111111111100",
1  |  "011111111111111111111111111111111111111111100",
1  |  "011111111110000000000000000000000000000000000",
1  |  "011111111100000000000000000000000000000000000",
1  |  "111111111000000000000000000000000000000000000",
1  |  "111111111000000000000000000000000000000000000",
1  |  "111111110000000000000000000000000000000000000",
1  |  "111111110000000000000000000000000000000000000",
1  |  "111111110000000000000000000000000000000000000",
1  |  "111111110000000000000000000000000000000000000",
1  |  "111111110000000000000000000000000000000000000",
```

```
1  |  "111111110000000000000000000000000000000000000000",
1  |  "111111110000000000000000000000000000000000000000",
1  |  "111111110000000000000000000000000000000000000000",
1  |  "111111110000000000000000000000000000000000000000",
1  |  "111111110000000000000000000000000000000000000000",
1  |  "111111111000000000000000000000000000000000000000",
1  |  "011111111100000000000000000000000000000000000000",
1  |  "011111111111110000000000000000000000000000000000",
1  |  "001111111111111111111111111111111111111111111100",
1  |  "001111111111111111111111111111111111111111111100",
1  |  "000111111111111111111111111111111111111111111100",
1  |  "000111111111111111111111111111111111111111111100",
1  |  "000011111111111111111111111111111111111111111100",
1  |  "000011111111111111111111111111111111111111111100",
1  |  "000001111111111111111111111111111111111111111100",
1  |  "000000011111111111111111111111111111111111111100",
1  |  "000000000111111111111111111111111111111111111100",
1  |  "000000000000000000000000000000000000000000000000",
1  |  "000000000000000000000000000000000000000000000000",
1  |  "000000000000000000000000000000000000000000000000",
1  |  "000000000000000000000000000000000000000000000000",
1  |  "111111111111111111111111111111111111111111111100",
1  |  "111111111111111111111111111111111111111111111100",
1  |  "111111111111111111111111111111111111111111111100",
1  |  "111111111111111111111111111111111111111111111100",
1  |  "111111111111111111111111111111111111111111111100",
1  |  "111111111111111111111111111111111111111111111100",
1  |  "111111111111111111111111111111111111111111111100",
1  |  "111111111111111111111111111111111111111111111100",
1  |  "111111111111111111111111111111111111111111111100",
1  |  "000000000000001111111110000000111111110000000000",
1  |  "000000000000001111111100000000000111111100000000",
1  |  "000000000000011111110000000000000001111110000000",
1  |  "000000000000111111000000000000000000111111000000",
1  |  "000000000000111111000000000000000000111111100000",
1  |  "000000000000011111100000000000000000011111100000",
1  |  "000000000000011111100000000000000000111111110000",
1  |  "000000000000011111100000000000000000011111110000",
1  |  "000000000000111111100000000000000000011111110000",
1  |  "000000000000111111100000000000000000011111110000",
1  |  "000000000000111111110000000000000000111111110000",
1  |  "000000000000111111111000000000000001111111110000",
1  |  "000000000000111111111111111111111111111111100000",
1  |  "000000000000011111111111111111111111111111111000",
1  |  "000000000000011111111111111111111111111111111000",
1  |  "000000000000011111111111111111111111111110000000",
1  |  "000000000000001111111111111111111111111100000000",
1  |  "000000000000000111111111111111111111111000000000",
1  |  "000000000000000011111111111111111111100000000000",
1  |  "000000000000000011111111111111111110000000000000",
1  |  "000000000000000000001111111111100000000000000000",
1  |  "000000000000000000000000000000000000000000000000",
1  |  "000000000000000000000000000000000000000000000000",
```

```
08-13-89 23:16:52  COMIN.H                                          Pg   6
Mon 09-18-89 12:36:34            DisplayComin                       of   7
                                                                    276-330

1  |   "0111111100000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "0111111100000000000000000000000000000000000",
1  |   "0000000000000000000000000000000000000000000",
1  |   "0000000000000000000000000000000000000000000",
1  |   "0000000000000000000000000000000000000000000",
1  |   "0111111100000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "0111111100000000000000000000000000000000000",
1  |   "0000000000000000000000000000000000000000000",
1  |   "0000000000000000000000000000000000000000000",
1  |   "0000000000000000000000000000000000000000000",
1  |   "0111111100000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "1111111110000000000000000000000000000000000",
1  |   "0111111100000000000000000000000000000000000",
1  |   "0000000000000000000000000000000000000000000"
   +--};

INT        DisplayComin( INT X,   INT Y )
1  +--{
1  |   INT        I, J;
1  |
1  |   _setvideomode( _MRES4COLOR );
1  |   _clearscreen( _GCLEARSCREEN );
1  |   _setcolor ( _WHITE );
1  |
2  |+--FOR( J = 0; J <= 48; J++ ){
2  ||
2  ||   FOR (I = 1; I <= 177; I++)
2  ||     IF( *( comin[ I ] + ( 48-J )) == '1' ) _setpixel( I+X,J+Y );
2  ||
2  ||   FOR (I = 199; I <= 234; I++)
2  ||     IF( *( comin[ I ] + ( 48-J )) == '1' ) _setpixel( I+X,J+Y );
2  ||
2  ||   FOR (I = 239; I <= 271; I++)
2  ||     IF( *( comin[ I ] + ( 48-J )) == '1' ) _setpixel( I+X,J+Y+12 );
2  ||

08-13-89 23:16:52  COMIN.H                                          Pg   7
Mon 09-18-89 12:36:34            DisplayComin                       of   7
                                                                    331-335

2  ||   IF (J > 39)
2  ||     FOR (I = 272; I <= 305; I++)
2  ||       IF( *( comin[ I ] - ( 48-J )) == '1' ) _setpixel( I-X,J-Y );
1  |+--}
   +--}
```

Mon 09-18-89 12:36:34 INDEX (Cross Ref) Page.Line
all identifiers
1 08-13-89 23:16:52 COMIN.H

| | | | | | |
|---|---|---|---|---|---|
| _clearscreen | 6.317 | | | | |
| _GCLEARSCREEN | 6.317 | | | | |
| _MRES4COLOR | 6.316 | | | | |
| _setcolor | 6.318 | | | | |
| _setpixel | 6.323 | 6.326 | 6.329 | 7.333 | |
| _setvideomode | 6.316 | | | | |
| _WHITE | 6.318 | | | | |
| comin | 1.1 | 6.323 | 6.326 | 6.329 | 7.333 |
| DisplayComin | <6.312 | | | | |
| I | 6.314 | 6=322 | 6.323 | 6=325 | 6.326 | 6=328 |
| | 6.329 | 7=332 | 7.333 | | | |
| J | 6.314 | 6=320 | 6.323 | 6.326 | 6.329 | 7.331 |
| | 7.333 | | | | | |
| X | 6.312 | 6.323 | 6.326 | 6.329 | 7.333 |
| Y | 6.312 | 6.323 | 6.326 | 6.329 | 7.333 |

Mon 09-18-89 12:37:39    i    CONTENTS
                        Page   Line 08-14-89 14:26:30
SONY.H                    1      1
SONY.H                    2     74

08-22-89 13:27:40 LIGHTS.H                                  Pg   1
Mon 09-18-89 12:32:54                                       of  11
                                                            1-48

```
/*********************************************************************
*****

=       =   ====   =    =   =====  ====
          =       =   =   =  =    =   =      =
          =       =   =      ======   =      ====
          =       =   =  === =    =   =          =
          =       =   =    = =    =   =      =   =
          =====   =   ====  =    =   =       ====

*********************************************************************
****

Drivers for COM port that 'talks' to the 8051 light driver / controller board.

7/25/89 Marc Yaxley, Leland Corp.

*********************************************************************
***/

STATIC INT HEX_NIBBLE[16] = (48,49,50,51,52,53,54,55,56,57,65,66,67,68,
    69,70);
```

```
STATIC INT EXPAND_BIT[10] = {1, 2, 4, 8, 16, 32, 64, 128, 256, 512};

#define COMM        0x338       /* COM1=3F8,COM2=2F8,COM3=3E8,COM4=
      2E8  */
    #define DL_COM      0x338       /* +0 divisor latch register  */
    #define RX_COM      0x338       /* +0 recieve data register   */
    #define TX_COM      0x338       /* +0 transmit data register  */
    #define IE_COM      0x339       /* +1 interrupt enable        */
    #define II_COM      0x33A       /* +2 interrupt identify      */
    #define LC_COM      0x33B       /* +3 line control            */
    #define MC_COM      0x33C       /* +4 modem control           */
    #define LS_COM      0x33D       /* +5 line status             */
    #define MS_COM      0x33E       /* +6 modem status            */ define PRN         0x378       /* LPT1=378, LPT2=278         */
    #define RX_PRN      0x378       /* +0 recieve data register   */
    #define TX_PRN      0x378       /* +0 transmit data register  */
    #define PS_PRN      0x379       /* +1 printer status port     */
    #define PC_PRN      0x37A       /* +2 printer control port    */

CHAR        my_comm_open;       /* TRUE if port is installed & setup
     */
    EXTERN      delay();

/* ----------------------------------------------------------------
       ----- */
```

```
                            CONTENTS
                               Page    Line 08-22-89 13:27:40
LIGHTS.H                         1       1
LIGHTS.H    my_wait_10ms         2      54
LIGHTS.H    my_wait_20ms         2      59
LIGHTS.H    my_prn_init          3     118
LIGHTS.H    my_prn_clockit       3     135
LIGHTS.H    my_prn_bit_inp       3     145
LIGHTS.H    my_prn_inp_ready     4     161
LIGHTS.H    my_prn_inp_data8     4     186
LIGHTS.H    my_prn_inp           5     212
LIGHTS.H    my_prn_bit_out       5     226
LIGHTS.H    my_prn_out           5     243
LIGHTS.H    my_comm_init         6     274
LIGHTS.H    my_comm_inp_ready    6     304
LIGHTS.H    my_comm_inp          7     321
LIGHTS.H    my_comm_out          7     334
LIGHTS.H    my_send_data         7     361
LIGHTS.H                        11     552
```

```
    /*
    \     a little bitty delay to let the '51 cetch up to us....
    */

INT         my_wait_10ms()
1 +--{
1 |   delay( 1 );        /* actually 18.2mS    */
  +--}

INT         my_wait_20ms()
1 +--{
1 |   delay( 2 );        /* actually 36.4mS    */
  +--}

/* ----------------------------------------------------------------
       ---------
```

```
         Parallel Driver <> Lights Controller Routines

Design Notes:

We use 2 bits of the parallel port to talk to
     the 8051 lights controller.  One bit is used
     as serial data, the other is serial strobe.

Assignments:

Port.0 = serial data bit
           Port.1 = serial strobe bit ( we must strobe at
16x )

Waveforms for sending 'AA' hex to the 8051:

Data Bit Value:      0    1    0    1    0    1    0    1
                     |    |    |    |    |    |    |    |
                     |    |    |    |    |    |    |    |
 Port.0   = Hi|___   |    |  _ |    |  _ |    |  _ |    |  _
 ( data ) = Lo|   \|____|__/ |\____|__/ |\__|__/ |\____|__/ |\__/ |
              |    |    |    |    |    |    |    |    |    |
 Port.1   = Hi|___ |  _ |  _ |  _ |  _ |  _ |  _ |  _ |  _ |  _
 ( strb.) = Lo|   \_/ \_/ \_/ \_/ \_/ \_/ \_/ \_/ \_/ \_/
              |    |    |    |    |    |    |    |    |    |
Simulated     |    |    |    |    |    |    |    |    |    |
Serial Bit =  START  0    1    2    3    4    5    6    7   STOP << Note the variable strobe rate allows the 8051 to clock
      on 1 to 0 transition of the Timer/Counter 0 input pin.
      This allows the PC timer interrupt to keep running
      and not affect our software serial out operation >>

Printer Port Bit Assigments:

Status Port:

7       6      5             4         3         2-1-0
 1=busy  0=ack  1=paper out   1=on line 0=error   Not used Control Port:

7-6-5      4                3           2           1          0
 Not used   1=intr. enabled  1=selected  0=reset dev 1=auto LF  1=strobe

*/
/*
\       initialize our PRN port
*/

CHAR       my_prn_init()
1 +--(
1 |  INT    wait;
1 |  outp( PC_PRN,0x00 );    /* clear control bits              */
1 |  outp( PC_PRN,0x0E );    /* set select=1 & reset=0          */
1 |  outp( PC_PRN,0x08 );    /* set reset=1, select=0           */
1 |  outp( TX_PRN,0xFF );    /* set the works to 1's            */
1 |  outp( TX_PRN,0x03 );    /* leave strobe bit HI             */
1 |  delay( 20 );            /* wait for 8051 to reset          */
1 |  RETURN TRUE;
  +--)
```

```c
          /*
        \       send a clock bit to PRN port ( set bit, then clock 16 times )
          */

INT       my_prn_clockit()
1   +--{
1   |  outp( TX_PRN,0x01 );  /* set clock=0   */
1   |  outp( TX_PRN,0x03 );  /* set clock=1   */
    +--}

/*
        \       get a data bit from PRN port ( sample bit on 10th clock cycle )
          */

CHAR      my_prn_bit_inp()

1   +--{
1   |  INT   clock;
2   |+--FOR( clock=1; clock <= 32; clock++ ){   /* fake 32x clock */
2   ||   my_prn_clockit();                       /* strobe for input? */
2   ||   IF( clock == 16 )                       /* sample RxD in middle */
2   ||     RETURN( (inp( PS_PRN ) & 0x20)? TRUE: FALSE );/* PE bit? */
1   |+--}
```

```c
1   |  outp( TX_PRN,0x03 );                    /* leave strobe bit HI */
    +--}

/*
        \       check for recieve data from PRN port
          */

CHAR      my_prn_inp_ready()

1   +--{
1   |  INT   temp, clock;
1   |  my_prn_clockit();                        /* strobe for input? *
1   |  /*
1   |     \    if sender has data, START bit will preceed it...
1   |     */
1   |  IF( ( inp(PS_PRN) & 0x20 ) != 0)         /* check PE bit */
1   |    RETURN FALSE;                          /* we have data=1 */
2   |+--ELSE {
2   ||   FOR( temp=1; temp <= 16; temp++ ) my_prn_clockit();/* eat initial */
2   ||   /*
2   ||     \   sample RxData in during middle of period...
2   ||     */
2   ||   RETURN( (inp( PS_PRN ) & 0x20)? TRUE: FALSE );/* PE bit? */
2   ||
2   ||   FOR(temp=1; temp <= 15; temp++) my_prn_clockit();/* eat up remainder */
1   |+--}
    +--}

/*
        \       recieve data from PRN port ( already seen a start bit )
          */

INT       my_prn_inp_data8()

1   +--{
1   |  INT   data = 0;  /* zero initial data   */
1   |     /*
1   |        \   now clock in 8 data bits...
1   |        */
1   |  IF( my_prn_bit_inp() ) data |=  1;       /* pickup D0 */
1   |  IF( my_prn_bit_inp() ) data |=  2;       /* pickup D1 */
1   |  IF( my_prn_bit_inp() ) data |=  4;       /* pickup D2 */
1   |  IF( my_prn_bit_inp() ) data |=  8;       /* pickup D3 */
1   |  IF( my_prn_bit_inp() ) data |= 16;       /* pickup D4 */
```

```
1 |   IF( my_prn_bit_inp() ) data |=  32;     /* pickup  D5 */
1 |   IF( my_prn_bit_inp() ) data |=  64;     /* pickup  D6 */
1 |   IF( my_prn_bit_inp() ) data |= 128;     /* pickup  D7 */
1 |        /*
1 |          \      pickup STOP bit, return 0 if no stop bit???
1 |        */
1 |   IF( !my_prn_bit_inp() ) data = 0;
1 |   RETURN data;                            /* return 8 bit value */
  +--}

/*
       \      recieve data from PRN port, wait till data availible
     */

INT         my_prn_inp()

1 +--{
1 |        /*
1 |          \      wait for a START bit....
1 |        */
1 |   WHILE( my_prn_bit_inp() );        /* hang whilst a 1 */
1 |   RETURN my_prn_inp_data8();        /* get rest of frame */
  +--}

/*
       \      send a data bit to PRN port ( set bit, then clock 16 times )
     */

INT         my_prn_bit_out( INT bitty )

1 +--{
1 |   INT    itty_bit1, itty_bit2, clock;
1 |   itty_bit1 = (bitty != 0)? 1:0;    /* set data = 1/0 */
1 |   itty_bit2 = itty_bit1 | 2;        /* clk HI pattern */
2 |+--FOR (clock = 1; clock <= 32; clock++){  /* fake 32x clock */
2 ||   outp( TX_PRN, itty_bit1 );      /* data with clk=0 */
2 ||   outp( TX_PRN, itty_bit2 );      /* data with clk=1 */
1 |+--}
1 |   outp( TX_PRN, 0x03 );             /* leave clk bit HI */
  +--}

/*
       \      send data to PRN port
     */

INT         my_prn_out( INT data )

1 +--{
1 |   my_prn_bit_out( 0 );              /* ship START bit */
1 |   my_prn_bit_out( data &   1 );     /* ship    D0    */
1 |   my_prn_bit_out( data &   2 );     /* ship    D1    */
1 |   my_prn_bit_out( data &   4 );     /* ship    D2    */
1 |   my_prn_bit_out( data &   8 );     /* ship    D3    */
1 |   my_prn_bit_out( data &  16 );     /* ship    D4    */
1 |   my_prn_bit_out( data &  32 );     /* ship    D5    */
1 |   my_prn_bit_out( data &  64 );     /* ship    D6    */
1 |   my_prn_bit_out( data & 128 );     /* ship    D7    */
1 |   my_prn_bit_out( 1 );              /* ship STOP bit */
  +--}

/* -------------------------------------------------------------
        ----------
      |
      |             Serial Driver <> Lights Controller Routines
      |
```

```
         08-22-89 13:27:40  LIGHTS.H                                    Pg   6
   Mon  09-18-89 12:32:54              my_comm_init                     of  11
                                                                       263-317

|
           |      Design Notes:
           |
           |              Simple direct 8050 uart port drivers here...
           |
           */
          #if    0
          /*
           \      initialize our COM port, if it's not there set flag to FALSE
           */

CHAR         my_comm_init()

1    +--{
 1    |  my_comm_open = TRUE; /* default, TRUE we opened port */
 1    |  outp( LC_COM, 0x80 ); /* set DLAB                    */
 1    |  outp( IE_COM, 0x00 ); /* 9600 HI value               */
 1    |        /*
 1    |         \ test baud rate reg. to detect if I/O board not installed ?
 1    |        */
 1    |  outp( DL_COM, 0x00 ); /* 9600 LO value               */
 1    |  outp( DL_COM, 0x0A ); /* 9600 LO value               */
 1    |  my_wait_10ms();
 1    |  IF ((inp(DL_COM) != 0x0A)) my_comm_open = FALSE;
 1    |  outp( DL_COM, 0xFF ); /* 9600 LO value               */
 1    |  outp( DL_COM, 0x05 ); /* 9600 LO value               */
 1    |  my_wait_10ms();
 1    |  IF ((inp(DL_COM) != 0x05)) my_comm_open = FALSE;
 1    |        /*
 1    |         \      continue with COMM INIT
 1    |        */
 1    |  outp( DL_COM, 0x0C ); /* 9600 LO value               */
 1    |  outp( LC_COM, 0x03 ); /* 8 bit, 1 stop, NoPar, DLAB=0 */
 1    |  outp( IE_COM, 0x00 ); /* set INTR reg to 0           */
 1    |  RETURN my_comm_open; /* return what we found         */
      +--}

/*
           \      serial comm input test, no wait, TRUE means data availible
           */

CHAR         my_comm_inp_ready()

1    +--( INT          status;
 1    |  IF (!my_comm_open)             /* bail if no comm port */
 1    |    RETURN FALSE;
 1    |
 1    |  status = inp( LS_COM );
 1    |  IF (((status & 0x01) == 0x01))
 1    |    RETURN TRUE;                 /* YES data avail */
 1    |  ELSE
 1    |    RETURN FALSE;                /* NO data avail  */
      +--}

/*
         08-22-89 13:27:40  LIGHTS.H                                    Pg   7
   Mon  09-18-89 12:32:54              my_comm_inp                      of  11
                                                                       318-369

\      serial comm input test, wait for it, exit with data
           */

INT          my_comm_inp()

1    +--( INT          status;
 1    |  IF (!my_comm_open) RETURN(0); /* bail if no comm port */
 1    |  WHILE ((!my_comm_inp_ready())) ;
```

```
1 |   RETURN inp( RX_COM );
  +--}

/*
         \       serial comm output, wait on transmit buffer on both ends of send
          \      ( NOTE: we eat any input char's, simply to keep RX purged )
           */

INT         my_comm_out(data)
         INT           data;

1 +--( INT           status;
1 |   IF (!my_comm_open) RETURN;     /* bail if no comm port */
1 |   DO ( status = inp( LS_COM ); ) WHILE( !((status & 0x40) == 0x40 ));
1 |   my_wait_20ms();
1 |   outp( TX_COM, data );
1 |   DO ( status = inp( LS_COM ); ) WHILE( !((status & 0x40) == 0x40 ));
1 |         /*
1 |          *     eat any input stuff on my_comm port
1 |          */
1 |   WHILE ((my_comm_inp_ready())) status = my_comm_inp();
  +--}
         #endif
         /*-----------------------------------------------------------------
         ----
         |
         |           Routines that do things to the lights...
         |
         */

/*-----------------------------------------------------------------
         ---- */

/*
         \       All output comes thru here.... select one or other types of I/O
          */

INT         my_send_data( INT data )

1 +--(
1 |
1 |   /*********** uncomment one of the following for desired I/O type
    |   ************/
1 |
1 |   /*    my_comm_out( data );            /* use serial comm. port */
1 |         my_prn_out(data);               /* use printer par. port */
1 |         )
```

```
1 |   /* -----------------------------------------------------------------
  |   ---- */
1 |
1 |   int         my_initialize()
1 |
1 |         (
1 |         printf("\n");
1 |   /*    printf( "Initializing Lights (Ver 1.0 S), " );/**/
1 |         printf( "Initializing Lights (Ver 1.0 P), " );/**/
1 |
1 |   /*********** uncomment one of the following for desired I/O type
  |   ************/
1 |
1 |   /*              my_comm_init           /* use serial comm. port */
1 |
1 |         if ((my_prn_init())) printf("OK\n"); /* use printer par. port *
1 |             else printf("NP\n");
1 |
```

```
1 |          my_send_data(0x0013); /* a couple of CR's to get */
1 |          my_send_data(0x0013); /*   MON51 settled in      */
1 |      }
1 |
1 |
1 |  /* ---------------------------------------------------------------
1 |     ---- */
1 |  /*
1 |  \       set all SCANNED lights off
1 |  */
1 |
1 |  int      my_set_all_lamps_off()
1 |
1 |      {
1 |          my_send_data(0x2E);
1 |          my_send_data(0x5A);
1 |          my_wait_20ms();
1 |      }
1 |
1 |  /*
1 |  \       set all SCANNED lights on
1 |  */
1 |
1 |  int      my_set_all_lamps_on()
1 |
1 |      {
1 |          my_send_data(0x2E);
1 |          my_send_data(0x41);
1 |          my_wait_20ms();
1 |      }
1 |
1 |  /*
1 |  \       test all SCANNED lights
1 |  */
1 |
1 |  int      my_test_all_lamps()
1 |
```

```
1 |      {
1 |          my_send_data(0x2E);
1 |          my_send_data(0x54);
1 |          my_wait_20ms();
1 |      }
1 |
1 |  /*
1 |  \       set SCANNED lights mode
1 |  */
1 |
1 |  int      my_init_lamps()
1 |
1 |      {
1 |          my_send_data(0x2E);
1 |          my_send_data(0x49);
1 |          my_wait_20ms();
1 |      }
1 |
1 |  /*
1 |  \       set a single SCANNED light on
1 |  */
1 |
1 |  int      my_set_lamp_on( int lamp )
1 |
1 |      {
1 |          my_send_data(0x2E);
1 |          my_send_data(0x53);
1 |          my_send_data(((lamp / 10) & 15) + 0x30);
1 |          my_send_data(((lamp % 10) & 15) + 0x30);
1 |      }
1 |
```

```
/*
\       set a single SCANNED lights off
*/ int     my_set_lamp_off( int lamp )

{
        my_send_data(0x2E);
        my_send_data(0x52);
        my_send_data(((lamp / 10) & 15) + 0x30);
        my_send_data(((lamp % 10) & 15) + 0x30);
        }

/*
\       set a SCANNED light on, clear all others
*/ int     my_change_lamp_scan( int lamp )

{
        my_set_all_lamps_off();
        my_set_lamp_on(lamp);
        }
```

```
/*
\       send a hex value to the '51
*/ int     my_hex_out( int hex )

{
        my_send_data(HEX_NIBBLE[(hex >> 4) & 15]);
        my_send_data(HEX_NIBBLE[hex & 15]);
        }

/*
\       set a DIRECT light on, clear all others, NOTE number range =
    0..79
*/ int     my_change_lamp_direct( int lamp )

{
        my_send_data(0x2E);                     /* the DOT command */
        my_send_data(0x50);                     /*   and 'P' option */ if (((lamp < 0) || (lamp > 79))) {
                my_hex_out(0x00);               /* 8051 port 0   */
                my_hex_out(0x00);               /* 8051 port 2   */
                my_hex_out(0x00);               /* 8051 port 1   */
                return;
                }
        my_hex_out(EXPAND_BIT[lamp >> 3]);       /* '51 port 0 */
        my_hex_out(EXPAND_BIT[lamp >> 3] >> 8);  /* '51 port 2 */
        my_hex_out(EXPAND_BIT[lamp  & 7]);       /* '51 port 1 */
        }

/*
\       change light to another.... NOTE: number range = 1..80
*/ int     my_change_to_lamp( int lamp )

{
    if( lamp < KeyOffset ) lamp += (80-KeyOffset);/* wrap around to bottom
        */
      else lamp -= KeyOffset;                   /* back off requested amount */
```

```
1 |
1 |   /*********** uncomment one of the following for desired I/O type
  |      ***********/
1 |
1 |   my_change_lamp_direct( lamp-1 );        /* use direct port I/O */
1 |
1 |   /*my_change_lamp_scan( lamp-1 );        /* use scanned port I/O */
1 |   }
1 |
1 |   /*
1 |    \     suck the COMM inp dry for a period...
1 |    */
```

08-22-89 13:27:40  LIGHTS.H                                      Pg  11
Mon 09-18-89 12:32:54              my_send_data                      of  11
                                                                     529-552

```
1 |
1 |   int       my_purge_input()
1 |
1 |             {
1 |             int       junk, times;
1 |             /*
1 |              \    eat any input stuff on my_comm port for 1 second
1 |              */
1 |             for( times=500; times <= 0; times-- ):
1 | /*
1 |                   if( my_comm_inp_ready ) then junk := my_comm_inp;
1 | */
1 |
1 |   /* ===============================================================
  |   ===== */
1 |   /* NOTE:the following is for actual use in PICS, normally we don't eat
  |   chars.*/
1 |   /* ===============================================================
  |   ===== */
1 |                   if (my_prn_inp_ready()) junk = my_prn_inp_data8();
1 |   /* ===============================================================
  |   ===== */
1 |
1 |             delay( 1 );
1 |             }
1 |             }
1 |
1 |   /* ----------------------------------------------------------------
  |   ---- */
$
```

Mon 09-18-89 12:32:54  INDEX (Cross Ref) Page.Line
 all identifiers
   1 08-22-89 13:27:40  LIGHTS.H

| | | | | | |
|---|---|---|---|---|---|
| bitty    | 5.226  | 5.230  |        |        |        |        |
| COMM     | 1.27   |        |        |        |        |        |
| clock    | 3.148  | 3=149  | 3.151  | 4.164  | 5.229  | 5=232  |
| DL_COM   | 1.28   | 6.283  | 6.284  | 6.286  | 6.287  | 6.288  |
|          | 6.290  | 6.294  |        |        |        |        |
| data     | 4=189  | 4=193  | 4=194  | 4=195  | 4=196  | 4=197  |
|          | 4=198  | 4=199  | 4=200  | 4=204  | 4.205  | 5.243  |
|          | 5.247  | 5.248  | 5.249  | 5.250  | 5.251  | 5.252  |
|          | 5.253  | 5.254  | 7.334  | 7.335  | 7.341  | 7.361  |
| delay    | 1.45   | 2.56   | 2.62   | 3.127  |        |        |
| EXPAND_BIT |      | 1.25   |        |        |        |        |
| FALSE    | 3.152  | 4.170  | 4.176  | 6.286  | 6.290  | 6.308  |
|          | 6.314  |        |        |        |        |        |

| | | | | | |
|---|---|---|---|---|---|
| HEX_NIBBLE | 1.23 | | | | |
| IE_COM | 1.31 | 6.279 | 6.296 | | |
| II_COM | 1.32 | | | | |
| inp | 3.152 | 4.169 | 4.176 | 6.286 | 6.290 | 6.310 |
| | 7.326 | 7.339 | 7.342 | | |
| itty_bit1 | | 5.229 | 5=230 | 5.231 | 5.233 |
| itty_bit2 | | 5.229 | 5=231 | 5.234 | |
| LC_COM | 1.33 | 6.278 | 6.295 | | |
| LS_COM | 1.35 | 6.310 | 7.339 | 7.342 | |
| MC_COM | 1.34 | | | | |
| MS_COM | 1.36 | | | | |
| my_comm_init | <6.274 | | | | |
| my_comm_inp | <7.321 | 7.346 | | | |
| my_comm_inp_ready | <6.304 | 7.325 | 7.346 | | |
| my_comm_open | 1.44 | 6=277 | 6=286 | 6=290 | 6.297 |
| | 6.307 | 7.324 | 7.338 | | |

Mon 09-18-89 12:32:54   INDEX (Cross Ref) Page.Line
all identifiers

| | | | | | |
|---|---|---|---|---|---|
| my_comm_out | <7.334 | | | | |
| my_prn_bit_inp | <3.145 | 4.193 | 4.194 | 4.195 | 4.196 |
| | 4.197 | 4.198 | 4.199 | 4.200 | 4.204 |
| | 5.218 | | | | |
| my_prn_bit_out | <5.226 | 5.246 | 5.247 | 5.248 | 5.249 |
| | 5.250 | 5.251 | 5.252 | 5.253 | 5.254 |
| | 5.255 | | | | |
| my_prn_clockit | <3.135 | 3.150 | 4.165 | 4.172 | 4.178 |
| my_prn_init | <3.118 | | | | |
| my_prn_inp | <5.212 | | | | |
| my_prn_inp_data8 | <4.186 | 5.219 | | | |
| my_prn_inp_ready | <4.161 | | | | |
| my_prn_out | <5.243 | | | | |
| my_send_data | <7.361 | | | | |
| my_wait_10ms | <2.54 | 6.285 | 6.289 | | |
| my_wait_20ms | <2.59 | 7.340 | | | |
| outp | 3.122 | 3.123 | 3.124 | 3.125 | 3.126 | 3.137 |
| | 3.138 | 4.154 | 5.233 | 5.234 | 5.236 | 6.278 |
| | 6.279 | 6.283 | 6.284 | 6.287 | 6.288 | 6.294 |
| | 6.295 | 6.296 | 7.341 | | | |
| PC_PRN | 1.42 | 3.122 | 3.123 | 3.124 | |
| PRN | 1.38 | | | | |
| PS_PRN | 1.41 | 3.152 | 4.169 | 4.176 | |

| | | | | | | |
|---|---|---|---|---|---|---|
| RX_COM | 1.29 | 7.326 | | | | |
| RX_PRN | 1.39 | | | | | |
| status | 6.306 | 6=310 | 6.311 | 7.323 | 7.337 | 7=339 |
| | 7=342 | 7=346 | | | | |
| TRUE | 3.128 | 3.152 | 4.176 | 6.277 | 6.312 | |
| TX_COM | 1.30 | 7.341 | | | | |
| TX_PRN | 1.40 | 3.125 | 3.126 | 3.137 | 3.138 | 4.154 |
| | 5.233 | 5.234 | 5.236 | | | |

Mon 09-18-89 12:32:54   INDEX (Cross Ref) Page.Line
all identifiers

| | | | |
|---|---|---|---|
| temp | 4.164 | 4=172 | 4=178 |
| wait | 3.121 | | |

08-14-89 14:26:30   SONY.H
Mon 09-18-89 12:37:39

```
/*
 *      Commands from computer to sony
 */ define     _ADDR_INQ                0x60
    #define     _AUDIO_MUTE_OFF          0x25
    #define     _AUDIO_MUTE_ON           0x24
    #define     _CLEAR_ENTRY             0x41
    #define     _CH1_ON                  0x46
    #define     _CH1_OFF                 0x47
    #define     _CH2_ON                  0x48
    #define     _CH2_OFF                 0x49
    #define     _CHAPTER_INQ             0x76
    #define     _CHAPTER_MODE            0x69
    #define     _CLEAR_ALL               0x56
    #define     _CONTINUE                0x61
    #define     _CX_ON                   0x6E
    #define     _CX_OFF                  0x6F
    #define     _EJECT                   0x2A
    #define     _EJECT_ENABLE            0x74
    #define     _EJECT_DIABLE            0x75
    #define     _ENTER                   0x40
    #define     _FWD_FAST                0x3B
    #define     _REV_FAST                0x4B
    #define     _FWD_PLAY                0x3A
    #define     _REV_PLAY                0x4A
    #define     _FWD_SCAN                0x3E
    #define     _REV_SCAN                0x4E
    #define     _FWD_SLOW                0x3C
    #define     _REV_SLOW                0x4C
    #define     _FWD_STEP                0x3D
    #define     _REV_STEP                0x4D
    #define     _FWD_SEP_AND_STILL       0x2B
    #define     _REV_STEP_AND_STILL      0x2C
    #define     _FRAME_MODE              0x55
    #define     _INDEX_ON                0x50
    #define     _INDEX_OFF               0x51
    #define     _MARK_RETURN             0x07
    #define     _MARK_SET                0x73
    #define     _MSEARCH                 0x5B
    #define     _MEMORY                  0x5A
    #define     _MENU                    0x42
    #define     _MOTOR_OFF               0x63
    #define     _MOTOR_ON                0x62
    #define     _NON_CF_PLAY             0x71
    #define     _ROM_VERSION_INQ         0x72
    #define     _SEARCH                  0x43
```

```
#define    _STATUS_INQ              0x67
#define    _PSC_ENABLE              0x28
#define    _PSC_DISABLE             0x29
#define    _REDO                    0x44
#define    _STILL                   0x4F
#define    _STOP                    0x3F
#define    _USER_INDEX_CONTROL      0x80
#define        _UIC_DISPLAY_MODE    0x00
```

08-14-89 14:26:30  SONY.H
Mon 09-18-89 12:37:39

```
#define    _UIC_STORE_CHAR          0x01
#define    _UIC_SET_WINDOW          0x02
#define    _UIC_END                 0x1A
#define    _USER_INDEX_ON           0x81
#define    _USER_INDEX_OFF          0x82
#define    _VIDEO_ON                0x27
#define    _VIDEO_OFF               0x26

/*
 *       Responses from sony to computer
 */ define    _ACK                     0x0A
define    _COMPLETION              0x01
#define    _ERROR                   0x02
#define    _LID_OPEN                0x03
#define    _NAK                     0x0B
#define    _NO_FRAME_NUMBER         0x06
#define    _NOT_TARGET              0x05
```

Mon 09-18-89 12:37:39  INDEX (Cross Ref) Page.Line
all identifiers
  1 08-14-89 14:26:30  SONY.H

_ACK               2.68

_ADDR_INQ          1.5

_AUDIO_MUTE_OFF    1.6

_AUDIO_MUTE_ON     1.7

_CHAPTER_INQ       1.13

_CHAPTER_MODE      1.14

_CH1_OFF    1.10

_CH1_ON     1.9

_CH2_OFF    1.12

_CH2_ON     1.11

_CLEAR_ALL         1.15

_CLEAR_ENTRY       1.8

_COMPLETION        2.69

_CONTINUE          1.16

_CX_OFF     1.18

_CX_ON      1.17

_EJECT      1.19

| Identifier | Page.Line |
|---|---|
| _EJECT_DIABLE | 1.21 |
| _EJECT_ENABLE | 1.20 |
| _ENTER | 1.22 |
| _ERROR | 2.70 |
| _FRAME_MODE | 1.35 |
| _FWD_FAST | 1.23 |
| _FWD_PLAY | 1.25 |
| _FWD_SCAN | 1.27 |

Mon 09-18-89 12:37:39   INDEX (Cross Ref) Page.Line
all identifiers

| Identifier | Page.Line |
|---|---|
| _FWD_SEP_AND_STILL | 1.33 |
| _FWD_SLOW | 1.29 |
| _FWD_STEP | 1.31 |
| _INDEX_OFF | 1.37 |
| _INDEX_ON | 1.36 |
| _LID_OPEN | 2.71 |
| _MARK_RETURN | 1.38 |
| _MARK_SET | 1.39 |
| _MEMORY | 1.41 |
| _MENU | 1.42 |
| _MOTOR_OFF | 1.43 |
| _MOTOR_ON | 1.44 |
| _MSEARCH | 1.40 |
| _NAK | 2.72 |
| _NO_FRAME_NUMBER | 2.73 |
| _NON_CF_PLAY | 1.45 |
| _NOT_TARGET | 2.74 |
| _PSC_DISABLE | 1.50 |
| _PSC_ENABLE | 1.49 |
| _REDO | 1.51 |
| _REV_FAST | 1.24 |
| _REV_PLAY | 1.26 |
| _REV_SCAN | 1.28 |
| _REV_SLOW | 1.30 |
| _REV_STEP | 1.32 |
| _REV_STEP_AND_STILL | 1.34 |

Mon 09-18-89 12:37:39   INDEX (Cross Ref) Page.Line
all identifiers

| | |
|---|---|
| _ROM_VERSION_INQ | 1.46 |
| _SEARCH | 1.47 |
| _STATUS_INQ | 1.48 |
| _STILL | 1.52 |
| _STOP | 1.53 |
| _UIC_DISPLAY_MODE | 1.55 |
| _UIC_END | 2.58 |
| _UIC_SET_WINDOW | 2.57 |
| _UIC_STORE_CHAR | 2.56 |
| _USER_INDEX_CONTROL | 1.54 |
| _USER_INDEX_OFF | 2.60 |
| _USER_INDEX_ON | 2.59 |
| _VIDEO_OFF | 2.62 |
| _VIDEO_ON | 2.61 |

08-19-88 12:15:00   COMM.H
Mon 09-18-89 12:32:39          defined

```
/**********************************************************************
******
    COMM.H -- header file for C programs using async functions.

Mike Dumdei,  6 Holly Lane,  Texarkana TX  75503

**********************************************************************
*****/ if !defined(PTR_SZ_SET)            /* define TURBO before including if */
    #if defined(TURBO)              /*  you are using Turbo C           */
        #define _NeaR
    #else
        #define _NeaR near
    #endif
    #define PTR_SZ_SET
endif define         COM1            0
define         COM2            1           /* com1 or com2 if using
 defaults */

/*  ---- Return codes ----  */
#define         R_OK            0
#define         R_NOPORT        -1
#define         R_PORTINUSE     -2
#define         R_BAUDERR       -3
#define         R_PARITYERR     -4
#define         R_DTABITERR     -5
#define         R_STPBITERR     -6
#define         R_BADARG        -7
#define         R_NOMEM         -8
#define         R_TXERR         -9
```

```
/* ---- Bit masks ---- */
                        /*   S T A T 2   */
#define     B_XUSE      0x0001      /* using XON/XOFF protocol
 bit */
#define     B_XRXD      0x0002                  /* XOFF received
 bit */
#define     B_XSENT     0x0004                      /* XOFF sent
 bit */
#define     B_TXEMPTY   0x0008          /* nothing to transmit
 bit */
#define     B_CTS       0x0010                /* clear to send
 bit */
#define     B_DSR       0x0020               /* data set ready
 bit */
#define     B_FLOWHALT  0x0040          /* flow halt indicator
 bit */
#define     B_MNTR_CD   0x0080                   /* monitor CD
 bit */
```

Mon 09-18-89 12:32:39       i       CONTENTS
                         Page       Line 08-19-88 12:15:00
COMM.H                      1          1
COMM.H      defined         1          9
COMM.H      defined         1         10
COMM.H      SET_COM         2         56
COMM.H      defined         2         64
COMM.H      defined         2         75
COMM.H      RXLITES         2         76
COMM.H      d_nchat         2         80
COMM.H      TXLITES         2         81
COMM.H      d_nchat         2         85
COMM.H      RXLITES         2         87
COMM.H      TXLITES         2         91
COMM.H      pack            3        100
COMM.H      pack            4        143
COMM.H                      5        174

```
                        /*   S T A T 1   */
#define     B_RXOVF     0x0100      /* rx buffer overflow indic
 bit */
#define     B_OVERRUN   0x0200             /* char overrun error
 bit */
#define     B_PARITY    0x0400                   /* parity error
 bit */
#define     B_FRAMING   0x0800                  /* framing error
 bit */
#define     B_BREAK     0x1000             /* line break signal
 detected */
#define     B_BADPORT   0x2000                       /* bad port
 bit */
#define     B_RXEMPTY   0x4000              /* rx buffer empty
 bit */
#define     B_CD        0x8000           /* carrier detect bit
 mask */

/* ---- R E M A P   P O R T   S T R U C T U R E   M A C R O ---- */
#define SET_COM(ps,adrs,vctr,irq)   \
    (ps).ComBase = (adrs),          \
    (ps).Vector = (vctr),           \
    (ps).IRQMask = (~(1 << (irq))), \
    async_spec = 1

/* ---- M A C R O S   &   D E F I N E S   F O R   L I T E S ---- */
```

```
#if defined(LITES)
EXTERN INT _NeaR rxlgtadr;
EXTERN INT _NeaR rxlgtstrt;
EXTERN INT _NeaR rxlgtend;
EXTERN INT _NeaR rxcolrs;
EXTERN INT _NeaR txlgtadr;
EXTERN INT _NeaR txlgtstrt;
EXTERN INT _NeaR txlgtend;
EXTERN INT _NeaR txcolrs;
EXTERN CHAR _NeaR litesok;

#if defined(ANSIX)
        #define RXLITES(r,bc,ec,ch,atr)                         \
rxlgtadr = rxlgtstrt = (2 * ((r) * 80 + (bc))),                 \
rxlgtend = (2 * ((r) * 80 + (ec))),                             \
rxcolrs = ((atr) * 256 + (0x00ff & (ch))),                      \
d_nchat((r), (bc), '\0', '\0', ((ec) - (bc) + 1), 1)
        #define TXLITES(r,bc,ec,ch,atr)                         \
txlgtadr = txlgtstrt = (2 * ((r) * 80 + (bc))),                 \
txlgtend = (2 * ((r) * 80 + (ec))),                             \
txcolrs = ((atr) * 256 + (0x00ff & (ch))),                      \
d_nchat((r), (bc), '\0', '\0', ((ec) - (bc) + 1), 1)
    #else
        #define RXLITES(r,bc,ec,ch,atr)                         \
rxlgtadr = rxlgtstrt = (2 * ((r) * 80 + (bc))),                 \
rxlgtend = (2 * ((r) * 80 + (ec))),                             \
rxcolrs = ((atr) * 256 + (0x00ff & (ch)))
        #define TXLITES(r,bc,ec,ch,atr)                         \
txlgtadr = txlgtstrt = (2 * ((r) * 80 + (bc))),                 \
txlgtend = (2 * ((r) * 80 + (ec))),                             \
txcolrs = ((atr) * 256 + (0x00ff & (ch)))
    #endif
#endif

/* -- P O R T   S T R U C T U R E   &   G L O B A L   V A R   D E C L
   -- */ pragma pack(1)     /* be sure and use byte align to reference port
 struc */

STRUCT ASYNC_PORT
1   +--(
1   |   UNSIGNED INT    NewVctr_SEG;        /* segment of new int vector
    |   */
1   |   UNSIGNED INT    NewVctr_OFST;       /* offset addr of new int vector
    |   */
1   |   UNSIGNED CHAR   Vector;             /* vctr nmbr assoc with slctd com port
    |   */
1   |   UNSIGNED CHAR   IRQMask;            /* Mask to enable 8259 interrupt
    |   */
1   |   UNSIGNED INT    ComBase;            /* base port address of for comm port
    |   */
1   |   UNSIGNED CHAR   Stat2;      /* secondary status byte (see bitmap in DOC)
    |   */
1   |   UNSIGNED CHAR   Stat1;      /* primary status byte (see bitmap in DOC)
    |   */
1   |   UNSIGNED CHAR   TxStat;     /* determines when tx_intrpts need turned on
    |   */
1   |   UNSIGNED CHAR   MSR_Mask;   /* slcts bits in MSR montrd for flow cntrl
    |   */
1   |   UNSIGNED INT    TxTop;              /* ptr to beginning of tx buffer
    |   */
1   |   UNSIGNED INT    RxTop;      /* begin of rx bufr (also end of tx bufr + 1)
    |   */
1   |   UNSIGNED INT    RxBtm;              /* ptr to end of rx bufr (end + 1)
    |   */
1   |   UNSIGNED INT    TxIn;               /* ptr to where next 'put' goes
```

```
1 |  UNSIGNED INT    TxOut;          /* ptr to where next tx'd comes from */
1 |  UNSIGNED INT    TxFree;         /* remaining tx bufr space */
1 |  UNSIGNED INT    TxSize;         /* total size of tx bufr */
1 |  UNSIGNED INT    RxIn;           /* ptr to where next rx'd goes */
1 |  UNSIGNED INT    RxOut;          /* ptr to where next 'get' comes from */
1 |  UNSIGNED INT    RxFree;         /* remaining bytes in rx bufr space */
1 |  UNSIGNED INT    RxSize;         /* total size of rx bufr */
1 |  UNSIGNED INT    RxTxSEG;        /* segment of rx/tx bufrs if FAR ptrs */
1 |  UNSIGNED INT    BaudDvsr;       /* baud rate divisor */
1 |  UNSIGNED CHAR   PDSinfo;        /* parity, = dta bits, = stop bits */
1 |  UNSIGNED CHAR   XTxRpt;         /* countdown val befr repeat tx of XOFF */
1 |  UNSIGNED CHAR   TxImmedChar;    /* char to be tx'd 1st opportunity */
1 |  UNSIGNED INT    OldVctrSEG;     /* segment addr of old int vector */
1 |  UNSIGNED INT    OldVctrOfst;    /* offset addr of old int vector */
1 |  UNSIGNED CHAR   Old8259Mask;    /* original 8259 interrupt mask */
1 |  UNSIGNED CHAR   OldLCR;         /* original Line Control Reg value */
1 |  UNSIGNED CHAR   OldMCR;         /* original Modem Cntrl Reg value */
1 |  UNSIGNED CHAR   OldIER;         /* original Interrupt Enable Reg value */
1 |  UNSIGNED CHAR   StripMask;      /* mask for high bit stripping */
1 |  UNSIGNED CHAR   MSRVal;         /* present value of modem status register */
1 |  UNSIGNED CHAR   Stat3;          /* another flag (see doc for bitmap) */
+--};

EXTERN STRUCT ASYNC_PORT _NeaR PortStruc1;  /* global port structures */
    EXTERN STRUCT ASYNC_PORT _NeaR PortStruc2;  /*   located in ASYNC.ASM */ pragma pack()                              /* back to default structure
    alignment */

EXTERN INT _NeaR async_spec;/* used when user defines comm base, vctr,
    IRQ */

/* ---- F U N C T I O N   D E C L A R A T I O N S  ---- */
    INT     async_open(INT, CHAR *, INT, INT);        /* open async
    port */
    INT     async_close(INT);                         /* close async
    port */
    INT     async_tx(INT, CHAR);                      /* transmit
    character */
    INT     async_rx(INT);                            /* receive a
    character */
    INT     async_reset(INT);                         /* Reset rx error
    condition */
    INT     async_stat(INT, INT);                     /* get stat1/stat2
    bytes */
```

```
    INT     async_carrier(INT);          /* fast ck for carrier
    dtct */
    INT     async_setbpds(INT, CHAR *);       /* change line
```

```
    parameters */
    INT     async_rxcnt(INT);            /* get = bytes in rx
    buffer */
    INT     async_txfree(INT);           /* get bytes free in tx
    bufr */
    INT     async_rxflush(INT);          /* flush the receive
    buffer */
    INT     async_txflush(INT);          /* flush the transmit
    buffer */
    INT     async_msr(INT);              /* get modem status
    register */
    INT     async_msrflow(INT, INT);     /* set MSR related flw
    cntrl */
    INT     async_xonoff(INT, INT);      /* XON/OFF protocl
    on/off */
    INT     async_xoffclr(INT);          /* manually clr XOFF
    rx'd */
    INT     async_xonset(INT);           /* manually set XOFF
    rx'd */
    INT     async_xonany(INT, INT);      /* Any char = XON
    on/off */
    INT     async_dtr(INT, INT);                          /* DTR
    on/off */
    INT     async_rts(INT, INT);                          /* RTS
    on/off */
    INT     async_tximd(INT, CHAR *, INT);    /* Tx blk data as next
    out */
    INT     async_strip(INT, CHAR);      /* Set bit stripping
    mask */
    INT     async_sndbrk(INT, INT);      /* Set/clr tx modem brk
    sgnl */
    INT     async_stop(INT);             /* disable comm chip
    interrupts */
    INT     async_restart(INT);          /* re-initialize a frozen
    port */
```

Mon 09-18-89 12:32:39  INDEX (Cross Ref) Page.Line
 all identifiers
  1 08-19-88 12:15:00  COMM.H

| | | | | | |
|---|---|---|---|---|---|
| _NeaR | 1.11 | 1.13 | 2.65 | 2.66 | 2.67 | 2.68 |
| | 2.69 | 2.70 | 2.71 | 2.72 | 2.73 | 4.140 |
| | 4.141 | 4.145 | | | | |

.ComBase    2=57

.IRQMask    2=59

.Vector     2=58

ANSIX         2.75
async_carrier        4.155
ASYNC_PORT           3.102    4.140    4.141
async_close          4.150
adrs          2.56   2.57

| Identifier | Page.Line | | | | |
|---|---|---|---|---|---|
| async_dtr | 5.167 | | | | |
| async_msr | 5.161 | | | | |
| async_msrflow | 5.162 | | | | |
| async_open | 4.149 | | | | |
| async_reset | 4.153 | | | | |
| async_restart | 5.173 | | | | |
| async_rts | 5.168 | | | | |
| async_rx | 4.152 | | | | |
| async_rxcnt | 5.157 | | | | |
| async_rxflush | 5.159 | | | | |
| async_setbpds | 4.156 | | | | |
| async_sndbrk | 5.171 | | | | |
| async_spec | 2=60 | 4.145 | | | |
| async_stat | 4.154 | | | | |
| async_stop | 5.172 | | | | |

Mon 09-18-89 12:32:39 INDEX (Cross Ref) Page.Line
all identifiers

| Identifier | Page.Line | | | | |
|---|---|---|---|---|---|
| async_strip | 5.170 | | | | |
| async_tx | 4.151 | | | | |
| async_txflush | 5.160 | | | | |
| async_txfree | 5.158 | | | | |
| async_tximd | 5.169 | | | | |
| async_xoffclr | 5.164 | | | | |
| async_xonany | 5.166 | | | | |
| async_xonoff | 5.163 | | | | |
| async_xonset | 5.165 | | | | |
| atr | 2.76 | 2.79 | 2.81 | 2.84 | 2.87 | 2.90 |
| | 2.91 | 3.94 | | | |
| B_BADPORT | 2.51 | | | | |
| B_BREAK | 2.50 | | | | |
| B_CD | 2.53 | | | | |
| B_CTS | 1.40 | | | | |
| B_DSR | 1.41 | | | | |
| B_FLOWHALT | 1.42 | | | | |
| B_FRAMING | 2.49 | | | | |
| B_MNTR_CD | 1.43 | | | | |
| B_OVERRUN | 2.47 | | | | |

| | | | | | |
|---|---|---|---|---|---|
| B_PARITY | 2.48 | | | | |
| B_RXEMPTY | | 2.52 | | | |
| B_RXOVF | 2.46 | | | | |
| B_TXEMPTY | | 1.39 | | | |
| B_XRXD | 1.37 | | | | |
| B_XSENT | 1.38 | | | | |

Mon 09-18-89 12:32:39  INDEX (Cross Ref) Page.Line
all identifiers

| | | | | | |
|---|---|---|---|---|---|
| B_XUSE | 1.36 | | | | |
| BaudDvsr | 4.125 | | | | |
| bc | 2.76 | 2.77 | 2.80 | 2.81 | 2.82 | 2.85 |
| | 2.87 | 2.88 | 2.91 | 3.92 | | |
| COM1 | 1.18 | | | | |
| COM2 | 1.19 | | | | |
| ComBase | 3.108 | | | | |
| ch | 2.76 | 2.79 | 2.81 | 2.84 | 2.87 | 2.90 |
| | 2.91 | 3.94 | | | | |
| d_nchat | <2.80 | <2.85 | | | | |
| defined | <1.9 | <1.10 | <2.64 | <2.75 | 1.10 | 2.64 |
| | 2.75 | | | | | |
| ec | 2.76 | 2.78 | 2.80 | 2.81 | 2.83 | 2.85 |
| | 2.87 | 2.89 | 2.91 | 3.93 | | |
| IRQMask | 3.107 | | | | |
| irq | 2.56 | 2.59 | | | | |
| LITES | 2.64 | | | | |
| litesok | 2.73 | | | | |
| MSR_Mask | 3.112 | | | | |
| MSRVal | 4.136 | | | | |
| NewVctr_OFST | | 3.105 | | | | |
| NewVctr_SEG | | 3.104 | | | | |
| near | 1.13 | | | | |
| OldIER | 4.134 | | | | |
| OldLCR | 4.132 | | | | |
| OldMCR | 4.133 | | | | |
| OldVctrOfst | | 4.130 | | | | |
| OldVctrSEG | | 4.129 | | | | |

Mon 09-18-89 12:32:39   INDEX (Cross Ref) Page.Line
 all identifiers

| Identifier | | | | | |
|---|---|---|---|---|---|
| Old8259Mask | 4.131 | | | | |
| PDSinfo | 4.126 | | | | |
| PortStruc1 | 4.140 | | | | |
| PortStruc2 | 4.141 | | | | |
| PTR_SZ_SET | 1.9 | 1.15 | | | |
| pack | <3.100 | <4.143 | | | |
| ps | 2.56 | 2.57 | 2.58 | 2.59 | |
| R_BADARG | 1.29 | | | | |
| R_BAUDERR | 1.25 | | | | |
| R_DTABITERR | 1.27 | | | | |
| R_NOMEM | 1.30 | | | | |
| R_NOPORT | 1.23 | | | | |
| R_OK | 1.22 | | | | |
| R_PARITYERR | 1.26 | | | | |
| R_PORTINUSE | 1.24 | | | | |
| R_STPBITERR | 1.28 | | | | |
| R_TXERR | 1.31 | | | | |
| RXLITES | <2.76 | <2.87 | | | |
| RxBtm | 3.115 | | | | |
| RxFree | 3.122 | | | | |
| RxIn | 3.120 | | | | |
| RxOut | 3.121 | | | | |
| RxSize | 3.123 | | | | |
| RxTop | 3.114 | | | | |
| RxTxSEG | 3.124 | | | | |
| r | 2.76 | 2.77 | 2.78 | 2.80 | 2.81 | 2.82 |
|   | 2.83 | 2.85 | 2.87 | 2.88 | 2.89 | 2.91 |
|   | 3.92 | 3.93 | | | | |

Mon 09-18-89 12:32:39   INDEX (Cross Ref) Page.Line
 all identifiers

| Identifier | | | |
|---|---|---|---|
| rxcolrs | 2.68 | 2=79 | 2=90 |
| rxlgtadr | 2.65 | 2=77 | 2=88 |
| rxlgtend | 2.67 | 2=78 | 2=89 |
| rxlgtstrt | 2.66 | 2=77 | 2=88 |
| SET_COM | <2.56 | | |

| | | | | |
|---|---|---|---|---|
| Stat1 | 3.110 | | | |
| Stat2 | 3.109 | | | |
| Stat3 | 4.137 | | | |
| StripMask | | 4.135 | | |
| TURBO | 1.10 | | | |
| TXLITES | <2.81 | <2.91 | | |
| TxFree | 3.118 | | | |
| TxImmedChar | | 4.128 | | |
| TxIn | 3.116 | | | |
| TxOut | 3.117 | | | |
| TxSize | 3.119 | | | |
| TxStat | 3.111 | | | |
| TxTop | 3.113 | | | |
| txcolrs | 2.72 | 2=84 | 3=94 | |
| txlgtadr | 2.69 | 2=82 | 3=92 | |
| txlgtend | 2.71 | 2=83 | 3=93 | |
| txlgtstrt | | 2.70 | 2=82 | 3=92 |
| Vector | 3.106 | | | |
| vctr | 2.56 | 2.58 | | |
| XTxRpt | 4.127 | | | |

APPENDIX 2

Preview System 8051 Assembly Language © Copyright, 1989, Tallon Foods Corporation d/b/a PICS Previews. All Rights Reserved.

```
 Mon 09-18-89 12:37:48      i     CONTENTS
                                Page    Line 08-21-89 11:39:30
    SCAN.H                        1        1
    SCAN.H        Video_Switch    1       33
    SCAN.H        InitBoard       2       65
    SCAN.H        Beep            2       77
    SCAN.H        AllRowsOff      2       86
    SCAN.H        Key             2       95
    SCAN.H                        6      269
```

```c
/* ***********************************************************************
   *** */
/*                    PICS DRIVER BOARD STUFF.....              */
/* ***********************************************************************
   *** */ define PORT_A          0x2C8
define PORT_B          0x2C9
#define PORT_C          0x2CA
#define PORT_CTRL       0x2CB
define CMD_CTRL        0x90        /* Port A input, Ports B & C output */ define CMD_SETROW9     0x01        /* Bit set/reset commands */
define CMD_CLRROW9     0x00
#define CMD_SETROW10    0x03
#define CMD_CLRROW10    0x02
#define CMD_SETBEEP     0x05
#define CMD_CLRBEEP     0x04
#define CMD_SETMUTE     0x0B
#define CMD_CLRMUTE     0x0A
#define CMD_SETSEL1     0x0D
#define CMD_CLRSEL1     0x0C
#define CMD_SETSEL2     0x0F
define CMD_CLRSEL2     0x0E define SEL_BLACK       0
define SEL_1           1
#define SEL_2           2
#define SEL_CGA         3

STATIC  INT     kbc,Row;

/* ***********************************************************************
   *** */

INT     Video_Switch( INT I )
1   +--{
2   |+--SWITCH (I) {
2   ||  CASE SEL_BLACK:
2   ||    outp( PORT_CTRL, CMD_SETMUTE );
2   ||    delay( 1 );
2   ||    outp( PORT_CTRL, CMD_CLRSEL1 );
2   ||    outp( PORT_CTRL, CMD_SETSEL2 );
2   ||    BREAK;
2   ||  CASE SEL_1:
2   ||    outp( PORT_CTRL, CMD_CLRSEL1 );
2   ||    outp( PORT_CTRL, CMD_CLRSEL2 );
2   ||    delay( 1 );
2   ||    outp( PORT_CTRL, CMD_CLRMUTE );
2   ||    BREAK;
2   ||  CASE SEL_2:
2   ||    outp( PORT_CTRL, CMD_SETSEL1 );
2   ||    outp( PORT_CTRL, CMD_CLRSEL2 );
2   ||    delay( 1 );
```

```
08-21-89 11:39:30   SCAN.H
Mon 09-18-89 12:37:48           InitBoard

2  ||    outp( PORT_CTRL, CMD_CLRMUTE );
2  ||    BREAK;
2  ||  CASE SEL_CGA:
2  ||    outp( PORT_CTRL, CMD_SETMUTE );
2  ||    delay( 1 );
2  ||    outp( PORT_CTRL, CMD_SETSEL1 );
2  ||    outp( PORT_CTRL, CMD_SETSEL2 );
2  ||    BREAK;
1  |+--}
   +--}

/* ****************************************************************
      *** */

INT         InitBoard()
1  +--(
1  |  outp( PORT_CTRL, CMD_CTRL);
1  |  delay( 1 );
1  |  outp( PORT_B, 0x00);
1  |  delay( 1 );
1  |  outp( PORT_C, 0xDC);
1  |  kbc = 0x0f;
   +--}

/* ****************************************************************
      *** */

INT         Beep()
1  +--(
1  |  outp( PORT_CTRL, CMD_CLRBEEP );
1  |  delay( 0 );
1  |  outp( PORT_CTRL, CMD_SETBEEP );
   +--}

/* ****************************************************************
      *** */

INT         AllRowsOff()
1  +--(
1  |  outp( PORT_B, 0x00);
1  |  outp( PORT_CTRL, CMD_CLRROW9);
1  |  outp( PORT_CTRL, CMD_CLRROW10);
   +--}

/* ****************************************************************
      *** */

INT         Key()
1  +--(
1  |  INT         keyin;
1  |
1  |  AllRowsOff();
1  |
2  |+--FOR( Row = 1; Row <= 10; ++Row ) (
2  ||
```

```
08-21-89 11:39:30  SCAN.H
Mon 09-18-89 12:37:48           Key

3   ||+--SWITCH( Row ){
3   |||  CASE   1:    outp( PORT_B,   0x01 );              BREAK;
3   |||  CASE   2:    outp( PORT_B,   0x02 );              BREAK;
3   |||  CASE   3:    outp( PORT_B,   0x04 );              BREAK;
3   |||  CASE   4:    outp( PORT_B,   0x08 );              BREAK;
3   |||  CASE   5:    outp( PORT_B,   0x10 );              BREAK;
3   |||  CASE   6:    outp( PORT_B,   0x20 );              BREAK;
3   |||  CASE   7:    outp( PORT_B,   0x40 );              BREAK;
3   |||  CASE   8:    outp( PORT_B,   0x80 );              BREAK;
3   |||  CASE   9:    outp( PORT_CTRL,CMD_SETROW9 );       BREAK;
3   |||  CASE  10:    outp( PORT_CTRL,CMD_SETROW10);       BREAK;
2   ||+--)
2   ||
2   ||  /*·  delay( 1 );         */
2   ||   FOR( keyin = 0; keyin < 10; ++keyin, delay(0) );
2   ||
2   ||   keyin = inp( PORT_A );              /* sample the COL lines */
2   ||
2   ||   AllRowsOff();
2   ||
3   ||+--IF( keyin != 0 ) {
3   |||
3   |||/*printf("\nRow=%02x, Keyin=%02x, KBC=%x",Row&255,keyin&255,kbc&15 );*/
3   |||
3   |||   kbc &= 7;                          /* reset allup   */
3   |||
4   |||+--IF( kbc == 0 );
4   ||||
4   ||||   kbc = 0x0f;
4   ||||
5   ||||+--IF( keyin & 1 ){
6   |||||+--SWITCH( Row ){
6   ||||||  CASE   1:    KeyNumb =  1; BREAK;
6   ||||||  CASE   2:    KeyNumb =  9; BREAK;
6   ||||||  CASE   3:    KeyNumb = 17; BREAK;
6   ||||||  CASE   4:    KeyNumb = 25; BREAK;
6   ||||||  CASE   5:    KeyNumb = 33; BREAK;
6   ||||||  CASE   6:    KeyNumb = 41; BREAK;
6   ||||||  CASE   7:    KeyNumb = 49; BREAK;
6   ||||||  CASE   8:    KeyNumb = 57; BREAK;
6   ||||||  CASE   9:    KeyNumb = 65; BREAK;
6   ||||||  CASE  10:    KeyNumb = 73; BREAK;
5   |||||+--)
5   |||||   RETURN TRUE;
4   ||||+--)
5   ||||+--IF( keyin & 2 ){
6   |||||+--SWITCH( Row ){
6   ||||||  CASE   1:    KeyNumb =  2; BREAK;
6   ||||||  CASE   2:    KeyNumb = 10; BREAK;
6   ||||||  CASE   3:    KeyNumb = 18; BREAK;
6   ||||||  CASE   4:    KeyNumb = 26; BREAK;
6   ||||||  CASE   5:    KeyNumb = 34; BREAK;
6   ||||||  CASE   6:    KeyNumb = 42; BREAK;
6   ||||||  CASE   7:    KeyNumb = 50; BREAK;
6   ||||||  CASE   8:    KeyNumb = 58; BREAK;
```

```
6 |||||| CASE   9:    KeyNumb = 66; BREAK;
6 |||||| CASE  10:    KeyNumb = 74; BREAK;
5 |||||+--)
5 |||||  RETURN TRUE;
4 ||||+--)
5 ||||+--IF( keyin & 4 ){
6 |||||+--SWITCH( Row ){
6 ||||||  CASE   1:    KeyNumb =  3; BREAK;
6 ||||||  CASE   2:    KeyNumb = 11; BREAK;
6 ||||||  CASE   3:    KeyNumb = 19; BREAK;
6 ||||||  CASE   4:    KeyNumb = 27; BREAK;
6 ||||||  CASE   5:    KeyNumb = 35; BREAK;
6 ||||||  CASE   6:    KeyNumb = 43; BREAK;
6 ||||||  CASE   7:    KeyNumb = 51; BREAK;
6 ||||||  CASE   8:    KeyNumb = 59; BREAK;
6 ||||||  CASE   9:    KeyNumb = 67; BREAK;
6 ||||||  CASE  10:    KeyNumb = 75; BREAK;
5 |||||+--)
5 |||||  RETURN TRUE;
4 ||||+--)
5 ||||+--IF( keyin & 8 ){
6 |||||+--SWITCH( Row ){
6 ||||||  CASE   1:    KeyNumb =  4; BREAK;
6 ||||||  CASE   2:    KeyNumb = 12; BREAK;
6 ||||||  CASE   3:    KeyNumb = 20; BREAK;
6 ||||||  CASE   4:    KeyNumb = 28; BREAK;
6 ||||||  CASE   5:    KeyNumb = 36; BREAK;
6 ||||||  CASE   6:    KeyNumb = 44; BREAK;
6 ||||||  CASE   7:    KeyNumb = 52; BREAK;
6 ||||||  CASE   8:    KeyNumb = 60; BREAK;
6 ||||||  CASE   9:    KeyNumb = 68; BREAK;
6 ||||||  CASE  10:    KeyNumb = 76; BREAK;
5 |||||+--)
5 |||||  RETURN TRUE;
4 ||||+--)
5 ||||+--IF( keyin & 16 ){
6 |||||+--SWITCH( Row ){
6 ||||||  CASE   1:    KeyNumb =  5; BREAK;
6 ||||||  CASE   2:    KeyNumb = 13; BREAK;
6 ||||||  CASE   3:    KeyNumb = 21; BREAK;
6 ||||||  CASE   4:    KeyNumb = 29; BREAK;
6 ||||||  CASE   5:    KeyNumb = 37; BREAK;
6 ||||||  CASE   6:    KeyNumb = 45; BREAK;
6 ||||||  CASE   7:    KeyNumb = 53; BREAK;
6 ||||||  CASE   8:    KeyNumb = 61; BREAK;
6 ||||||  CASE   9:    KeyNumb = 69; BREAK;
6 ||||||  CASE  10:    KeyNumb = 77; BREAK;
5 |||||+--)
5 |||||  RETURN TRUE;
4 ||||+--)
5 ||||+--IF( keyin & 32 ){
6 |||||+--SWITCH( Row ){
6 ||||||  CASE   1:    KeyNumb =  6; BREAK;
6 ||||||  CASE   2:    KeyNumb = 14; BREAK;
6 ||||||  CASE   3:    KeyNumb = 22; BREAK;
```

```
6 ||||||     CASE  4:    KeyNumb = 30; BREAK;
6 ||||||     CASE  5:    KeyNumb = 38; BREAK;
6 ||||||     CASE  6:    KeyNumb = 46; BREAK;
6 ||||||     CASE  7:    KeyNumb = 54; BREAK;
6 ||||||     CASE  8:    KeyNumb = 62; BREAK;
6 ||||||     CASE  9:    KeyNumb = 70; BREAK;
6 ||||||     CASE 10:    KeyNumb = 78; BREAK;
5 |||||+--}
5 |||||   RETURN TRUE;
4 ||||+--}
5 ||||+--IF( keyin & 64 ){
6 |||||+--SWITCH( Row ){
6 ||||||     CASE  1:    KeyNumb =  7; BREAK;
6 ||||||     CASE  2:    KeyNumb = 15; BREAK;
6 ||||||     CASE  3:    KeyNumb = 23; BREAK;
6 ||||||     CASE  4:    KeyNumb = 31; BREAK;
6 ||||||     CASE  5:    KeyNumb = 39; BREAK;
6 ||||||     CASE  6:    KeyNumb = 47; BREAK;
6 ||||||     CASE  7:    KeyNumb = 55; BREAK;
6 ||||||     CASE  8:    KeyNumb = 63; BREAK;
6 ||||||     CASE  9:    KeyNumb = 71; BREAK;
6 ||||||     CASE 10:    KeyNumb = 79; BREAK;
5 |||||+--}
5 |||||   RETURN TRUE;
4 ||||+--}
5 ||||+--ELSE ( /*       keyin must equal 128 ? */
6 |||||+--SWITCH( Row ){
6 ||||||     CASE  1:    KeyNumb =  8; BREAK;
6 ||||||     CASE  2:    KeyNumb = 16; BREAK;
6 ||||||     CASE  3:    KeyNumb = 24; BREAK;
6 ||||||     CASE  4:    KeyNumb = 32; BREAK;
6 ||||||     CASE  5:    KeyNumb = 40; BREAK;
6 ||||||     CASE  6:    KeyNumb = 48; BREAK;
6 ||||||     CASE  7:    KeyNumb = 56; BREAK;
6 ||||||     CASE  8:    KeyNumb = 64; BREAK;
6 ||||||     CASE  9:    KeyNumb = 72; BREAK;
6 ||||||     CASE 10:    KeyNumb = 80; BREAK;
5 |||||+--}
5 |||||   RETURN TRUE;
4 ||||+--}
3 |||+--}
2 ||+--}
1 |+--}    /* for Row 1 to 10 */
1 |  /*
1 |   *     simply count down debounce logic stuff...
1 |   */
1 |
2 |+--SWITCH( kbc & 0x0c ){
2 ||   CASE 0x0c:
2 ||   CASE 0x00:   --kbc; kbc &= 0x0f; kbc |= 0x08;      BREAK;
2 ||   CASE 0x04:   kbc = 0x0f;                           BREAK;
2 ||   CASE 0x08:   kbc = 0x0b;                           BREAK;
1 |+--}
1 |   RETURN FALSE;
  +--}
```

```
/* *****************************************************************
 *** */
```

Mon 09-18-89 12:37:48   INDEX (Cross Ref) Page.Line
  all identifiers
    1 08-21-89 11:39:30   SCAN.H

| Identifier | | | | | |
|---|---|---|---|---|---|
| AllRowsOff | <2.86 | 2.99 | 3.121 | | |
| Beep | <2.77 | | | | |
| CMD_CLRBEEP | 1.16 | 2.79 | | | |
| CMD_CLRMUTE | 1.18 | 1.46 | 2.52 | | |
| CMD_CLRROW10 | 1.14 | 2.90 | | | |
| CMD_CLRROW9 | 1.12 | 2.89 | | | |
| CMD_CLRSEL1 | 1.20 | 1.39 | 1.43 | | |
| CMD_CLRSEL2 | 1.22 | 1.44 | 1.50 | | |
| CMD_CTRL | 1.9 | 2.67 | | | |
| CMD_SETBEEP | 1.15 | 2.81 | | | |
| CMD_SETMUTE | 1.17 | 1.37 | 2.55 | | |
| CMD_SETROW10 | 1.13 | 3.113 | | | |
| CMD_SETROW9 | 1.11 | 3.112 | | | |
| CMD_SETSEL1 | 1.19 | 1.49 | 2.57 | | |
| CMD_SETSEL2 | 1.21 | 1.40 | 2.58 | | |
| delay | 1.38 | 1.45 | 1.51 | 2.56 | 2.68 | 2.70 |
| | 2.80 | 3.117 | | | |
| FALSE | 5.266 | | | | |
| I | 1.33 | 1.35 | | | |
| InitBoard | | <2.65 | | | |
| inp | 3.119 | | | | |
| Key | <2.95 | | | | |
| KeyNumb | 3=135 | 3=136 | 3=137 | 3=138 | 3=139 | 3=140 |
| | 3=141 | 3=142 | 3=143 | 3=144 | 3=150 | 3=151 |
| | 3=152 | 3=153 | 3=154 | 3=155 | 3=156 | 3=157 |
| | 4=158 | 4=159 | 4=165 | 4=166 | 4=167 | 4=168 |
| | 4=169 | 4=170 | 4=171 | 4=172 | 4=173 | 4=174 |
| | 4=180 | 4=181 | 4=182 | 4=183 | 4=184 | 4=185 |
| | 4=186 | 4=187 | 4=188 | 4=189 | 4=195 | 4=196 |
| | 4=197 | 4=198 | 4=199 | 4=200 | 4=201 | 4=202 |
| | 4=203 | 4=204 | 4=210 | 4=211 | 4=212 | 5=213 |
| | 5=214 | 5=215 | 5=216 | 5=217 | 5=218 | 5=219 |
| | 5=225 | 5=226 | 5=227 | 5=228 | 5=229 | 5=230 |
| | 5=231 | 5=232 | 5=233 | 5=234 | 5=240 | 5=241 |

Mon 09-18-89 12:37:48  INDEX (Cross Ref) Page.Line
all identifiers

|  |  |  |  |  |  |  |
|---|---|---|---|---|---|---|
|  | 5=242 | 5=243 | 5=244 | 5=245 | 5=246 | 5=247 |
|  | 5=248 | 5=249 |  |  |  |  |
| kbc | 1.29 | 2=72 | 3=127 | 3.129 | 3=131 | 5.260 |
|  | 5=262 | 5=263 | 5=264 |  |  |  |
| keyin | 2.97 | 3=117 | 3=119 | 3.123 | 3.133 | 3.148 |
|  | 4.163 | 4.178 | 4.193 | 4.208 | 5.223 |  |
| outp | 1.37 | 1.39 | 1.40 | 1.43 | 1.44 | 1.46 |
|  | 1.49 | 1.50 | 2.52 | 2.55 | 2.57 | 2.58 |
|  | 2.67 | 2.69 | 2.71 | 2.79 | 2.81 | 2.88 |
|  | 2.89 | 2.90 | 3.104 | 3.105 | 3.106 | 3.107 |
|  | 3.108 | 3.109 | 3.110 | 3.111 | 3.112 | 3.113 |
| PORT_A | 1.5 | 3.119 |  |  |  |  |
| PORT_B | 1.6 | 2.69 | 2.88 | 3.104 | 3.105 | 3.106 |
|  | 3.107 | 3.108 | 3.109 | 3.110 | 3.111 |  |
| PORT_C | 1.7 | 2.71 |  |  |  |  |
| PORT_CTRL |  | 1.8 | 1.37 | 1.39 | 1.40 | 1.43 |
|  | 1.44 | 1.46 | 1.49 | 1.50 | 2.52 |  |
|  | 2.55 | 2.57 | 2.58 | 2.67 | 2.79 |  |
|  | 2.81 | 2.89 | 2.90 | 3.112 | 3.113 |  |
| Row | 1.29 | 2=101 | 3.103 | 3.134 | 3.149 | 4.164 |
|  | 4.179 | 4.194 | 4.209 | 5.224 | 5.239 |  |
| SEL_BLACK |  | 1.24 | 1.36 |  |  |  |
| SEL_CGA | 1.27 | 2.54 |  |  |  |  |
| SEL_1 | 1.25 | 1.42 |  |  |  |  |
| SEL_2 | 1.26 | 1.48 |  |  |  |  |
| TRUE | 3.146 | 4.161 | 4.176 | 4.191 | 4.206 | 5.221 |
|  | 5.236 | 5.251 |  |  |  |  |
| Video_Switch |  | <1.33 |  |  |  |  |

```
;----------------------------------------------------------------------
;
;
;       =====   =    ====   ====            ==     ====   =    =
;       =    =  =   =      =               =  =   =       ==  ==
;       =    =  =   =      =                  =   =       = == =
;       =====   =   =       ===             ==    =====   =    =
;       =       =   =          =           =      =       =    =
;       =       =   =          =          =       =       =    =
;       =       =    ====  ====           =====    ====   =    =
;
;
;----------------------------------------------------------------------
;
;       Version 3.02L, 8/ 9/89, Marc Yaxley, added V)iew SFR's
;       Version 3.01L, 7/26/89, Marc Yaxley, with LIGHTS modules
;       Version 3.00,  7/20/89, Marc Yaxley, expanded command list
;       Version 2.00,  6/00/88, Alex McKay, (original version)
;
;----------------------------------------------------------------------
;
;       NOTE: See CON_INIT for selection of uart I/O
;
;       You many choose internal or external baud rate generation.
;
;----------------------------------------------------------------------
; 8051 SPECIAL FUNCTION REGISTERS AND BITs FOR THOSE THAT ARE BIT ADDRESSIBLE
;----------------------------------------------------------------------

B       EQU     0F0h
ACC     EQU     0E0h

PSW     EQU     0D0h
CY              BIT     PSW.7
AC              BIT     PSW.6
F0              BIT     PSW.5
RS1             BIT     PSW.4
RS0             BIT     PSW.3
OV              BIT     PSW.2
RESRVD          BIT     PSW.1
P               BIT     PSW.0

IP      EQU     0B8h
RESRVD          BIT     IP.7
RESRVD          BIT     IP.6
RESRVD          BIT     IP.5
PS              BIT     IP.4
PT1             BIT     IP.3
```

```
         PXT                        BIT   IP.2
         PT0                        BIT   IP.1
         PX0                        BIT   IP.0

P3       EQU    0B0h

IE       EQU    0A8h
         EA                         BIT   IE.7
         RESRVD                     BIT   IE.6
         RESRVD                     BIT   IE.5
         ES                         BIT   IE.4
         ET1                        BIT   IE.3
         EX1                        BIT   IE.2
         ET0                        BIT   IE.1
         EX0                        BIT   IE.0

P2       EQU    0A0h
SBUF     EQU    099h

SCON     EQU    098h
         SM0                        BIT   SCON.7
         SM1                        BIT   SCON.6
         SM2                        BIT   SCON.5
         REN                        BIT   SCON.4
         TB8                        BIT   SCON.3
         RB8                        BIT   SCON.2
         TI                         BIT   SCON.1
         RI                         BIT   SCON.0

P1       EQU    090h
TH1      EQU    08Dh
TH0      EQU    08Ch
TL1      EQU    08Bh
TL0      EQU    08Ah
TMOD     EQU    089h

TCON     EQU    088h
         TF1                        BIT   TCON.7
         TR1                        BIT   TCON.6
         TF0                        BIT   TCON.5
         TR0                        BIT   TCON.4
         IE1                        BIT   TCON.3
         IT1                        BIT   TCON.2
         IE0                        BIT   TCON.1
         IT0                        BIT   TCON.0

PCON     EQU    087h
DPH      EQU    083h
DPL      EQU    082h
SP       EQU    081h
P0       EQU    080h
page

;***************************************************************
*******
```

```
; ON CHIP MEMORY EQUATES        ( address 00 through 7F )
;*******************************************************************
********
;
;               Allocation of byte addressable memory:
;
;  7F \
;  --  >  Stack space, MON51 & USER    *** 16 BYTES! ***
;  70 /
STACK   EQU     6Fh             ;top of stack ( stack 'grows' up )
;
;  6F \
;  --  >  Input buffer, MON51
;  60 /
INBUFF  EQU     60h             ;input buffer for polled serial port
BUFSIZE EQU     0Eh             ;size of input buffer
;
;  5F \
;  50  |
;  4F  | Unused internal
;  40  |   memory, availible for USER
;  3F  |
;  30 /
;
;  2F \
;  --  > Bit addressable memory, USER
;  20 /
LIGHTS  EQU     20h             ; base of lights array
ROW     EQU     LIGHTS+16       ; row counter
RATE    EQU     ROW-1           ; cycle rate
;
;  1F \
;  --  > Reg. Bank 3, MON51
;  18 /
;
;  17 \
;  --  > Reg. Bank 2, USER
;  10 /
;
;  0F \
;  --  > Reg. Bank 1, USER
;  08 /
;
;  07 \
;  --  > Reg. Bank 0, USER
;  00 /
;
;*******************************************************************
********
; OTHER EQUATES
;*******************************************************************
********

BELL    EQU     07h             ; ascii bell code
CR      EQU     0Dh             ;ascii return
```

```
        LF      EQU     0Ah             ;ascii line feed
        EOS     EQU     1Ah             ; end of string ;***********************************************************************
        page
;***********************************************************************
; RESET AND INTERRUPT JUMPS
;***********************************************************************
;
        cseg
        org     0
        ljmp    reset
        ajmp    extint1
        ds      11-$
        ajmp    timer_0_service
        ds      19-$
        ajmp    extint1
        ds      27-$
        ajmp    timer_1_service
        ds      35-$
        ajmp    serint
;
;***********************************************************************
; MAIN
;***********************************************************************
;
reset           mov     SP,=STACK       ;set up stack
        setb    RS0             ; select monitor's working
        setb    RS1             ;       register bank to 3
;;FIX;;          mov     P0,=0           ; turn
;;FIX;;          mov     P1,=0           ;       'em
;;FIX;;          mov     P2,=0           ;               off
        mov     P0,=255         ; turn
        mov     P1,=255         ;       'em
        mov     P2,=255         ;               off
        acall   big_delay       ; small delay for power up
        acall   con_init        ;initialize serial port
;----------------------------------------
        acall   light_init      ; setup the lights
        mov     RATE,=40h       ; start cycle rate at 1/2
        mov     B,#3
flash_em        push    B
        acall   l_all_on
        acall   big_delay
        acall   l_all_off
        acall   big_delay
        pop     B
        djnz    B,flash_em
        mov     RATE,=0E0h      ; start cycle rate at 1/2
;----------------------------------------
```

```
;
;       command parser loop, everbody exits to here with a LJMP
;
cmd_prompt      mov     dptr,=prompt    ;point to message
acall   puts                    ;send it to serial port
;
get_command     acall   con_in_echo     ; fetch command
cjne    a,=('.'),ignore ;check for ? ( help request )
acall   lights          ; do lights stuff
sjmp    cmd_prompt      ;
ignore          mov     a,=BELL
acall   con_out
sjmp    cmd_prompt      ;
;
;***************************************************************
 *******
;
; recieve a 2 ascii hex-digit value, add to checksum
; ( inputs 2 hex-ascii char's, converts to binary, adds this
;   to a running checksum in r6, returns value in ACC )
;
hex2digits      acall   hex1dig         ; HI nibble
hex1digits      swap    a               ; position it
push    B
mov     B,a             ; store it
acall   hex1dig         ; LO nibble
orl     a,B             ; put 8 bits together
pop     B
ret
;
; recieve a 1 ascii hex-digit value, convert to binary
;
hex1dig         acall   digit_prompt    ; give a ? and BS
acall   con_in_echo     ; fetch char
hex1dig_test    add     a,=-3AH         ; acc=0f6h to 0ffh for '0'-'9'
jnc     hexnib2
add     a,=-7           ; acc=0 to 5 for 'A' thru 'F'
jnc     hex_err         ; oh, oh
hexnib2         add     a,=-6           ; acc=0f0h thru 0ffh for '0'
 thru 'F'
add     a,=10h          ; acc=000h thru 00fh for '0' thru 'F'
jnc     hex_err         ; oh, oh
ret                     ;
; got some kind of hex value error
;
hex_err         mov     dptr,=hex_error ; point to message
hex_xit         acall   puts            ; send it to serial port
ajmp    cmd_prompt      ; abort to command in loop ;***************************************************************
 *******
;
;                I / O   U t i l i t i e s
;
```

```
;*******************************************************************
;*******
; Serial port initialization
; Setup protocol and baud rate
;*******************************************************************
;******* con_init        mov     SCON,=01010010b ;set up serial port for 8 bits
mov     PCON,=00000000b ;set SMOD to 0, normal baud, double baud
mov     TCON,=00000000b ;enable timer =1 for baud rate
mov     TL1,=0FFh       ;set counter to OV on 1 count
;
;-----------------------------------------
;     SETUP FOR INTERNAL CLOCKED UART
;-----------------------------------------
;
;;;;            mov     TMOD,=00100000b ;TIMER =1, 8 bit auto reload
;;;;            mov     TH1,=-3         ;baud rate at -13=2400 (1mhz/(
 32*baud))
;
;-----------------------------------------
;     SETUP FOR EXTERNAL CLOCKED UART
;-----------------------------------------
;
mov     TMOD,=01100000b ;COUNTER =1, 8 bit auto reload
mov     TH1,=0FFh       ;set counter to OV on 1 count
;
;-----------------------------------------
;
setb    TR1             ; enable counter / timer now..
ret
;
;*******************************************************************
;*******
; Serial port character input
; Exits with:
;               acc = received data    ( 'a'-'z' forced to upper case )
;*******************************************************************
;******* con_in_echo     jnb     RI,$            ; wait for Rx data to be avail.
clr     RI              ; clear it
mov     a,SBUF          ; fetch character
anl     a,=7Fh          ; and off parity bit
cjne    a,=CR,toupper   ; if CR exit here...
ret
;
; convert a-z to upper case
;
toupper         push    ACC             ;
clr     c
subb    a,=('a')        ;
pop     ACC
jnc     gtr_a           ; greater than 'a'
sjmp    con_out         ; go echo as is
```

```
;
gtr_a           push    ACC             ;
        clr     c                       ;
        subb    a,=('z'+1);             ; '{'
        pop     ACC
        jc      less_z                  ; less than 'z'
        sjmp    con_out                 ; go echo as is
;
less_z          anl     a,=0DFh         ; reset lower case bit
; fall into con_out...

;***************************************************************************
;*******
; Serial port character output
; Enter with:
;               acc = transmit data
;***************************************************************************
;******* con_out                 ; entry for output
;;;;            jnb     TI,$            ; wait for TI empty
;;;;            clr     TI              ; clear it
;;;;            mov     SBUF,a          ; output character
        ret                             ;

;***************************************************************************
;*******
;
; fetch 8 bit value, don't  -"- with it, give back to the caller in Acc
;
;***************************************************************************
;******* con_in          jnb     RI,$            ;.wait for Rx In true
        clr     RI                      ; clear it
        mov     a,SBUF                  ; fetch character
        ret                             ;

;***************************************************************************
;*******
;Serial port string output
;String is terminated with ^Z (1Ah)
;Enter with:
;       enter:  dptr -> address of string to send
;        exit:  dptr -> terminator char, A = terminator char.
;***************************************************************************
;******* puts            clr     a
        movc    a,@a+dptr       ;get character
        cjne    a,#EOS,ss1      ; terminate if EOS
        ret
ss1             cjne    a,#00h,ss2      ; terminate if NULL
        ret
ss2             acall   con_out         ;send char to serial port
```

```
            inc     dptr                    ;bump pointer
            sjmp    puts                    ;next ;***********************************************************************
; Serial get string
; Exit with:
;           INBUFF filled with string, 0 terminated
;*********************************************************************** gets        mov     r1,=INBUFF              ;point to begining if input
 buffer
            mov     r6,=BUFSIZE
inl0        acall   con_in_echo             ;get a char
            cjne    a,=CR,inl1              ;jump if not return
            sjmp    inl9
inl1        mov     @r1,a                   ;store char
            inc     r1                      ;bump pointer
            djnz    r6,inl0                 ;get next char
inl9        mov     @r1,=0                  ; zero terminate
            ret ;***********************************************************************
; Send cr lf to serial port
;*********************************************************************** colon       mov     a,=(':')                ; (R. Regan hasn't got a colon!)
            sjmp    con_out
;
crlf        mov     a,=CR
            acall   con_out
            mov     a,=LF
            sjmp    con_out
;
digit_prompt push   ACC
            mov     a,=('?')
            acall   con_out
            mov     a,=8                    ; BS over ? as prompt
            sjmp    out_n_pop ;
question    acall   space
            push    ACC
            mov     a,=('?')
            acall   con_out
            pop     ACC
; fall into...
;
space       push    ACC
            mov     a,=(' ')
out_n_pop   acall   con_out
            pop     ACC
```

```
                ret

;***************************************************************
;*******
;Binary to hex ascii output
;Enter with:
;               ACC = byte to convert
;***************************************************************
;******* bin2hex         push    ACC             ;save a
        swap    a                       ;do high nibble first
        acall   bh0                     ;convert nibble
        pop     ACC                     ;get low nibble
;
bh0             anl     a,=0Fh          ;and off high bits
        add     a,=90h                  ;clear carry and aux carry
        da      a                       ;add 6 if > 9
        addc    a,=40h                  ;make it ascii
        da      a                       ;add 6 if > 9
        sjmp    con_out                 ;send it out ;***************************************************************
;*******
;
; recieve and convert 2 ascii binary decimal digits value ( 00 to 99 )
;
bcd2digits      acall   con_in_echo     ; HI nibble
        anl     a,#0Fh                  ; strip to lower 4
        mov     B,=10                   ;
        mul     ab                      ; A = A * 10
        mov     B,a                     ; store it
        acall   con_in_echo             ; LO nibble
        anl     a,=0Fh                  ; strip to lower 4
        add     a,B                     ; put 8 bits together
        ret                             ; return 0 to 99 integer
        page ;***************************************************************
;*******
; Misc. Interrupt handlers
;***************************************************************
;*******
;
;;extint0                 mov     dptr,=ei0mes
;;                        sjmp    int_msg ;;timer_0_service         mov     dptr,=ci0mes
;;                        sjmp    int_msg extint1                 mov     dptr,=ei1mes
        sjmp    int_msg
;
timer_1_service         mov     dptr,=ci1mes
        sjmp    int_msg
```

```
;
serint              mov     dptr,=simes
;
int_msg             acall   puts
reti
;
;***********************************************************************
;*******
; Text strings
;***********************************************************************
;******* prompt          db      CR,LF
ascii   'LIGHTS > ' not_yet_msg     ascii   '<-- Not Yet!'
page ei0mes          db      CR,LF
ascii   'EI0 Int' ci0mes          db      CR,LF
ascii   'CI0 Int' ei1mes          db      CR,LF
ascii   'EI1 Int'
page ci1mes          db      CR,LF
ascii   'CI1 Int' simes           db      CR,LF
ascii   'SI Int' single_hit      ascii   '= PC > ' page hex_error       db      BELL
ascii   '<-- Err?' hex_ok          db      CR,LF
ascii   ' Load OK!' page

;***********************************************************************
;*******
;
;                       L I G H T S    D R I V E R
;
;***********************************************************************
;*******

;-------------------------------------
```

```
; process commands to the LIGHTS module
;----------------------------------------
;
lights          acall   con_in_echo     ; get 2nd command char
cjne    a,=('A'),110    ; got all on command?
l_all_on        mov     r0,=LIGHTS      ; pre-clear bit-addressible ram
mov     r6,=10                  ;
z00             mov     @r0,=255        ; pre fill to 1
inc     r0                      ;
djnz    r6,z00                  ;
mov     ROW,=0                  ; start counter at 0
ajmp    light_exit              ;
;
110             cjne    a,=('C'),120    ; got cycle change command?
acall   hex2digits              ;
mov     RATE,a                  ; save it
ajmp    light_exit              ;
;
120             cjne    a,=('S'),130    ; got set light on command?
acall   bcd2digits              ;
acall   bit_byte_addr           ; get image for 8 lights
acall   set_bit_on              ; set new bit
ajmp    light_exit              ;
;
130             cjne    a,=('R'),140    ; got set light off command?
acall   bcd2digits              ;
acall   bit_byte_addr           ; get image for 8 lights
acall   set_bit_off             ; reset new bit
ajmp    light_exit              ;
;
140             cjne    a,=('T'),150    ; got test lights command?
acall   crlf                    ;
;
1400            acall   test_em         ;
jnb     RI,1400         ; key hit?
clr     RI              ; clear it
acall   l110            ; initialize & go
ajmp    light_exit      ;
;
test_em         clr     EA              ; de-activate interrupts
clr     TR0             ; dis-enable timer now
clr     ET0             ; dis-enable interrupt
setb    EA              ; activate interrupts
;;FIX;;          mov     P0,=0           ; turn
;;FIX;;          mov     P1,=0           ;       'em
;;FIX;;          mov     P2,=0           ;               off
mov     P0,=255         ; turn
mov     P1,=255         ;       'em
mov     P2,=255         ;               off
mov     B,=8            ;
;;FIX;;          mov     a,=1            ;
mov     a,#0FEh         ;
;
test_em_10      push    B               ;
push    ACC             ;
```

```
            mov     P0,a
            acall   cycle8          ; do P0's bits
            pop     ACC             ;
            pop     B               ;
            rl      a               ; next bit in P0
            djnz    B,test_em_10    ;
;;FIX;;             mov     P0,=0           ;
            mov     P0,=255         ;
;;FIX;;             setb    P2.0            ;
            clr     P2.0            ;
            acall   cycle8          ; do P2.0 bits
            setb    P2.0            ;
;;FIX;;             clr     P2.0            ;
;;FIX;;             setb    P2.1            ;
            clr     P2.1            ;
            acall   cycle8          ; do P1.1 bits
;;FIX;;             mov     P0,=0           ; leave
;;FIX;;             mov     P1,=0           ;         'em
;;FIX;;             mov     P2,=0           ;              off
            mov     P0,=255         ; leave
            mov     P1,=255         ;       'em
            mov     P2,=255         ;            off
            ret                     ;
;
150         cjne    a,=('X'),160    ; got exit lights command?
            clr     EA              ; de-activate interrupts
            clr     TR0             ; dis-enable timer now
            clr     ET0             ; dis-enable interrupt
            setb    EA              ; activate interrupts
            ajmp    light_exit      ;
;
160         cjne    a,=('Z'),170    ; got zero all lights command?
l_all_off   mov     r0,=LIGHTS      ; pre-clear bit-addressable ram
            mov     r6,=10          ;
z10         mov     @r0,=0          ; pre fill to 0
            inc     r0              ;
            djnz    r6,z10          ;
            mov     ROW,=00         ; start counter at 0
            ajmp    light_exit      ;
;
170         cjne    a,=('I'),180    ; got start lights command?
            acall   lil0            ; initialize & go
            ajmp    light_exit      ;
;
180         cjne    a,=('Y'),190    ; got step interrupt command?
            acall   timer_0_service ;
            ajmp    light_exit      ;
;
190         cjne    a,=('L'),1100   ; got load lights data command?
            mov     r0,=LIGHTS      ;
            mov     B,#10           ;
1910        acall   con_in          ;
            mov     @r0,a           ; fetch character
            inc     r0              ;
            djnz    B,1910          ;
```

```
        ajmp    light_exit      ;
;
        1100            cjne    a,=('P'),light_exit; got prog. ports command?
;
; ask for P0 then P2 then P1
;
        acall   hex2digits      ; get P0
        cpl     a ;FIX********
        mov     r0,a            ;
        acall   hex2digits      ; get P2
        cpl     a ;FIX********
        mov     r2,a            ;
        acall   hex2digits      ; get P1
        mov     r1,a            ;
; now put all bits on port...
        clr     EA              ; de-activate interrupts
        clr     TR0             ; dis-enable timer now
        clr     ET0             ; dis-enable interrupt
        setb    EA              ; activate interrupts
        mov     P0,r0           ;   set
        mov     P1,r1           ;       the
        mov     P2,r2           ;           ports!
; fall into...
light_exit      ret             ;
;
;       cycle thru 8 bits on port 1, with a delay
;
cycle8          mov     r0,=8           ;
        mov     a,=1            ;
tnext           mov     P1,a            ;
        acall   delay           ;
        rl      a               ;
        djnz    r0,tnext        ;
        mov     P1,=0           ;
        ret                     ;
;
big_delay       push    B
        mov     B,=16
bd_00           acall   delay
        djnz    B,bd_00
        pop     B
        ret
;
delay           push    ACC             ;
        push    B               ;
        mov     a,=0            ;
        mov     B,=64           ;
delay0          djnz    ACC,$           ;
        djnz    B,delay0        ;
        pop     B               ;
        pop     ACC             ;
        ret                     ;
;
;----------------------------------------
; point R0 to byte containing image of bit requested
```

```
;       return A = low 3 bits
;
bit_byte_addr   push    ACC                     ; save value
        anl     a,=11111000b    ; zero un-needed bits
        rr      a                       ; div 2
        rr      a                       ; div 4
        rr      a                       ; div 8
        add     a,=LIGHTS       ; base of light array
        mov     r0,a            ; return in R0
found_image     pop     ACC                     ; return value
        anl     a,=00000111b    ; return 3 bits
        ret                     ; R0 -> image byte, A = 0..7
;
;----------------------------------------
; SET bit in image byte R0 points to, A = 0..7 bit ID
;
set_bit_on      mov     dptr,=bit2byte  ; base of conversion table
        movc    a,@a+dptr       ; fetch index to address
        orl     a,@r0           ; set new bits with old
        sjmp    stash_bit       ;
;
;----------------------------------------
; RESET bit in image byte R0 points to, A = 0..7 bit ID
;
set_bit_off     mov     dptr,=bit2byte  ; base of conversion table
        movc    a,@a+dptr       ; fetch index to address
        xrl     a,@r0           ; reset new bit in old image
stash_bit       mov     @r0,a           ; save in array...
        ret                     ;
;
;----------------------------------------
; a table that converts 0..7 to 1..128
;
bit2byte        db      1                       ;
        db      2                       ;
        db      4                       ;
        db      8                       ;
        db      16                      ;
        db      32                      ;
        db      64                      ;
        db      128                     ;
;
;----------------------------------------
; initialize the LIGHTS module
;
light_init      mov     dptr,=light_msg ;point to message
        acall   puts            ;send it to serial port
        mov     r0,=LIGHTS      ; pre-clear bit-addressable ram
        mov     r6,=10          ;
li00            mov     @r0,=0          ; pre fill to 0
        inc     r0              ;
        djnz    r6,li00         ;
        acall   test_em         ; do 1 sweep of lights as test
        mov     RATE,=0F8h      ; start cycle rate at 1/2
li10            mov     ROW,=0          ; start counter at 0
```

```
;
; now setup timer 0 for interrupt
;
        clr     EA                  ; de-activate interrupts
        mov     a,TMOD              ; fetch timer controls
        anl     a,=11110000b        ; set timer 0 to 0
        orl     a,=00000001b        ; set as 16 bit TIMER
        mov     TMOD,a              ; set it up now...
        mov     TL0,=0              ; set timer LO
        mov     RATE,TH0            ; set timer HI
        setb    TR0                 ; enable timer now
        setb    ET0                 ; enable interrupt
        setb    EA                  ; activate interrupts
        ret                         ;
;
light_msg       db      CR,LF
ascii   'Init. LIGHTS Module, V1.01'
;
;----------------------------------------
; service timer 0 interrupt
;
timer_0_service push    PSW         ;
        push    ACC                 ;
        push    DPL                 ;
        push    DPH                 ;
; following code may be reversed for other assemblers!
        mov     RATE,TH0            ; reload timer HI ( ignore TL0 )
;;FIX;;          mov     P0,=0      ; turn off all ROW - lights
;;FIX;;          mov     P2,=0      ; turn off all ROW - lights
        mov     P0,=255             ; turn off all ROW - lights
        mov     P2,=255             ; turn off all ROW - lights
        mov     a,ROW               ; get next ROW to light up
        inc     ROW                 ; bump for next pass
; N-way branch
        mov     dptr,=rowtable      ; base of jump table
        movc    a,@a+dptr           ; fetch index to address
        jmp     @a+dptr             ; go for it!
;
rowtable        db      row0-rowtable
        db      row1-rowtable
        db      row2-rowtable
        db      row3-rowtable
        db      row4-rowtable
        db      row5-rowtable
        db      row6-rowtable
        db      row7-rowtable
        db      row8-rowtable
        db      row9-rowtable
;
;       handlers for each ROW's case
;
;       ALL following codes may be reversed for other assemblers!
;               where we MOV MEMORY to P1
;
row0            mov     LIGHTS+0,P1 ;
```

```
;;FIX;;
;;FIX;; change all SETB to CLR
;;FIX;;
;;FIX;;           setb    P0.0            ;
        clr     P0.0            ;
        sjmp    int_done        ;
;
row1            mov     LIGHTS+1,P1     ;
        clr     P0.1            ;
        sjmp    int_done        ;
;
row2            mov     LIGHTS+2,P1     ;
        clr     P0.2            ;
        sjmp    int_done        ;
;
row3            mov     LIGHTS+3,P1     ;
        clr     P0.3            ;
        sjmp    int_done        ;
;
row4            mov     LIGHTS+4,P1     ;
        clr     P0.4            ;
        sjmp    int_done        ;
;
row5            mov     LIGHTS+5,P1     ;
        clr     P0.5            ;
        sjmp    int_done        ;
;
row6            mov     LIGHTS+6,P1     ;
        clr     P0.6            ;
        sjmp    int_done        ;
;
row7            mov     LIGHTS+7,P1     ;
        clr     P0.7            ;
        sjmp    int_done        ;
;
row8            mov     LIGHTS+8,P1     ;
        clr     P2.0            ;
        sjmp    int_done        ;
;
row9            mov     LIGHTS+9,P1     ;
        clr     P2.1            ;
        mov     ROW,=0          ; start counter over
;
int_done        pop     DPH             ;
        pop     DPL             ;
        pop     ACC             ;
        pop     PSW             ;
        reti                    ;
;
;----------------------------------------

;*****************************************************************
********
```

Mon 09-18-89 12:58:17  INDEX (Cross Ref) Page.Line
 all identifiers
  1 09-18-89 12:54:16  PICS.ASM

| | | | | | | |
|---|---|---|---|---|---|---|
| . | 5.212 | | | | | |
| A | 5.240 | 7.346 | 9.433 | 11.511 | 14.672 | 14.683 |
| | 14.686 | 14.694 | | | | |
| AC | 1.35 | | | | | |
| ACC | 1.31 | 5.223 | 6.301 | 6.304 | 7.308 | 7.311 |
| | 8.388 | 8.396 | 8.399 | 8.402 | 8.405 | 9.411 |
| | 9.414 | 9.417 | 11.561 | 12.564 | 13.660 | 13.664 |
| | 13.667 | 14.674 | 14.681 | 15.749 | 16.827 | |
| Acc | 7.332 | | | | | |
| ADDRESSIBLE | 1.27 | | | | | |
| ALL | 15.778 | | | | | |
| Alex | 1.17 | | | | | |
| Allocation | 3.106 | | | | | |
| AND | 1.27 | 4.161 | | | | |
| ARE | 1.27 | | | | | |
| a | 5.206 | 5.212 | 5.215 | 5.221 | 5.223 | 5.226 |
| | 5.228 | 5.230 | 5.234 | 5.236 | 5.238 | 5.240 |
| | 5.242 | 5.243 | 6.289 | 6.294 | 6.295 | 6.296 |
| | 6.299 | 6.303 | 6.305 | 7.310 | 7.315 | 7.327 |
| | 7.338 | 7.349 | 7.350 | 7.351 | 7.353 | 8.367 |
| | 8.368 | 8.370 | 8.380 | 8.383 | 8.385 | 8.389 |
| | 8.391 | 8.397 | 8.403 | 9.414 | 9.415 | 9.419 |
| | 9.420 | 9.421 | 9.422 | 9.423 | 9.431 | 9.434 |
| | 9.436 | 9.437 | 11.511 | 11.520 | 11.522 | 11.525 |
| | 11.531 | 11.537 | 11.557 | 11.558 | 12.562 | 12.566 |
| | 12.586 | 12.593 | 12.602 | 12.606 | 12.610 | 12.614 |
| | 13.619 | 13.624 | 13.625 | 13.627 | 13.628 | 13.630 |
| | 13.642 | 13.645 | 13.646 | 13.648 | 13.662 | 14.675 |
| | 14.676 | 14.677 | 14.678 | 14.679 | 14.680 | 14.682 |
| | 14.689 | 14.690 | 14.697 | 14.698 | 14.699 | 14.703 |
| | 15.731 | 15.732 | 15.733 | 15.734 | 15.758 | 15.762 |
| | 15.763 | | | | | |
| ab | 9.433 | | | | | |
| abort | 5.251 | | | | | |
| acall | 4.190 | 4.191 | 4.193 | 4.197 | 4.198 | 4.199 |
| | 4.200 | 5.209 | 5.211 | 5.213 | 5.216 | 5.225 |
| | 5.229 | 5.236 | 5.237 | 5.250 | 7.355 | 8.367 |
| | 8.384 | 8.390 | 8.395 | 8.398 | 8.404 | 9.416 |
| | 9.430 | 9.435 | 10.459 | 11.510 | 11.521 | 11.526 |
| | 11.527 | 11.528 | 11.532 | 11.533 | 11.534 | 11.538 |
| | 11.540 | 11.543 | 12.563 | 12.572 | 12.577 | 12.603 |

Mon 09-18-89 12:58:17  INDEX (Cross Ref) Page.Line
all identifiers

|  |  |  |  |  |  |  |
|---|---|---|---|---|---|---|
|  | 12.607 | 12.613 | 13.623 | 13.626 | 13.629 | 13.647 |
|  | 13.655 | 14.718 | 14.724 |  |  |  |
| acc | 5.238 | 5.240 | 5.242 | 5.243 | 6.289 | 7.321 |
| activate | 11.546 | 11.549 | 12.587 | 12.590 | 13.632 | 13.635 |
|  | 15.730 | 15.739 |  |  |  |  |
| add | 5.221 | 5.238 | 5.240 | 5.242 | 5.243 | 9.420 |
|  | 9.421 | 9.423 | 9.437 | 14.679 |  |  |
| addc | 9.422 |  |  |  |  |  |
| added | 1.14 |  |  |  |  |  |
| address | 3.103 | 7.345 | 14.689 | 14.697 | 15.762 |  |
| addressible |  | 3.106 | 3.127 | 11.512 | 12.594 | 14.719 |
| adds | 5.222 |  |  |  |  |  |
| ajmp | 4.167 | 4.169 | 4.171 | 4.173 | 4.175 | 5.251 |
|  | 11.518 | 11.523 | 11.529 | 11.535 | 11.544 | 12.591 |
|  | 12.600 | 12.604 | 12.608 | 13.617 |  |  |
| all | 11.511 | 12.593 | 13.631 | 15.754 | 15.755 | 15.756 |
|  | 15.757 | 16.783 |  |  |  |  |
| and | 5.236 | 6.259 | 6.295 | 9.419 | 9.420 | 9.428 |
| anl | 6.295 | 7.315 | 9.419 | 9.431 | 9.436 | 14.675 |
|  | 14.682 | 15.732 |  |  |  |  |
| array | 3.129 | 14.679 |  |  |  |  |
| array... | 14.699 |  |  |  |  |  |
| as | 6.306 | 7.313 | 8.391 | 14.724 | 15.733 |  |
| ascii | 3.153 | 3.154 | 4.155 | 5.221 | 5.222 | 5.234 |
|  | 9.409 | 9.422 | 9.428 | 10.467 | 10.469 | 10.473 |
|  | 10.476 | 10.479 | 10.483 | 10.486 | 10.488 | 10.493 |
|  | 10.496 | 15.743 |  |  |  |  |
| ask | 13.621 |  |  |  |  |  |
| assemblers |  | 15.752 | 15.778 |  |  |  |
| at | 4.194 | 4.203 | 6.272 | 11.517 | 12.599 | 14.725 |
|  | 14.726 |  |  |  |  |  |

Mon 09-18-89 12:58:17  INDEX (Cross Ref) Page.Line
 all identifiers

| | | | | | | |
|---|---|---|---|---|---|---|
| auto | 6.271 | 6.278 | | | | |
| aux | 9.420 | | | | | |
| avail. | 6.292 | | | | | |
| availible | | 3.122 | | | | |
| B | 1.30 | 4.195 | 4.196 | 4.201 | 4.202 | 5.227 |
| | 5.228 | 5.230 | 5.231 | 9.432 | 9.434 | 9.437 |
| | 11.556 | 11.560 | 12.565 | 12.567 | 12.612 | 12.616 |
| | 13.653 | 13.654 | 13.656 | 13.657 | 13.661 | 13.663 |
| | 13.665 | 13.666 | | | | |
| Bank | 3.134 | 3.138 | 3.142 | 3.146 | | |
| BELL | 3.153 | 5.215 | 10.492 | | | |
| BIT | 1.27 | 1.34 | 1.35 | 1.36 | 1.37 | 1.38 |
| | 1.39 | 1.40 | 1.41 | 1.44 | 1.45 | 1.46 |
| | 1.47 | 1.48 | 2.49 | 2.50 | 2.51 | 2.56 |
| | 2.57 | 2.58 | 2.59 | 2.60 | 2.61 | 2.62 |
| | 2.63 | 2.69 | 2.70 | 2.71 | 2.72 | 2.73 |
| | 2.74 | 2.75 | 2.76 | 2.86 | 2.87 | 2.88 |
| | 2.89 | 2.90 | 2.91 | 2.92 | 2.93 | |
| BITs | 1.27 | | | | | |
| Binary | 9.409 | | | | | |
| Bit | 3.127 | | | | | |
| BS | 5.236 | 8.391 | | | | |
| BUFSIZE | 3.117 | 8.366 | | | | |
| BYTES | 3.109 | | | | | |
| back | 7.332 | | | | | |
| bank | 4.183 | | | | | |
| base | 3.129 | 14.679 | 14.688 | 14.696 | 15.761 | |
| baud | 1.23 | 6.259 | 6.263 | 6.264 | 6.272 | |
| bcd2digits | | 9.430 | 11.526 | 11.532 | | |
| bd_00 | 13.655 | 13.656 | | | | |
| be | 6.292 | 15.752 | 15.778 | | | |

Mon 09-18-89 12:58:17  INDEX (Cross Ref) Page.Line
all identifiers

| identifier | | | | | | |
|---|---|---|---|---|---|---|
| begining | 8.365 | | | | | |
| bell | 3.153 | | | | | |
| bh0 | 9.416 | 9.419 | | | | |
| big_delay | | 4.190 | 4.198 | 4.200 | 13.653 | |
| binary | 5.222 | 5.234 | 9.428 | | | |
| bin2hex | 9.414 | | | | | |
| bit | 6.271 | 6.278 | 6.295 | 7.315 | 7.332 | 11.512 |
| | 11.528 | 11.534 | 12.566 | 12.594 | 13.671 | 14.686 |
| | 14.694 | 14.698 | 14.719 | 15.733 | | |
| bit_byte_addr | | 11.527 | 11.533 | 14.674 | | |
| bits | 5.230 | 6.262 | 9.419 | 9.437 | 12.563 | 12.572 |
| | 12.577 | 13.631 | 13.642 | 14.672 | 14.675 | 14.682 |
| | 14.690 | | | | | |
| bit2byte | 14.688 | 14.696 | 14.705 | | | |
| branch | 15.760 | | | | | |
| buffer | 3.114 | 3.116 | 3.117 | 8.365 | | |
| bump | 8.356 | 8.371 | 15.759 | | | |
| byte | 3.106 | 9.411 | 13.671 | 14.683 | 14.686 | 14.694 |
| c | 11.520 | | | | | |
| CHIP | 3.103 | | | | | |
| CI0 | 10.476 | | | | | |
| CI1 | 10.483 | | | | | |
| CLOCKED | 6.268 | 6.275 | | | | |
| CLR | 16.783 | | | | | |
| CON_INIT | 1.21 | | | | | |
| COUNTER | 6.278 | | | | | |
| CR | 3.154 | 6.296 | 8.368 | 8.383 | 10.466 | 10.472 |
| | 10.475 | 10.478 | 10.482 | 10.485 | 10.495 | 15.742 |

Mon 09-18-89 12:58:17   INDEX (Cross Ref) Page.Line
all identifiers

| identifier | | | | | |
|---|---|---|---|---|---|
| CY | 1.34 | | | | |
| c | 6.302 | 7.309 | | | |
| caller | 7.332 | | | | |
| carry | 9.420 | | | | |
| case | 6.289 | 6.299 | 7.315 | 15.776 | |
| change | 11.520 | 16.783 | | | |
| char | 5.222 | 5.237 | 7.346 | 7.355 | 8.367 | 8.370 |
| | 8.372 | 11.510 | | | |
| char. | 7.346 | | | | |
| character | | 6.287 | 6.294 | 7.319 | 7.327 | 7.338 |
| | | 7.350 | 12.614 | | |
| check | 5.212 | | | | |
| checksum | 5.221 | 5.223 | | | |
| choose | 1.23 | | | | |
| ci0mes | 9.448 | 10.475 | | | |
| cilmes | 9.454 | 10.482 | | | |
| cjne | 5.212 | 6.296 | 7.351 | 7.353 | 8.368 | 11.511 |
| | 11.520 | 11.525 | 11.531 | 11.537 | 12.586 | 12.593 |
| | 12.602 | 12.606 | 12.610 | 13.619 | | |
| clear | 6.293 | 7.326 | 7.337 | 9.420 | 11.512 | 11.542 |
| | 12.594 | 14.719 | | | |
| clr | 6.293 | 6.302 | 7.309 | 7.326 | 7.337 | 7.349 |
| | 11.542 | 11.546 | 11.547 | 11.548 | 12.571 | 12.574 |
| | 12.576 | 12.587 | 12.588 | 12.589 | 13.632 | 13.633 |
| | 13.634 | 15.730 | 16.786 | 16.790 | 16.794 | 16.798 |
| | 16.802 | 16.806 | 16.810 | 16.814 | 16.818 | 16.822 |
| cmd_prompt | | 5.208 | 5.214 | 5.217 | 5.251 | |
| code | 3.153 | 15.752 | | | |
| codes | 15.778 | | | | |
| colon | 8.380 | | | | |

Mon 09-18-89 12:58:17 INDEX (Cross Ref) Page.Line
all identifiers

| identifier | | | | | | |
|---|---|---|---|---|---|---|
| command | 1.16 | 5.206 | 5.211 | 5.251 | 11.510 | 11.511 |
| | 11.520 | 11.525 | 11.531 | 11.537 | 12.586 | 12.593 |
| | 12.602 | 12.606 | 12.610 | 13.619 | | |
| commands | 11.507 | | | | | |
| con_in | 7.336 | 12.613 | | | | |
| con_in_echo | | 5.211 | 5.237 | 6.292 | 8.367 | 9.430 |
| | | 9.435 | 11.510 | | | |
| con_init | 4.191 | 6.262 | | | | |
| con_out | 5.216 | 6.306 | 7.313 | 7.324 | 7.355 | 8.381 |
| | 8.384 | 8.386 | 8.390 | 8.398 | 8.404 | 9.424 |
| con_out... | | 7.316 | | | | |
| containing | | 13.671 | | | | |
| controls | 15.731 | | | | | |
| conversion | | 14.688 | 14.696 | | | |
| convert | 5.234 | 6.299 | 9.411 | 9.416 | 9.428 | |
| converts | 5.222 | 14.703 | | | | |
| count | 6.265 | 6.279 | | | | |
| counter | 3.130 | 6.265 | 6.279 | 6.283 | 11.517 | 12.599 |
| | 14.726 | 16.823 | | | | |
| cpl | 13.624 | 13.627 | | | | |
| cr | 8.377 | | | | | |
| crlf | 8.383 | 11.538 | | | | |
| cseg | 4.164 | | | | | |
| cycle | 3.131 | 4.194 | 4.203 | 11.520 | 13.642 | 14.725 |
| cycle8 | 12.563 | 12.572 | 12.577 | 13.644 | | |
| D | 10.502 | | | | | |
| DPH | 2.96 | 15.751 | 16.825 | | | |
| DPL | 2.97 | 15.750 | 16.826 | | | |

Mon 09-18-89 12:58:17   INDEX (Cross Ref)   Page.Line
all identifiers

| | | | | | | |
|---|---|---|---|---|---|---|
| da | 9.421 | 9.423 | | | | |
| data | 6.289 | 6.292 | 7.321 | 12.610 | | |
| db | 10.466 | 10.472 | 10.475 | 10.478 | 10.482 | 10.485 |
| | 10.492 | 10.495 | 14.705 | 14.706 | 14.707 | 14.708 |
| | 14.709 | 14.710 | 14.711 | 14.712 | 15.742 | 15.765 |
| | 15.766 | 15.767 | 15.768 | 15.769 | 15.770 | 15.771 |
| | 15.772 | 15.773 | 15.774 | | | |
| de | 11.546 | 12.587 | 13.632 | 15.730 | | |
| decimal | 9.428 | | | | | |
| delay | 4.190 | 13.642 | 13.647 | 13.655 | 13.660 | |
| delay0 | 13.664 | 13.665 | | | | |
| digit | 5.221 | 5.234 | | | | |
| digit_prompt | | 5.236 | 8.388 | | | |
| digits | 9.428 | | | | | |
| dis | 11.547 | 11.548 | 12.588 | 12.589 | 13.633 | 13.634 |
| div | 14.676 | 14.677 | 14.678 | | | |
| djnz | 4.202 | 8.372 | 11.516 | 12.567 | 12.598 | 12.616 |
| | 13.649 | 13.656 | 13.664 | 13.665 | 14.723 | |
| do | 5.213 | 9.415 | 12.563 | 12.572 | 12.577 | 14.724 |
| don | 7.332 | | | | | |
| double | 6.263 | | | | | |
| dptr | 5.208 | 5.249 | 7.345 | 7.346 | 7.350 | 8.356 |
| | 9.445 | 9.448 | 9.451 | 9.454 | 10.457 | 14.688 |
| | 14.689 | 14.696 | 14.697 | 14.717 | 15.761 | 15.762 |
| | 15.763 | | | | | |
| ds | 4.168 | 4.170 | 4.172 | 4.174 | | |
| E | 10.502 | | | | | |
| EA | 2.56 | 11.546 | 11.549 | 12.587 | 12.590 | 13.632 |
| | 13.635 | 15.730 | 15.739 | | | |
| EI0 | 10.473 | | | | | |

Mon 09-18-89 12:58:17   INDEX (Cross Ref) Page.Line
all identifiers

| | | | | | | |
|---|---|---|---|---|---|---|
| EI1 | 10.479 | | | | | |
| Enter | 7.320 | 7.344 | 9.410 | | | |
| EOS | 4.156 | 7.351 | | | | |
| EQU | 1.30 | 1.31 | 1.33 | 1.43 | 2.53 | 2.55 |
| | 2.65 | 2.66 | 2.68 | 2.78 | 2.79 | 2.80 |
| | 2.81 | 2.82 | 2.83 | 2.85 | 2.95 | 2.96 |
| | 2.97 | 2.98 | 2.99 | 3.111 | 3.116 | 3.117 |
| | 3.129 | 3.130 | 3.131 | 3.153 | 3.154 | 4.155 |
| | 4.156 | | | | | |
| EQUATES | 3.103 | 3.150 | | | | |
| Err | 10.493 | | | | | |
| ES | 2.59 | | | | | |
| ET0 | 2.62 | 11.548 | 12.589 | 13.634 | 15.738 | |
| ET1 | 2.60 | | | | | |
| EXTERNAL | 6.275 | | | | | |
| EX0 | 2.63 | | | | | |
| EX1 | 2.61 | | | | | |
| Exit | 8.361 | | | | | |
| Exits | 6.288 | | | | | |
| e | 5.255 | | | | | |
| each | 15.776 | | | | | |
| echo | 6.306 | 7.313 | | | | |
| ei0mes | 9.445 | 10.472 | | | | |
| ei1mes | 9.451 | 10.478 | | | | |
| em | 4.185 | 4.188 | 11.551 | 11.554 | 12.579 | 12.582 |
| empty | 7.325 | | | | | |
| enable | 6.264 | 6.283 | 11.547 | 11.548 | 12.588 | 12.589 |
| | 13.633 | 13.634 | 15.737 | 15.738 | | |
| end | 4.156 | | | | | |

Mon 09-18-89 12:58:17  INDEX (Cross Ref) Page.Line
all identifiers

| identifier | | | | | | |
|---|---|---|---|---|---|---|
| enter | 7.345 | | | | | |
| entry | 7.324 | | | | | |
| error | 5.247 | | | | | |
| everbody | 5.206 | | | | | |
| exit | 6.296 | 7.346 | 12.586 | | | |
| exits | 5.206 | | | | | |
| expanded | 1.16 | | | | | |
| external | 1.23 | | | | | |
| extint0 | 9.445 | | | | | |
| extint1 | 4.167 | 4.171 | 9.451 | | | |
| F | 5.240 | 5.242 | 5.243 | | | |
| FIX | 4.184 | 4.185 | 4.186 | 11.550 | 11.551 | 11.552 |
| | 11.557 | 12.568 | 12.570 | 12.574 | 12.575 | 12.578 |
| | 12.579 | 12.580 | 13.624 | 13.627 | 15.754 | 15.755 |
| | 16.782 | 16.783 | 16.784 | 16.785 | | |
| FOR | 1.27 | 6.268 | 6.275 | | | |
| FUNCTION | 1.27 | | | | | |
| F0 | 1.36 | | | | | |
| fall | 7.316 | 8.400 | 13.639 | | | |
| feed | 4.155 | | | | | |
| fetch | 5.211 | 5.237 | 6.294 | 7.332 | 7.338 | 12.614 |
| | 14.689 | 14.697 | 15.731 | 15.762 | | |
| fill | 11.514 | 12.596 | 14.721 | | | |
| filled | 8.362 | | | | | |
| first | 9.415 | | | | | |
| flash_em | 4.196 | 4.202 | | | | |
| following | | 15.752 | 15.778 | | | |
| for | 1.21 | 3.116 | 3.122 | 4.190 | 5.212 | 5.238 |
| | 5.240 | 5.242 | 5.243 | 6.262 | 6.264 | 6.292 |
| | 7.324 | 7.325 | 7.336 | 11.527 | 11.533 | 13.621 |
| | 15.728 | 15.752 | 15.759 | 15.763 | 15.776 | 15.778 |

```
Mon 09-18-89 12:58:17    INDEX (Cross Ref) Page.Line
 all identifiers forced         6.289 found_image              14.681 fuck           7.332

G              10.502 generation.              1.23 get            7.350      8.360      8.367      8.372      9.417     11.510
              11.527     11.533     13.623     13.626     13.629    15.758 get_command.             5.211 gets           8.365 give           5.236      7.332 go             6.306      7.313     11.543     12.603     15.763 got            5.247      8.380     11.511     11.520     11.525    11.531
              11.537     12.586     12.593     12.602     12.606    12.610
              13.619 greater        6.305 grows          3.111 gtr_a          6.305      7.308

H              10.502

HI             5.225      9.430     15.736     15.753 handlers       9.442     15.776 hasn           8.380 help           5.212 here           5.206 here...        6.296 hex            5.221      5.222      5.234      5.247      9.409 hex_err        5.241      5.244      5.249 hex_error                 5.249     10.492
```

Mon 09-18-89 12:58:17  INDEX (Cross Ref) Page.Line
all identifiers

| identifier | | | | | |
|---|---|---|---|---|---|
| hex_ok | 10.495 | | | | |
| hex_xit | 5.250 | | | | |
| hexnib2 | 5.239 | 5.242 | | | |
| hex1dig | 5.225 | 5.229 | 5.236 | | |
| hex1dig_test | | 5.238 | | | |
| hex1digits | | 5.226 | | | |
| hex2digits | | 5.225 | 11.521 | 13.623 | 13.626 | 13.629 |
| high | 9.415 | 9.419 | | | |
| hit | 11.541 | | | | |
| I | 1.21 | 5.255 | 10.502 | 12.602 | |
| ID | 14.686 | 14.694 | | | |
| IE | 2.55 | | | | |
| IE.0 | 2.63 | | | | |
| IE.1 | 2.62 | | | | |
| IE.2 | 2.61 | | | | |
| IE.3 | 2.60 | | | | |
| IE.4 | 2.59 | | | | |
| IE.5 | 2.58 | | | | |
| IE.6 | 2.57 | | | | |
| IE.7 | 2.56 | | | | |
| IE0 | 2.92 | | | | |
| IE1 | 2.90 | | | | |
| INBUFF | 3.116 | 8.362 | 8.365 | | |
| INTERNAL | 6.268 | | | | |
| INTERRUPT | | 4.161 | | | |
| In | 7.336 | | | | |

Mon 09-18-89 12:58:17   INDEX (Cross Ref)  Page.Line
all identifiers

| Identifier | | | | | |
|---|---|---|---|---|---|
| Init. | 15.743 | | | | |
| Input | 3.114 | | | | |
| Int | 10.473 | 10.476 | 10.479 | 10.483 | 10.486 |
| Interrupt | 9.442 | | | | |
| IP | 1.43 | | | | |
| IP.0 | 2.51 | | | | |
| IP.1 | 2.50 | | | | |
| IP.2 | 2.49 | | | | |
| IP.3 | 1.48 | | | | |
| IP.4 | 1.47 | | | | |
| IP.5 | 1.46 | | | | |
| IP.6 | 1.45 | | | | |
| IP.7 | 1.44 | | | | |
| IT0 | 2.93 | | | | |
| IT1 | 2.91 | | | | |
| i | 5.255 | | | | |
| iew | 1.14 | | | | |
| if | 6.296 | 7.351 | 7.353 | 8.365 | 8.368 | 9.421 |
| | 9.423 | | | | |
| ignore | 5.212 | 5.215 | 15.753 | | |
| image | 11.527 | 11.533 | 13.671 | 14.683 | 14.686 | 14.694 |
| | 14.698 | | | | |
| in | 5.223 | 5.251 | 7.332 | 12.566 | 14.680 | 14.686 |
| | 14.694 | 14.698 | 14.699 | | |
| inc | 8.356 | 8.371 | 11.515 | 12.597 | 12.615 | 14.722 |
| | 15.759 | | | | |
| index | 14.689 | 14.697 | 15.762 | | |
| initialization | 6.258 | | | | |

Mon 09-18-89 12:58:17   INDEX (Cross Ref) Page.Line
all identifiers

| identifier | | | | | |
|---|---|---|---|---|---|
| initialize |  | 11.543 | 12.603 | 14.715 | |
| initilize |  | 4.191 | | | |
| in10 | 8.367 | 8.372 | | | |
| in11 | 8.368 | 8.370 | | | |
| in19 | 8.369 | 8.373 | | | |
| input | 3.116 | 3.117 | 6.287 | 8.365 | |
| inputs | 5.222 | | | | |
| int_done | 16.787 | 16.791 | 16.795 | 16.799 | 16.803 | 16.807 |
|  | 16.811 | 16.815 | 16.819 | 16.825 | | |
| int_msg | 9.446 | 9.449 | 9.452 | 9.455 | 10.459 | |
| integer | 9.438 | | | | |
| internal | 1.23 | 3.121 | | | |
| interrupt |  | 11.548 | 12.589 | 12.606 | 13.634 | 15.728 |
|  |  | 15.738 | 15.746 | | | |
| interrupts |  | 11.546 | 11.549 | 12.587 | 12.590 | 13.632 |
|  |  | 13.635 | 15.730 | 15.739 | | |
| into | 7.316 | | | | |
| into... | 8.400 | 13.639 | | | |
| is | 6.306 | 7.313 | 7.343 | | |
| it | 5.209 | 5.226 | 5.228 | 5.250 | 6.293 | 7.326 |
|  | 7.332 | 7.337 | 9.422 | 9.424 | 9.434 | 11.522 |
|  | 11.542 | 14.718 | 15.734 | 15.763 | | |
| JUMPS | 4.161 | | | | |
| jc | 7.312 | | | | |
| jmp | 15.763 | | | | |
| jnb | 6.292 | 7.325 | 7.336 | 11.541 | |
| jnc | 5.239 | 5.241 | 5.244 | 6.305 | |
| jump | 8.368 | 15.761 | | | |

Mon 09-18-89 12:58:17  INDEX (Cross Ref) Page.Line
all identifiers

| Identifier | | | | | | |
|---|---|---|---|---|---|---|
| key | 11.541 | | | | | |
| kind | 5.247 | | | | | |
| L | 10.502 | 12.610 | | | | |
| LF | 4.155 | 8.385 | 10.466 | 10.472 | 10.475 | 10.478 |
|  | 10.482 | 10.485 | 10.495 | 15.742 | | |
| LIGHTS | 1.15 | 3.129 | 3.130 | 10.467 | 11.507 | 11.512 |
|  | 12.594 | 12.611 | 14.679 | 14.715 | 14.719 | 15.743 |
|  | 15.781 | 16.789 | 16.793 | 16.797 | 16.801 | 16.805 |
|  | 16.809 | 16.813 | 16.817 | 16.821 | | |
| LJMP | 5.206 | | | | | |
| LO | 5.229 | 9.435 | 15.735 | | | |
| Load | 10.496 | | | | | |
| l | 5.255 | | | | | |
| l_all_off |  | 4.199 | 12.594 | | | |
| l_all_on | 4.197 | 11.512 | | | | |
| leave | 12.578 | 12.581 | | | | |
| less | 7.312 | | | | | |
| less_z | 7.312 | 7.315 | | | | |
| lf | 8.377 | | | | | |
| light | 11.525 | 11.531 | 14.679 | 15.758 | | |
| light_exit |  | 11.518 | 11.523 | 11.529 | 11.535 | 11.544 |
|  |  | 12.591 | 12.600 | 12.604 | 12.608 | 13.617 |
|  |  | 13.619 | 13.640 | | | |
| light_init |  | 4.193 | 14.717 | | | |
| light_msg |  | 14.717 | 15.742 | | | |
| lights | 3.129 | 4.193 | 5.213 | 11.510 | 11.527 | 11.533 |
|  | 11.537 | 12.586 | 12.593 | 12.602 | 12.610 | 14.724 |
|  | 15.754 | 15.755 | 15.756 | 15.757 | | |
| line | 4.155 | | | | | |
| list | 1.16 | | | | | |

Mon 09-18-89 12:58:17  INDEX (Cross Ref) Page.Line
all identifiers

| | | | |
|---|---|---|---|
| 1i00 | 14.721 | 14.723 | |
| 1i10 | 11.543 | 12.603 | 14.726 |
| ljmp | 4.166 | | |
| load | 12.610 | | |
| loop | 5.206 | 5.251 | |
| low | 9.417 | 14.672 | |
| lower | 7.315 | 9.431 | 9.436 |
| 110 | 11.511 | 11.520 | |
| 1100 | 12.610 | 13.619 | |
| 120 | 11.520 | 11.525 | |
| 130 | 11.525 | 11.531 | |
| 140 | 11.531 | 11.537 | |
| 1400 | 11.540 | 11.541 | |
| 150 | 11.537 | 12.586 | |
| 160 | 12.586 | 12.593 | |
| 170 | 12.593 | 12.602 | |
| 180 | 12.602 | 12.606 | |
| 190 | 12.606 | 12.610 | |
| 1910 | 12.613 | 12.616 | |
| MAIN | 4.178 | | |
| Marc | 1.14 | 1.15 | 1.16 |
| McKay | 1.17 | | |
| MEMORY | 3.103 | 15.779 | |
| Misc. | 9.442 | | |
| MON51 | 3.109 | 3.114 | 3.134 |
| MOV | 15.779 | | |

Mon 09-18-89 12:58:17  INDEX (Cross Ref) Page.Line
all identifiers

| | | | | | | |
|---|---|---|---|---|---|---|
| Module | 15.743 | | | | | |
| make | 9.422 | | | | | |
| many | 1.23 | | | | | |
| may | 15.752 | 15.778 | | | | |
| memory | 3.106 | 3.122 | 3.127 | | | |
| message | 5.208 | 5.249 | 14.717 | | | |
| module | 11.507 | 14.715 | | | | |
| modules | 1.15 | | | | | |
| monitor | 4.182 | | | | | |
| mov | 4.181 | 4.184 | 4.185 | 4.186 | 4.187 | 4.188 |
| | 4.189 | 4.194 | 4.195 | 4.203 | 5.208 | 5.215 |
| | 5.228 | 5.249 | 6.262 | 6.263 | 6.264 | 6.265 |
| | 6.271 | 6.272 | 6.278 | 6.279 | 6.294 | 7.327 |
| | 7.338 | 8.365 | 8.366 | 8.370 | 8.373 | 8.380 |
| | 8.383 | 8.385 | 8.389 | 8.391 | 8.397 | 8.403 |
| | 9.432 | 9.434 | 9.445 | 9.448 | 9.451 | 9.454 |
| | 10.457 | 11.512 | 11.513 | 11.514 | 11.517 | 11.522 |
| | 11.550 | 11.551 | 11.552 | 11.553 | 11.554 | 11.555 |
| | 11.556 | 11.557 | 11.558 | 12.562 | 12.568 | 12.569 |
| | 12.578 | 12.579 | 12.580 | 12.581 | 12.582 | 12.583 |
| | 12.594 | 12.595 | 12.596 | 12.599 | 12.611 | 12.612 |
| | 12.614 | 13.625 | 13.628 | 13.630 | 13.636 | 13.637 |
| | 13.638 | 13.644 | 13.645 | 13.646 | 13.650 | 13.654 |
| | 13.662 | 13.663 | 14.680 | 14.688 | 14.696 | 14.699 |
| | 14.717 | 14.719 | 14.720 | 14.721 | 14.725 | 14.726 |
| | 15.731 | 15.734 | 15.735 | 15.736 | 15.753 | 15.754 |
| | 15.755 | 15.756 | 15.757 | 15.758 | 15.761 | 15.781 |
| | 16.789 | 16.793 | 16.797 | 16.801 | 16.805 | 16.809 |
| | 16.813 | 16.817 | 16.821 | 16.823 | | |
| movc | 7.350 | 14.689 | 14.697 | 15.762 | | |
| mul | 9.433 | | | | | |
| N | 15.760 | | | | | |
| NOTE | 1.21 | | | | | |
| Not | 10.469 | | | | | |
| NULL | 7.353 | | | | | |

Mon 09-18-89 12:58:17   INDEX (Cross Ref) Page.Line
all identifiers

| identifier | | | | | | |
|---|---|---|---|---|---|---|
| needed | 14.675 | | | | | |
| new | 11.528 | 11.534 | 14.690 | 14.698 | | |
| next | 8.357 | 8.372 | 12.566 | 15.758 | 15.759 | |
| nibble | 5.225 | 5.229 | 9.415 | 9.416 | 9.417 | 9.430 |
|  | 9.435 | | | | | |
| normal | 6.263 | | | | | |
| not | 8.368 | | | | | |
| not_yet_msg | 10.469 | | | | | |
| now | 11.547 | 12.588 | 13.631 | 13.633 | 15.728 | 15.737 |
| now.. | 6.283 | | | | | |
| now... | 15.734 | | | | | |
| o | 1.21 | 5.255 | | | | |
| OK | 10.496 | | | | | |
| ON | 3.103 | | | | | |
| OTHER | 3.150 | | | | | |
| OV | 1.39 | 6.265 | 6.279 | | | |
| of | 1.21 | 3.106 | 3.111 | 3.117 | 3.129 | 4.156 |
|  | 5.247 | 7.345 | 13.671 | 14.679 | 14.688 | 14.696 |
|  | 14.724 | 15.761 | | | | |
| off | 4.186 | 4.189 | 6.295 | 9.419 | 11.531 | 11.552 |
|  | 11.555 | 12.580 | 12.583 | 15.754 | 15.755 | 15.756 |
|  | 15.757 | | | | | |
| oh | 5.241 | 5.244 | | | | |
| old | 14.690 | 14.698 | | | | |
| on | 6.265 | 6.279 | 11.511 | 11.525 | 13.631 | 13.642 |
| or | 1.23 | | | | | |
| org | 4.165 | | | | | |
| original | 1.17 | | | | | |

Mon 09-18-89 12:58:17  INDEX (Cross Ref) Page.Line
all identifiers

| identifier | | | | | |
|---|---|---|---|---|---|
| orl | 5.230 | 14.690 | 15.733 | | |
| other | 15.752 | 15.778 | | | |
| out | 9.424 | | | | |
| out_n_pop | | 8.392 | 8.404 | | |
| output | 7.319 | 7.324 | 7.327 | 7.342 | 9.409 |
| over | 8.391 | 16.823 | | | |
| P | 1.41 | 13.619 | | | |
| PC | 10.488 | | | | |
| PCON | 2.95 | 6.263 | | | |
| PS | 1.47 | | | | |
| PSW | 1.33 | 15.748 | 16.828 | | |
| PSW.0 | 1.41 | | | | |
| PSW.1 | 1.40 | | | | |
| PSW.2 | 1.39 | | | | |
| PSW.3 | 1.38 | | | | |
| PSW.4 | 1.37 | | | | |
| PSW.5 | 1.36 | | | | |
| PSW.6 | 1.35 | | | | |
| PSW.7 | 1.34 | | | | |
| PT0 | 2.50 | | | | |
| PT1 | 1.48 | | | | |
| PXT | 2.49 | | | | |
| PX0 | 2.51 | | | | |
| P0 | 2.99 | 4.184 | 4.187 | 11.550 | 11.553 | 12.562 |
| | 12.563 | 12.566 | 12.568 | 12.569 | 12.578 | 12.581 |
| | 13.621 | 13.623 | 13.636 | 15.754 | 15.756 | |
| P0.0 | 16.785 | 16.786 | | | | |

Mon 09-18-89 12:58:17    INDEX (Cross Ref) Page.Line
all identifiers

| | | | | | | |
|---|---|---|---|---|---|---|
| P0.1 | 16.790 | | | | | |
| P0.2 | 16.794 | | | | | |
| P0.3 | 16.798 | | | | | |
| P0.4 | 16.802 | | | | | |
| P0.5 | 16.806 | | | | | |
| P0.6 | 16.810 | | | | | |
| P0.7 | 16.814 | | | | | |
| P1 | 2.78 | 4.185 | 4.188 | 11.551 | 11.554 | 12.579 |
| | 12.582 | 13.621 | 13.629 | 13.637 | 13.640 | 13.650 |
| | 15.779 | 15.781 | 16.789 | 16.793 | 16.797 | 16.801 |
| | 16.805 | 16.809 | 16.813 | 16.817 | 16.821 | |
| P1.1 | 12.577 | | | | | |
| P2 | 2.65 | 4.186 | 4.189 | 11.552 | 11.555 | 12.580 |
| | 12.583 | 13.621 | 13.626 | 13.638 | 15.755 | 15.757 |
| P2.0 | 12.570 | 12.571 | 12.572 | 12.573 | 12.574 | 16.818 |
| P2.1 | 12.575 | 12.576 | 16.822 | | | |
| P3 | 2.53 | | | | | |
| page | 2.100 | 4.159 | 9.439 | 10.470 | 10.480 | 10.490 |
| | 10.498 | | | | | |
| parity | 6.295 | | | | | |
| parser | 5.206 | | | | | |
| pass | 15.759 | | | | | |
| point | 5.208 | 5.249 | 8.365 | 13.671 | 14.717 | |
| pointer | 8.356 | 8.371 | | | | |
| points | 14.686 | 14.694 | | | | |
| polled | 3.116 | | | | | |
| pop | 4.201 | 5.231 | 6.304 | 7.311 | 8.399 | 8.405 |
| | 9.417 | 12.564 | 12.565 | 13.657 | 13.666 | 13.667 |
| | 14.681 | 16.825 | 16.826 | 16.827 | 16.828 | |

Mon 09-18-89 12:58:17    INDEX (Cross Ref) Page.Line
all identifiers

| identifier | | | | | | |
|---|---|---|---|---|---|---|
| port | 3.116 | 4.191 | 5.209 | 5.250 | 6.258 | 6.262 |
|  | 6.287 | 7.319 | 7.342 | 7.355 | 8.377 | 13.642 |
|  | 14.718 | | | | | |
| port... | 13.631 | | | | | |
| ports | 13.619 | 13.638 | | | | |
| position | 5.226 | | | | | |
| power | 4.190 | | | | | |
| pre | 11.512 | 11.514 | 12.594 | 12.596 | 14.719 | 14.721 |
| process | 11.507 | | | | | |
| prog. | 13.619 | | | | | |
| prompt | 5.208 | 8.391 | 10.466 | | | |
| protocol | 6.259 | | | | | |
| push | 4.196 | 5.227 | 6.301 | 7.308 | 8.388 | 8.396 |
|  | 8.402 | 9.414 | 11.560 | 11.561 | 13.653 | 13.660 |
|  | 13.661 | 14.674 | 15.748 | 15.749 | 15.750 | 15.751 |
| put | 5.230 | 9.437 | 13.631 | | | |
| puts | 5.209 | 5.250 | 7.349 | 8.357 | 10.459 | 14.718 |
| question | 8.395 | | | | | |
| R | 10.502 | 11.531 | | | | |
| R. | 8.380 | | | | | |
| RATE | 3.131 | 4.194 | 4.203 | 11.522 | 14.725 | 15.736 |
|  | 15.753 | | | | | |
| RB8 | 2.74 | | | | | |
| REGISTERS |  | 1.27 | | | | |
| REN | 2.72 | | | | | |
| RESET | 4.161 | 14.694 | | | | |
| RESRVD | 1.40 | 1.44 | 1.45 | 1.46 | 2.57 | 2.58 |
| Reg. | 3.134 | 3.138 | 3.142 | 3.146 | | |

Mon 09-18-89 12:58:17 INDEX (Cross Ref) Page.Line
all identifiers

| Regan | 8.380 | | | | | |
|---|---|---|---|---|---|---|
| RI | 2.76 | 6.292 | 6.293 | 7.336 | 7.337 | 11.541 |
| | 11.542 | | | | | |
| ROW | 3.130 | 3.131 | 11.517 | 12.599 | 14.726 | 15.754 |
| | 15.755 | 15.756 | 15.757 | 15.758 | 15.759 | 15.776 |
| | 16.823 | | | | | |
| RS0 | 1.38 | 4.182 | | | | |
| RS1 | 1.37 | 4.183 | | | | |
| Rx | 6.292 | 7.336 | | | | |
| R0 | 13.671 | 14.680 | 14.683 | 14.686 | 14.694 | |
| ram | 11.512 | 12.594 | 14.719 | | | |
| rate | 1.23 | 3.131 | 4.194 | 4.203 | 6.259 | 6.264 |
| | 6.272 | 14.725 | | | | |
| received | 6.289 | | | | | |
| recieve | 5.221 | 5.234 | 9.428 | | | |
| register | 4.183 | | | | | |
| reload | 6.271 | 6.278 | 15.753 | | | |
| request | 5.212 | | | | | |
| requested | | 13.671 | | | | |
| reset | 4.166 | 4.181 | 7.315 | 11.534 | 14.698 | |
| ret | 5.232 | 5.245 | 6.284 | 6.297 | 7.328 | 7.339 |
| | 7.352 | 7.354 | 8.374 | 9.406 | 9.438 | 12.584 |
| | 13.640 | 13.651 | 13.658 | 13.668 | 14.683 | 14.700 |
| | 15.740 | | | | | |
| reti | 10.460 | 16.829 | | | | |
| return | 3.154 | 8.368 | 9.438 | 14.672 | 14.680 | 14.681 |
| | 14.682 | | | | | |
| returns | 5.223 | | | | | |
| reversed | 15.752 | 15.778 | | | | |
| rl | 12.566 | 13.648 | | | | |

Mon 09-18-89 12:58:17  INDEX (Cross Ref) Page.Line
 all identifiers

| | | | | | | |
|---|---|---|---|---|---|---|
| row | 3.130 | | | | | |
| rowtable | 15.761 | 15.765 | 15.766 | 15.767 | 15.768 | 15.769 |
| | 15.770 | 15.771 | 15.772 | 15.773 | 15.774 | |
| row0 | 15.765 | 15.781 | | | | |
| row1 | 15.766 | 16.789 | | | | |
| row2 | 15.767 | 16.793 | | | | |
| row3 | 15.768 | 16.797 | | | | |
| row4 | 15.769 | 16.801 | | | | |
| row5 | 15.770 | 16.805 | | | | |
| row6 | 15.771 | 16.809 | | | | |
| row7 | 15.772 | 16.813 | | | | |
| row8 | 15.773 | 16.817 | | | | |
| row9 | 15.774 | 16.821 | | | | |
| rr | 14.676 | 14.677 | 14.678 | | | |
| running | 5.223 | | | | | |
| r0 | 11.512 | 11.514 | 11.515 | 12.594 | 12.596 | 12.597 |
| | 12.611 | 12.614 | 12.615 | 13.625 | 13.636 | 13.644 |
| | 13.649 | 14.680 | 14.690 | 14.698 | 14.699 | 14.719 |
| | 14.721 | 14.722 | | | | |
| r1 | 8.365 | 8.370 | 8.371 | 8.373 | 13.630 | 13.637 |
| r2 | 13.628 | 13.638 | | | | |
| r6 | 5.223 | 8.366 | 8.372 | 11.513 | 11.516 | 12.595 |
| | 12.598 | 14.720 | 14.723 | | | |
| s | 10.502 | 11.525 | | | | |
| SBUF | 2.66 | 6.294 | 7.327 | 7.338 | | |
| SCON | 2.68 | 6.262 | | | | |
| SCON.0 | 2.76 | | | | | |
| SCON.1 | 2.75 | | | | | |

Mon 09-18-89 12:58:17   INDEX (Cross Ref) Page.Line
 all identifiers

| | | | | | |
|---|---|---|---|---|---|
| SCON.2 | 2.74 | | | | |
| SCON.3 | 2.73 | | | | |
| SCON.4 | 2.72 | | | | |
| SCON.5 | 2.71 | | | | |
| SCON.6 | 2.70 | | | | |
| SCON.7 | 2.69 | | | | |
| SET | 14.686 | | | | |
| SETB | 16.783 | | | | |
| SETUP | 6.268 | 6.275 | | | |
| See | 1.21 | | | | |
| Send | 8.377 | | | | |
| Serial | 6.258 | 6.287 | 7.319 | 7.342 | 8.360 |
| Setup | 6.259 | | | | |
| SFR | 1.14 | | | | |
| SI | 10.486 | | | | |
| SMOD | 6.263 | | | | |
| SM0 | 2.69 | | | | |
| SM1 | 2.70 | | | | |
| SM2 | 2.71 | | | | |
| SP | 2.98 | 4.181 | | | |
| SPECIAL | 1.27 | | | | |
| STACK | 3.111 | 4.181 | | | |
| Stack | 3.109 | | | | |
| String | 7.343 | | | | |
| s | 1.14 | 4.182 | 5.222 | 5.255 | 12.563 | 15.776 |
| save | 9.414 | 11.522 | 14.674 | 14.699 | |

Mon 09-18-89 12:58:17   INDEX (Cross Ref) Page.Line
all identifiers

| identifier | | | | | | |
|---|---|---|---|---|---|---|
| select | 4.182 | | | | | |
| selection | | 1.21 | | | | |
| send | 5.209 | 5.250 | 7.345 | 7.355 | 9.424 | 14.718 |
| serial | 3.116 | 4.191 | 5.209 | 5.250 | 6.262 | 7.355 |
| | 8.377 | 14.718 | | | | |
| serint | 4.175 | 10.457 | | | | |
| service | 15.746 | | | | | |
| set | 4.181 | 6.262 | 6.263 | 6.265 | 6.279 | 11.525 |
| | 11.528 | 11.531 | 13.636 | 14.690 | 15.732 | 15.733 |
| | 15.734 | 15.735 | 15.736 | | | |
| set_bit_off | | 11.534 | 14.696 | | | |
| set_bit_on | | 11.528 | 14.688 | | | |
| setb | 4.182 | 4.183 | 6.283 | 11.549 | 12.570 | 12.573 |
| | 12.575 | 12.590 | 13.635 | 15.737 | 15.738 | 15.739 |
| | 16.785 | | | | | |
| setup | 4.193 | 15.728 | | | | |
| simes | 10.457 | 10.485 | | | | |
| single_hit | | 10.488 | | | | |
| size | 3.117 | | | | | |
| sjmp | 5.214 | 5.217 | 6.306 | 7.313 | 8.357 | 8.369 |
| | 8.381 | 8.386 | 8.392 | 9.424 | 9.446 | 9.449 |
| | 9.452 | 9.455 | 14.691 | 16.787 | 16.791 | 16.795 |
| | 16.799 | 16.803 | 16.807 | 16.811 | 16.815 | 16.819 |
| small | 4.190 | | | | | |
| some | 5.247 | | | | | |
| space | 3.109 | 8.395 | 8.402 | | | |
| ss1 | 7.351 | 7.353 | | | | |
| ss2 | 7.353 | 7.355 | | | | |
| stack | 3.111 | 4.181 | | | | |
| start | 4.194 | 4.203 | 11.517 | 12.599 | 12.602 | 14.725 |
| | 14.726 | 16.823 | | | | |

Mon 09-18-89 12:58:17   INDEX (Cross Ref) Page.Line
all identifiers

| identifier | | | | | |
|---|---|---|---|---|---|
| stash_bit | 14.691 | 14.699 | | | |
| step | 12.606 | | | | |
| store | 5.228 | 8.370 | 9.434 | | |
| string | 4.156 | 7.342 | 7.345 | 8.360 | 8.362 |
| strings | 10.463 | | | | |
| strip | 9.431 | 9.436 | | | |
| stuff | 5.213 | | | | |
| subb | 6.303 | 7.310 | | | |
| swap | 5.226 | 9.415 | | | |
| sweep | 14.724 | | | | |
| T | 10.502 | 11.537 | | | |
| TB8 | 2.73 | | | | |
| TCON | 2.85 | 6.264 | | | |
| TCON.0 | 2.93 | | | | |
| TCON.1 | 2.92 | | | | |
| TCON.2 | 2.91 | | | | |
| TCON.3 | 2.90 | | | | |
| TCON.4 | 2.89 | | | | |
| TCON.5 | 2.88 | | | | |
| TCON.6 | 2.87 | | | | |
| TCON.7 | 2.86 | | | | |
| Text | 10.463 | | | | |
| TF0 | 2.88 | | | | |
| TF1 | 2.86 | | | | |
| THAT | 1.27 | | | | |
| THOSE | 1.27 | | | | |

Mon 09-18-89 12:58:17   INDEX (Cross Ref) Page.Line
all identifiers

| Identifier | | | | | |
|---|---|---|---|---|---|
| TH0 | 2.80 | 15.736 | 15.753 | | |
| TH1 | 2.79 | 6.272 | 6.279 | | |
| TI | 2.75 | 7.325 | 7.326 | | |
| TIMER | 6.271 | 15.733 | | | |
| TL0 | 2.82 | 15.735 | 15.753 | | |
| TL1 | 2.81 | 6.265 | | | |
| TMOD | 2.83 | 6.271 | 6.278 | 15.731 | 15.734 |
| TR0 | 2.89 | 11.547 | 12.588 | 13.633 | 15.737 |
| TR1 | 2.87 | 6.283 | | | |
| t | 5.255 | 7.332 | 8.380 | | |
| table | 14.688 | 14.696 | 14.703 | 15.761 | |
| terminate | | 7.351 | 7.353 | 8.373 | |
| terminated | | 7.343 | 8.362 | | |
| terminator | | 7.346 | | | |
| test | 11.537 | 14.724 | | | |
| test_em | 11.540 | 11.546 | 14.724 | | |
| test_em_10 | | 11.560 | 12.567 | | |
| than | 6.305 | 7.312 | | | |
| that | 14.703 | | | | |
| the | 4.193 | 7.332 | 11.507 | 13.637 | 14.715 |
| then | 13.621 | | | | |
| this | 5.222 | | | | |
| through | 3.103 | | | | |
| thru | 5.240 | 5.242 | 5.243 | 13.642 | |
| timer | 6.264 | 6.283 | 11.547 | 12.588 | 13.633 | 15.728 |
|  | 15.731 | 15.732 | 15.735 | 15.736 | 15.737 | 15.746 |
|  | 15.753 | | | | | |

Mon 09-18-89 12:58:17   INDEX (Cross Ref) Page.Line
all identifiers

| identifier | | | | | | |
|---|---|---|---|---|---|---|
| timer_0_service | 4.169 | 9.448 | 12.607 | 15.748 | | |
| timer_1_service | 4.173 | 9.454 | | | | |
| tnext | 13.646 | 13.649 | | | | |
| to | 4.183 | 5.206 | 5.208 | 5.209 | 5.221 | 5.222 |
| | 5.223 | 5.234 | 5.238 | 5.240 | 5.249 | 5.250 |
| | 5.251 | 6.263 | 6.265 | 6.279 | 6.289 | 6.292 |
| | 6.299 | 7.332 | 7.345 | 7.355 | 8.365 | 8.377 |
| | 9.409 | 9.411 | 9.428 | 9.431 | 9.436 | 9.438 |
| | 11.507 | 11.514 | 12.596 | 13.671 | 14.686 | 14.689 |
| | 14.694 | 14.697 | 14.703 | 14.717 | 14.718 | 14.721 |
| | 15.732 | 15.758 | 15.762 | 15.779 | 16.783 | |
| together | 5.230 | 9.437 | | | | |
| top | 3.111 | | | | | |
| toupper | 6.296 | 6.301 | | | | |
| transmit | 7.321 | | | | | |
| true | 7.336 | | | | | |
| turn | 4.184 | 4.187 | 11.550 | 11.553 | 15.754 | 15.755 |
| | 15.756 | 15.757 | | | | |
| U | 5.255 | | | | | |
| UART | 6.268 | 6.275 | | | | |
| Unused | 3.121 | | | | | |
| USER | 3.109 | 3.122 | 3.127 | 3.138 | 3.142 | 3.146 |
| uart | 1.21 | | | | | |
| un | 14.675 | | | | | |
| up | 3.111 | 4.181 | 4.190 | 6.262 | 15.734 | 15.758 |
| upper | 6.289 | 6.299 | | | | |
| V | 1.14 | 10.502 | | | | |
| Version | 1.14 | 1.15 | 1.16 | 1.17 | | |
| V1.01 | 15.743 | | | | | |
| value | 5.221 | 5.223 | 5.234 | 5.247 | 7.332 | 9.428 |
| | 14.674 | 14.681 | | | | |

Mon 09-18-89 12:58:17   INDEX (Cross Ref) Page.Line
all identifiers

| | | | | | | |
|---|---|---|---|---|---|---|
| version | 1.17 | | | | | |
| wait | 6.292 | 7.325 | 7.336 | | | |
| way | 15.760 | | | | | |
| we | 15.779 | | | | | |
| where | 15.779 | | | | | |
| with | 1.15 | 5.206 | 6.288 | 7.320 | 7.332 | 7.343 |
| | 7.344 | 8.361 | 8.362 | 9.410 | 13.642 | 14.690 |
| working | 4.182 | | | | | |
| X | 12.586 | | | | | |
| xrl | 14.698 | | | | | |
| Y | 12.606 | | | | | |
| Yaxley | 1.14 | 1.15 | 1.16 | | | |
| Yet | 10.469 | | | | | |
| You | 1.23 | | | | | |
| Z | 7.343 | 12.593 | | | | |
| z | 6.289 | 6.299 | 7.310 | 7.312 | | |
| zero | 8.373 | 12.593 | 14.675 | | | |
| z00 | 11.514 | 11.516 | | | | |
| z10 | 12.596 | 12.598 | | | | |

What is claimed is:

1. Apparatus for previewing portions of audio and associated full motion video selections comprising:
   a) means for storing portions of a plurality of audio selections and associated full motion video presentations, said means for storing comprising:
      i) a first optical disc media and player;
      ii) a second optical disc media and player, a portion of said entertainment selections stored on said second optical disc media and another portion of said entertainment selections stored on said first media; and
      iii) means for selecting between said first and said second optical disc players for playback of said optical discs;
   b) display means for simultaneously indicating to a user said plurality of selections;
   c) means, coupled to said display means, for inputting a first selection from said user; and
   d) means, coupled to said means for inputting, for playing said first selection in audio form while concurrently displaying said first selection's associated full motion video presentation.

2. Apparatus as recited in claim 1 further comprising:
   a) digital processing means;
   b) means in said computing means for generating a graphic output; and
   c) said means for selecting chosing a display from said first optical disc player, said second optical disc player, or said digital processing means.

3. Apparatus as recited in claim 1 wherein said means for selecting further comprises:
   a) an audio multiplexer connected to said first and said second optical disc player;
   b) a video multiplexer connected to said first and said second optical disc player; and
   c) logic means for directing said audio and video multiplexers to select an appropriate player of said first and said second optical disc players.

4. Apparatus as recited in claim 3 wherein said digital processing means is a personal computer.

5. Apparatus as recited in claim 1 wherein said means for inputting further comprises an array of concurrently displayed switching means.

6. Apparatus as recited in claim 5 wherein said switching means is an array of switches.

7. Apparatus as recited in claim 6 further comprising a sheet of images overlaid on said array, each of said images representative of one of said entertainment selections.

8. Apparatus as recited in claim 1 further comprising:
   a) means for storing selections for purchase by said user; and
   b) means for illuminating a portion of said means for storing connected to said means for inputting, said portion corresponding to a selection by a user.

9. Apparatus for previewing audio selections and associated full motion video presentations in a retail sales location, said audio selections comprising a portion of musical recordings comprising:
   a) a backlit translucent keypad array, said keypad array comprising an array of images relating to each of said musical recordings;
   b) means for scanning said keypad array to determine when a key is pressed;
   c) first and second optical disc players with first and second optical discs, said first optical disc including a first portion of said audio selections and video presentations, said second optical disc including a second portion of said audio and video presentations;
   d) display means for presenting said audio selections and video presentations; and
   e) logic means for selecting between said optical disc players and connecting said display means to a selected optical disc player.

10. A method of previewing an audio presentation and associated full motion video presentation comprising the steps of:
    a) simultaneously presenting a user with a plurality of choices of presentations;
    b) inputting a desired presentation selection from said user; and
    c) presenting a portion of said selection while simultaneously presenting a full motion video associated with said selection, the step of presenting further comprising the step of selecting between a first and a second optical disc player.

11. The method as recited in claim 10 wherein the step of presenting is a step of playing an optical disc.

12. The method as recited in claim 10 further comprising the step of illuminating a portion of a display case, said portion of a display case holding an audio or video selection corresponding to said presentation for selection for purchase by said user.

* * * * *